US010568100B2

(12) United States Patent
Gan et al.

(10) Patent No.: US 10,568,100 B2
(45) Date of Patent: Feb. 18, 2020

(54) RESOURCE SCHEDULING METHOD, APPARATUS, AND DEVICE

(71) Applicant: HUAWEI TECHNOLOGIES CO.,LTD., Shenzhen, Guangdong (CN)

(72) Inventors: Ming Gan, Shenzhen (CN); Meilu Lin, Shenzhen (CN); Le Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/365,041

(22) Filed: Mar. 26, 2019

(65) Prior Publication Data

US 2019/0246399 A1 Aug. 8, 2019

Related U.S. Application Data

(63) Continuation of application No. 15/843,300, filed on Dec. 15, 2017, which is a continuation of application No. PCT/CN2015/091953, filed on Oct. 14, 2015.

(30) Foreign Application Priority Data

Jun. 16, 2015 (WO) ................ PCT/CN2015/081589
Jul. 3, 2015 (WO) ................ PCT/CN2015/083284

(51) Int. Cl.
*H04W 72/04* (2009.01)
*H04W 28/00* (2009.01)
(Continued)

(52) U.S. Cl.
CPC ...... *H04W 72/0453* (2013.01); *H04B 7/0452* (2013.01); *H04L 5/0053* (2013.01);
(Continued)

(58) Field of Classification Search
CPC . H04W 72/0453; H04W 72/12; H04W 28/00; H04L 5/0053; H04L 5/0094; H04B 7/0452
See application file for complete search history.

(56) References Cited

U.S. PATENT DOCUMENTS 10,149,296 B1 12/2018 Noh et al.
2009/0325585 A1 12/2009 Farajidana et al.
(Continued)

FOREIGN PATENT DOCUMENTS

CN 101064709 A 10/2007
CN 101076139 A 11/2007
(Continued)

OTHER PUBLICATIONS

ZTE:"DL Resource Allocation and Related Signalling Way" 3GPP TSG-RAN WG1 #49bis, R1-072908, Orlando, USA, Jun. 25-29, 2007. total 4 pages.

(Continued)

*Primary Examiner* — Min Jung
(74) *Attorney, Agent, or Firm* — Paul Christopher Hashim

(57) ABSTRACT

Embodiments provide resource scheduling methods and apparatus that reduce transmission resource overhead in resource scheduling. The method can be applied to a wireless local area network, where a next generation protocol followed by the wireless local area network predefines locations of resource units potentially allocated from a to-be-assigned frequency domain resource. The method includes: generating, by a sending end, resource scheduling information, where the resource scheduling information includes a bit sequence to indicate an actual allocation of a resource unit(s) from the to-be-assigned frequency domain resource, and at least some bits in the bit sequence to indicate whether one or more of the resource unit locations
(Continued)

AP 21
STA 22
STA 22 potentially allocated for the to-be-assigned frequency domain resource are the actually allocated resource units.

20 Claims, 25 Drawing Sheets

(51) Int. Cl.
*H04L 5/00* (2006.01)
*H04B 7/0452* (2017.01)
*H04W 72/12* (2009.01)
*H04L 27/26* (2006.01)
*H04W 84/12* (2009.01)

(52) U.S. Cl.
CPC ........... *H04L 5/0094* (2013.01); *H04W 28/00* (2013.01); *H04W 72/12* (2013.01); *H04L 5/0023* (2013.01); *H04L 5/0037* (2013.01); *H04L 5/0046* (2013.01); *H04L 27/2602* (2013.01); *H04W 84/12* (2013.01)

(56) References Cited

U.S. PATENT DOCUMENTS

2013/0023296 A1 1/2013 Kim et al.
2013/0107838 A1 5/2013 Li et al.
2014/0307612 A1 10/2014 Vermani et al.
2014/0369276 A1 12/2014 Porat et al.
2015/0327270 A1 11/2015 Iwai et al.
2016/0100370 A1 4/2016 Rong et al.
2016/0204915 A1 7/2016 Chen et al.
2016/0242200 A1 8/2016 Yan et al.
2016/0295559 A1 10/2016 Bharadwaj et al.
2016/0301500 A1 10/2016 Suh et al.
2016/0330002 A1 11/2016 Iwai et al.
2016/0330300 A1 11/2016 Josiam et al.
2016/0360443 A1* 12/2016 Hedayat ............... H04B 7/0452
2017/0134983 A1 5/2017 Montorsi et al.
2017/0245250 A1 8/2017 Zhang et al.
2017/0310439 A1* 10/2017 Yang ..................... H04L 5/0032
2017/0311292 A1 10/2017 Choi et al.
2018/0070336 A1 3/2018 Ghosh et al.
2018/0124787 A1 5/2018 Wang et al.
2018/0124788 A1* 5/2018 Choi ......................... H04L 5/00
2018/0184425 A1* 6/2018 Ghosh ............... H04W 72/0446

FOREIGN PATENT DOCUMENTS

CN 101296508 A 10/2008
CN 101399800 A 4/2009
CN 102763474 A 10/2012
CN 103220810 A 7/2013
CN 103701578 A 4/2014
CN 104488344 A 4/2015
EP 1848238 A2 10/2007
EP 2774294 B1 9/2014
EP 3148276 A1 3/2017
EP 3293932 A1 3/2018
JP 2016519909 A 7/2016
KR 20100003369 A 1/2010
KR 20160130944 A 11/2016
RU 2428814 C1 11/2008
RU 2510804 C2 8/2010
WO 2008137786 A1 11/2008
WO 2014172198 A1 10/2014
WO 2014187320 A1 11/2014
WO 2014193547 A1 12/2014
WO 2016106225 A1 6/2016

OTHER PUBLICATIONS

Shahmaz Azizi (Intel) et al, OFDMA Numerology and Structure, IEEE802.11-15/0330r5, May 13, 2015, 16 pages.

* cited by examiner

100

A sending terminal generates resource scheduling information, where the resource scheduling information includes a bit sequence used to indicate to-be-allocated resource units actually obtained by dividing the to-be-allocated frequency domain resource, and at least some bits in the bit sequence are used to indicate whether a to-be-allocated resource unit actually obtained by dividing the to-be-allocated bandwidth is in one or more resource unit positions in the positions of the resource units possibly obtained by dividing the to-be-allocated frequency domain resource — S110

Send the resource scheduling information to a receiving terminal — S120

FIG. 1

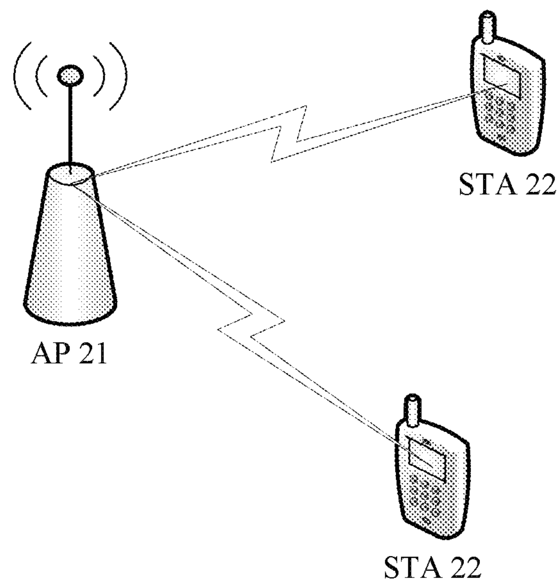

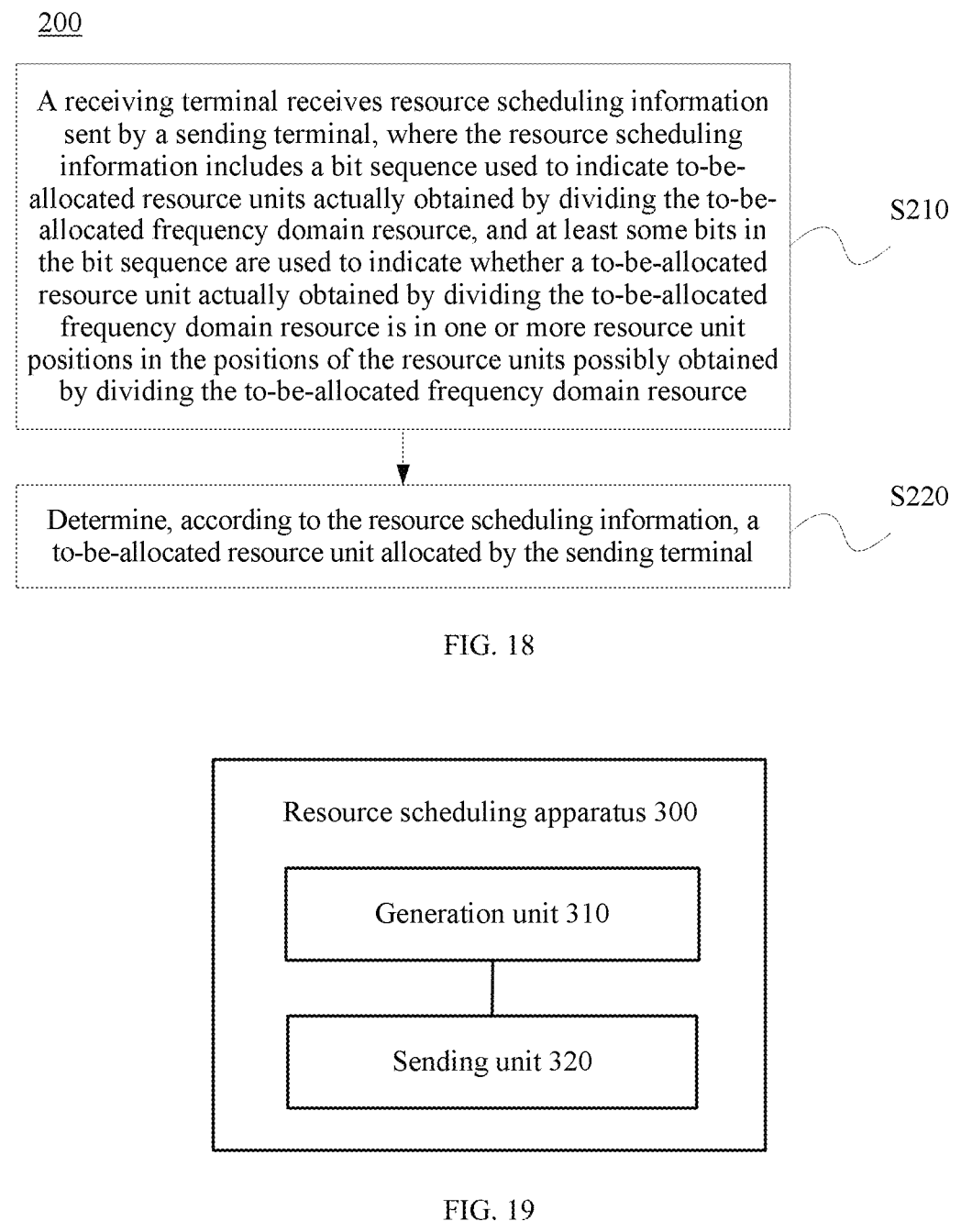

A receiving terminal receives resource scheduling information sent by a sending terminal, where the resource scheduling information includes a bit sequence used to indicate to-be-allocated resource units actually obtained by dividing the to-be-allocated frequency domain resource, and at least some bits in the bit sequence are used to indicate whether a to-be-allocated resource unit actually obtained by dividing the to-be-allocated frequency domain resource is in one or more resource unit positions in the positions of the resource units possibly obtained by dividing the to-be-allocated frequency domain resource

S210

Determine, according to the resource scheduling information, a to-be-allocated resource unit allocated by the sending terminal

Resource scheduling apparatus 300

Generation unit 310

Sending unit 320

FIG. 19

| 1 | 1 | 1 | 1 | 1 | 1 | 1 | →Max 9 STAs |
|---|---|---|---|---|---|---|---|
| 26 | 26 | 26 | 26 | 26 | 52 | 52 | |

| 4 STAs | 1 | 1 | 1 | 1 | 1 | →Max 9 STAs |
|---|---|---|---|---|---|---|
| 106 | 26 | 26 | 26 | 26 | 26 | |

| 4 STAs | 1 | 4 STAs | →Max 9 STAs |
|---|---|---|---|
| 106 | 26 | 106 | |

RESOURCE SCHEDULING METHOD, APPARATUS, AND DEVICE

CROSS-REFERENCE TO RELATED APPLICATIONS

This application is a continuation of US Application numbered US20180184429, which is a continuation of International Application No. PCT/CN2015/091953, filed on Oct. 14, 2015, which claims priority to International Application No. PCT/CN2015/081589, filed on Jun. 16, 2015, and International Application No. PCT/CN2015/083284, filed on Jul. 3, 2015. All of the aforementioned patent applications are hereby incorporated by reference in their entireties.

TECHNICAL FIELD

The present invention relates to the field of communications technologies, and more specifically, to a resource scheduling method, apparatus, and device.

BACKGROUND

With development of technologies such as an orthogonal frequency division multiple access (OFDMA) transmission technology and a multi-user multiple-input multiple-output (MU-MIMO, Multiple User-MIMO) transmission technology, currently, a communications system can already support multi-user transmission, that is, support multiple stations in simultaneously sending and receiving data.

However, for how to perform resource scheduling for multiple users in the foregoing multi-user transmission (for example, including an OFDMA mode, a MU-MIMO mode, or an OFDMA and MU-MIMO hybrid transmission mode), a solution needs to be provided.

According to a currently known resource scheduling solution, a bit sequence is to indicate resource units in a bandwidth to be allocated, that is, one bit in the bit sequence indicates allocation of one resource subunit (one resource subunit includes 1×26 subcarriers), and switching between 0 and 1 in the bit sequence indicates that a resource unit indicated by a bit before the switching and a resource unit indicated by a bit after the switching are allocated to different users.

For example, when a bandwidth to be allocated is 20 megahertz (MHz), nine resource subunits are included, and a bit sequence of nine bits needs to be to indicate resource allocation. Moreover, as the bandwidth increases, a length of the bit sequence also increases continuously, that is, in the resource scheduling solution of the prior art, a large quantity of transmission resources need to be occupied to transmit the bit sequence.

Therefore, it is hoped that a technology that can support reduction of transmission resource overheads in resource scheduling is provided.

SUMMARY

Embodiments provide a resource scheduling method, apparatus, and device, which can support reduction of transmission resource overheads in resource scheduling.

According to a first aspect, a resource scheduling method is provided, and applied to a wireless local area network, where a next generation protocol followed by the wireless local area network predefines locations of resource units possibly allocated from a to-be-assigned frequency domain resource, and the method includes: generating, by a sending end, resource scheduling information, where the resource scheduling information includes a bit sequence to indicate an actual allocation of a resource unit(s) from the to-be-assigned frequency domain resource, and at least some bits in the bit sequence are to indicate whether the one or more resource unit locations possibly allocated for the to-be-assigned frequency domain resource is\are the actually allocated resource unit; and sending the resource scheduling information to a receiving end.

According to a second aspect, a resource scheduling method is provided, and applied to a wireless local area network, where a next generation protocol followed by the wireless local area network predefines locations of resource units possibly allocated from a to-be-assigned frequency domain resource, and the method includes: receiving, by a receiving end, resource scheduling information sent by a sending end, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and determining, according to the resource scheduling information, the resource unit(s) actually allocated by the sending end to the receiving end.

According to a third aspect, a resource scheduling apparatus is provided, and configured in a wireless local area network, where a next generation protocol followed by the wireless local area network predefines locations of resource units possibly allocated from a to-be-assigned frequency domain resource, and the apparatus includes: a generation unit, configured to generate resource scheduling information, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and a sending unit, configured to send the resource scheduling information to a receiving end.

According to a fourth aspect, a resource scheduling apparatus is provided, and configured in a wireless local area network, where a next generation protocol followed by the wireless local area network predefines locations of resource units possibly allocated from a to-be-assigned frequency domain resource, and the apparatus includes: a receiving unit, configured to receive resource scheduling information sent by a sending end, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and a determining unit, configured to determine, according to the resource scheduling information, the resource unit(s) actually allocated by the sending end to the receiving end.

In the resource scheduling method, apparatus, and device according to the embodiments, at least some bits in a bit sequence are to indicate whether a to-be-assigned resource unit actually allocated from a to-be-assigned frequency domain resource is in one or more resource unit locations possibly allocated from the to-be-assigned frequency domain resource, and based on the allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

BRIEF DESCRIPTION OF DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

FIG. 1 is a schematic flowchart of a resource scheduling method according to an embodiment;

FIG. 2 is a schematic architectural diagram of a WLAN system;

FIG. 18 is a schematic flowchart of a resource scheduling method according to an embodiment;

FIG. 19 is a schematic block diagram of a resource scheduling apparatus according to an embodiment;

FIG. 23*a*-1, FIG. 23*a*-2, and FIG. 23*b* are simple schematic diagrams of a bit sequence generation or parsing process, where a bit sequence in this solution is consistent with that in Table 1.

DESCRIPTION OF EMBODIMENTS

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope.

Figures 1, 23A:
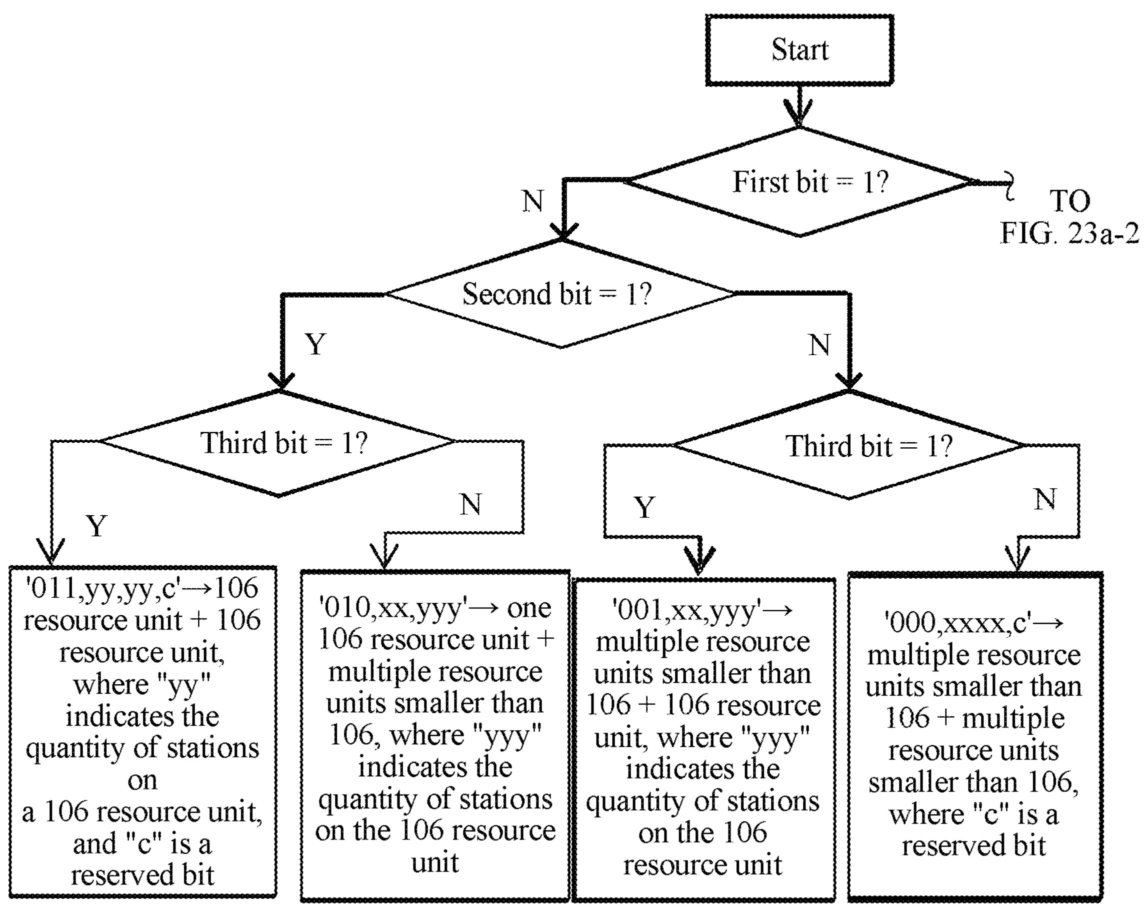

FIG. 1 is a schematic flowchart of a resource scheduling method 100 according to an embodiment, where the method is described from a perspective of a sending end. The method 100 is applied to a wireless local area network, where a next generation protocol followed by the wireless local area network predefines locations of resource units possibly allocated from a to-be-assigned frequency domain resource. As shown in FIG. 1, the method 100 includes:

S110. A sending end generates resource scheduling information, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource.

S120. Send the resource scheduling information to a receiving end.

The method 100 may be applied to various communications systems that implement multi-user transmission by means of resource scheduling, for example, a system that performs communication in an OFDMA mode, a MU-MIMO mode, or the like.

Moreover, the method 100 may be applied to a wireless local area network (WLAN), for example, wireless fidelity (Wi-Fi).

Figures 2, 23A:
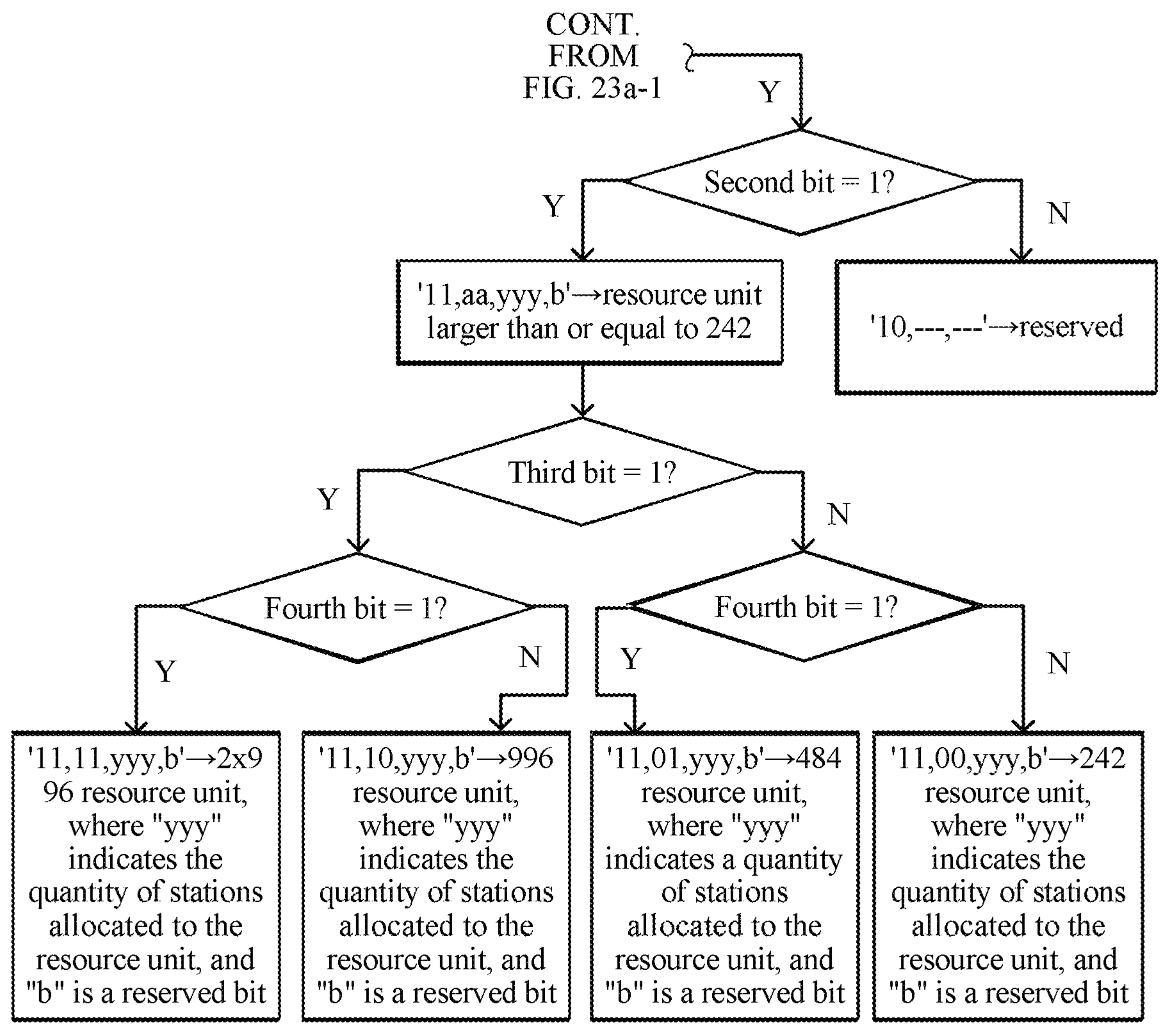

FIG. 2 is a schematic diagram of a WLAN system. As shown in FIG. 2, the WLAN system includes one or more access points APs 21, and further includes one or more stations STAs 22. Data transmission is performed between an access point and a station. The station determines, according to a preamble sent by the access point, a resource scheduled for the station, and performs, based on the resource, data transmission with the access point.

Optionally, the sending end is a network device, and the receiving end is a terminal device.

Specifically, as a sending end device, a network-side device in a communications system may be illustrated, for example, may be an access point (AP) in the WLAN. The AP may also be referred to as a wireless access point, a bridge, a hotspot or the like, and the AP may access a server or a communications network.

As a receiving end device, a terminal device in the communications system may be illustrated, for example, may be a station (STA) in the WLAN. The STA may also be referred to as a user, and may be a wireless sensor, a wireless communications terminal, or a mobile terminal, for example, a mobile phone (or referred to as a "cellular" phone) and a computer having a wireless communications function. For example, the STA may be a portable, pocket-sized, handheld, computer-embedded, wearable, or vehicle-mounted wireless communications apparatus, which exchanges communication data such as voice and data with a radio access network.

It should be understood that, the foregoing illustrated system to which the method 100 of this embodiment is applicable is merely an example, and the present invention is not limited thereto. For example, the following may be further illustrated: a Global System for Mobile Communications (GSM), a Code Division Multiple Access (CDMA) system, Wideband Code Division Multiple Access (WCDMA), a General Packet Radio Service (GPRS), and a Long Term Evolution (LTE, Long Term Evolution) system.

Correspondingly, the network device may be a base station (BTS, Base Transceiver Station) in the GSM or CDMA, or may be a base station (NodeB) in the WCDMA, or may be an evolved base station (eNB or e-NodeB, evolutional Node B) in the LTE, or may be a small-cell base station, which may be a micro base station (Micro), or may be a pico base station (Pico), or may be a home base station that is also referred to as a femtocell base station (femto), which is not limited in the present invention. The terminal device may be a mobile terminal, or mobile user equipment, for example, a mobile phone (or referred to as a "cellular" phone).

A rule about sizes of resource units allocated in the WLAN system is: using 26 subcarriers as a resource unit.

Figure 3:
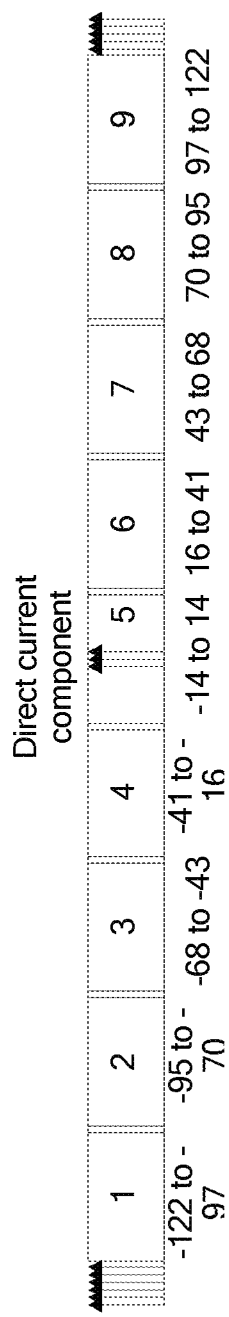
FIG. 3 is a schematic diagram of an allocation of a frequency domain resource with a 20 MHz bandwidth.

As shown in FIG. 3, using a 20 megahertz (MHz) bandwidth as an example, a quantity of discrete Fourier transform or inverse discrete Fourier transform (DFT/IDFT) points of a data symbol part in the WLAN system is 256, that is, 256 subcarriers exist. Subcarriers −1, 0, and 1 are direct current (Direct current, DC) components, and a left sideband subcarrier −122 to a subcarrier −2 and a right sideband subcarrier 2 to a subcarrier 122 are to carry data information, that is, 242 subcarriers are to carry data information. A subcarrier −128 to a subcarrier −123 and a subcarrier 123 to a subcarrier 128 are a guard band. Therefore, generally, 242 subcarriers to carry data information are grouped into nine resource subunits, where each resource subunit includes 26 subcarriers, and eight remaining subcarriers are unused. Moreover, a cross-DC (that is, including subcarriers −1, 0, and 1) resource subunit is located in a center of a bandwidth. The method 100 in this embodiment mainly relates to allocation of 242 subcarriers to carry data information.

Types of resource units (also referred to as resource blocks) that can be included in frequency domain resources with different bandwidths are different. Specifically, the next generation protocol followed by the wireless local area network predefines locations of resource units (a resource allocation map) possibly allocated from a to-be-assigned frequency domain resource (20 MHz, 40 MHz, 80 MHz, or 160 MHz). The sending end generates and sends resource scheduling information, where the resource scheduling information includes a bit sequence to indicate to-be-assigned resource units allocated. The receiving end may know, by reading the bit sequence, which resource units are obtained by dividing a to-be-assigned frequency domain resource.

In addition, the resource scheduling information may further include information about scheduled receiving ends corresponding to the resource units allocated. In this way, by reading the resource scheduling information, the receiving end implements transmission of uplink and downlink information on a resource unit allocated to the receiving end.

The following first describes in detail the locations of the resource units possibly allocated from a to-be-assigned frequency domain resource (referring to a resource allocation map shown in FIG. 4, FIG. 5, or FIG. 6), as predefined by the next generation protocol.

1. For a 20 MHz Bandwidth Frequency Domain Resource

Optionally, the locations of the resource units possibly allocated for the to-be-assigned frequency domain resource include a default location, and a resource unit corresponding to the default location is a resource unit that is not indicated by the bit sequence, as may be predefined by the next generation protocol. Optionally, one bit may be to indicate whether a resource unit in the default location is allocated to a user for use.

Figure 4:
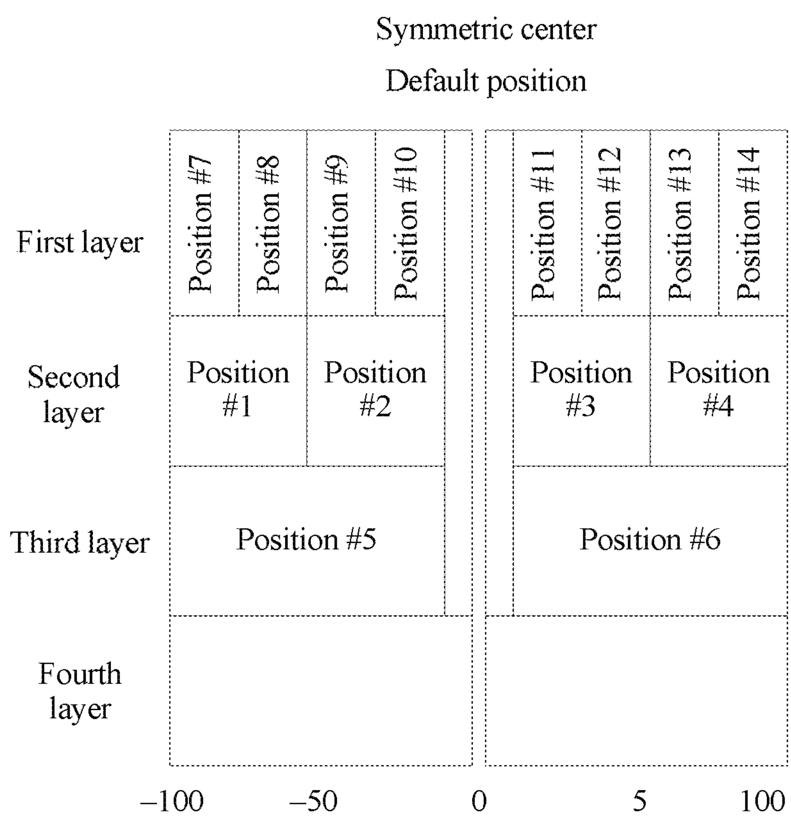
FIG. 4 is a schematic diagram of allocation locations of resource units in a 20 MHz bandwidth.

Specifically, as shown in FIG. 4, the 20 MHz bandwidth frequency domain resource may include a default resource unit located in a center (that is, the resource unit located in the default location), and the default resource unit may be a 1×26-tone resource unit, namely, a cross-DC (namely, subcarriers −1, 0, and 1) resource unit including 26 subcarriers. The default resource unit exists in the communications system by default and is allocated independently, that is, in each to-be-assigned resource with a 20 MHz bandwidth, a default 1×26-tone resource unit is allocated from a center location of the resource. The default resource unit is allocated independently to a receiving end. The receiving end to which the default resource unit is allocated may be the same as or different from a receiving end to which an adjacent resource unit on a left side or a right side of the default resource unit is allocated. This is not particularly limited in the present invention. For the 20 MHz bandwidth, when the receiving end to which the default resource unit is allocated is the same as the receiving end to which the adjacent resource unit on the left side or the right side of the default resource unit is allocated, it indicates that the 20 MHz bandwidth is allocated to only one user. Otherwise, the receiving end to which the default resource unit is allocated is different from the receiving end to which the adjacent resource unit on the left side or the right side of the default resource unit is allocated.

In addition to the default resource unit located in the default location, the 20 MHz bandwidth frequency domain resource further includes the following four types of resource units that are respectively located on the left side or the right side of the default resource unit in the center of the 20 MHz bandwidth frequency domain resource, that is:

a 1×26-tone resource unit, a smallest resource unit possibly allocated in the 20 MHz bandwidth, indicating that a resource unit includes one resource subunit (namely, 26 subcarriers);

a 2×26-tone resource unit, indicating that a resource unit includes two resource subunits (namely, 2×26 subcarriers);

a 4×26-tone resource unit, indicating that a resource unit includes four resource subunits (namely, 4×26 subcarriers); and a 242-tone resource unit, a largest resource unit possibly allocated in the 20 MHz bandwidth, indicating that a resource unit includes 242 subcarriers.

The 4×26-tone resource unit includes 106 subcarriers, that is, including 102 data subcarriers and four pilot subcarriers. For avoiding repetition, the following omits descriptions about same or similar cases.

As shown in FIG. 4, to simply describe locations of resource units possibly allocated, an allocation map of the resource units in the 20 MHz bandwidth is drawn or described as four layers.

The first layer is an allocation map of 1×26-tone resource units and the default resource unit (namely, the 1×26-tone resource unit located in the center location of the 20 MHz bandwidth). On the left side and the right side of the default resource unit located in the center, there are four 1×26-tone resource units respectively, namely, resource units located in a resource unit location (hereinafter referred to as a location for short) #7 to a location #10 and a location #11 to a location #14 shown in FIG. 4.

The second layer is an allocation map of 2×26-tone resource units and the default resource unit (namely, the 1×26-tone resource unit located in the center location of the 20 MHz bandwidth). On the left side and the right side of the default resource unit located in the center, there are two 2×26-tone resource units respectively, namely, resource units located in a location #1 to a location #4 shown in FIG. 4.

The third layer is an allocation map of 4×26-tone resource units and the default resource unit (namely, the 1×26-tone resource unit located in the center location of the 20 MHz bandwidth). On the left side and the right side of the default resource unit located in the center, there is one 4×26-tone resource unit respectively, namely, resource units located in a location #5 and a location #6 shown in FIG. 4.

The fourth layer is an allocation map of a 242-tone resource unit. As shown in FIG. 4, the 242-tone resource unit includes the subcarrier in which the aforementioned symmetric center is located.

In an example, the 20 MHz bandwidth frequency domain resource (namely, an example of the to-be-assigned frequency domain resource) includes 242 subcarriers, and may be divided into any resource units at the first layer to the third layer in FIG. 4. The resource units allocated are allocated to multiple users, and only one resource unit allocated can be allocated to each user.

Alternatively, in another example, the 20 MHz bandwidth frequency domain resource may be divided into a resource unit at the fourth layer. In this case, the 20 MHz bandwidth frequency domain resource is allocated to one user, and resource allocation may be indicated by using aftermentioned bandwidth indication information and a single-user transmission indication bit.

In another example, the 20 MHz bandwidth frequency domain resource may be divided into a resource unit at the fourth layer. In this case, the 20 MHz bandwidth frequency domain resource is allocated to multiple users for MU-MIMO, and resource allocation may be indicated by using aftermentioned bandwidth indication information and a multi-user transmission indication bit.

The resource scheduling mode in the present invention mainly relates to a case in which the 20 MHz bandwidth frequency domain resource includes a combination of any resource units at the first layer to the third layer and is allocated to multiple users.

Figure 7:
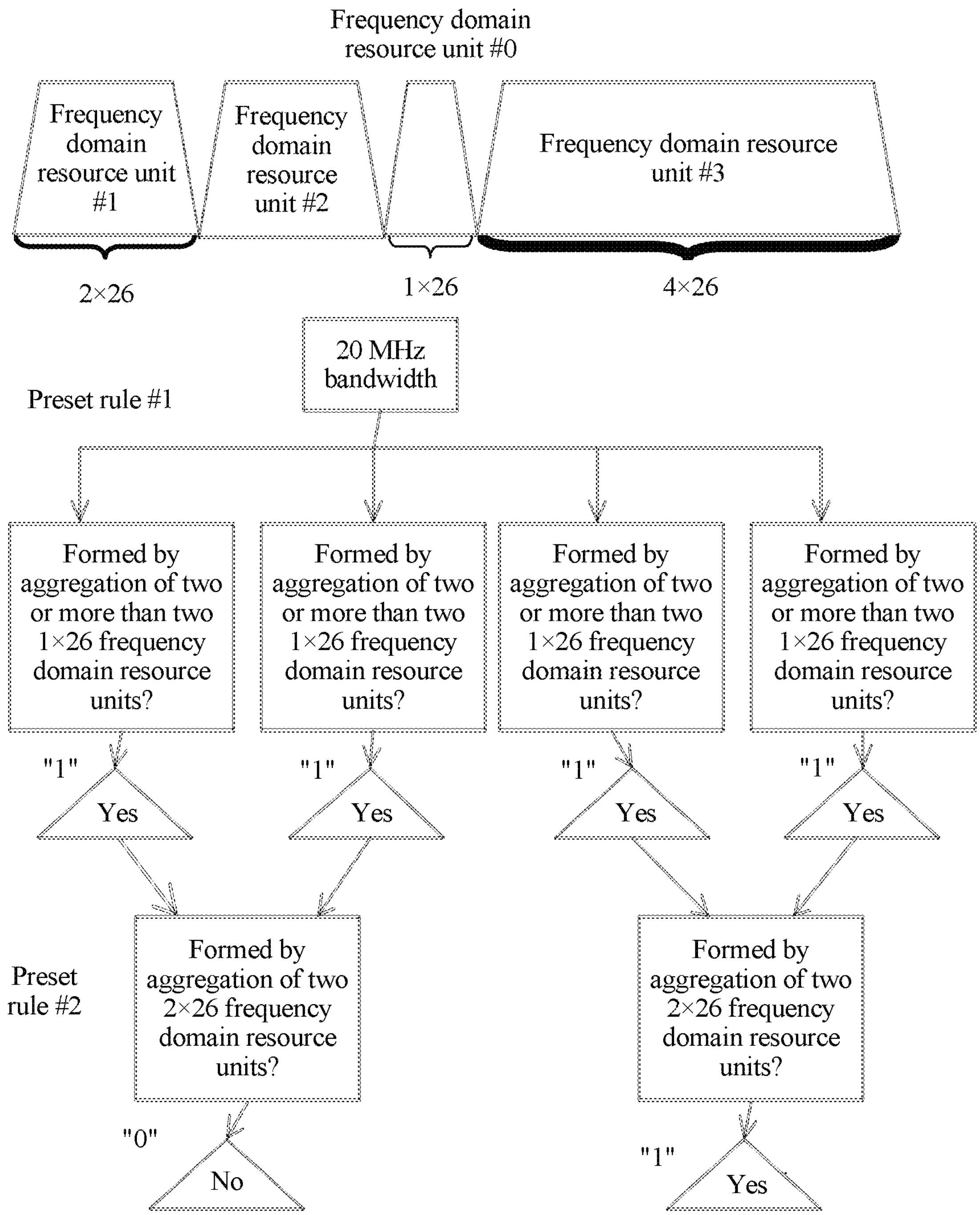
FIG. 7 is a schematic diagram of an example of a bit sequence generation process.

For example, FIG. 7 shows an example of the 20 MHz bandwidth frequency domain resource. As shown in FIG. 7, the frequency domain resource (from left to right in sequence in FIG. 7) is divided into two 2×26-tone resource units (namely, a resource unit #1 and a resource unit #2), one 1×26-tone resource unit (namely, a resource unit #0, which is a default resource unit) and one 4×26-tone resource unit (namely, a resource unit #3).

Figure 8:
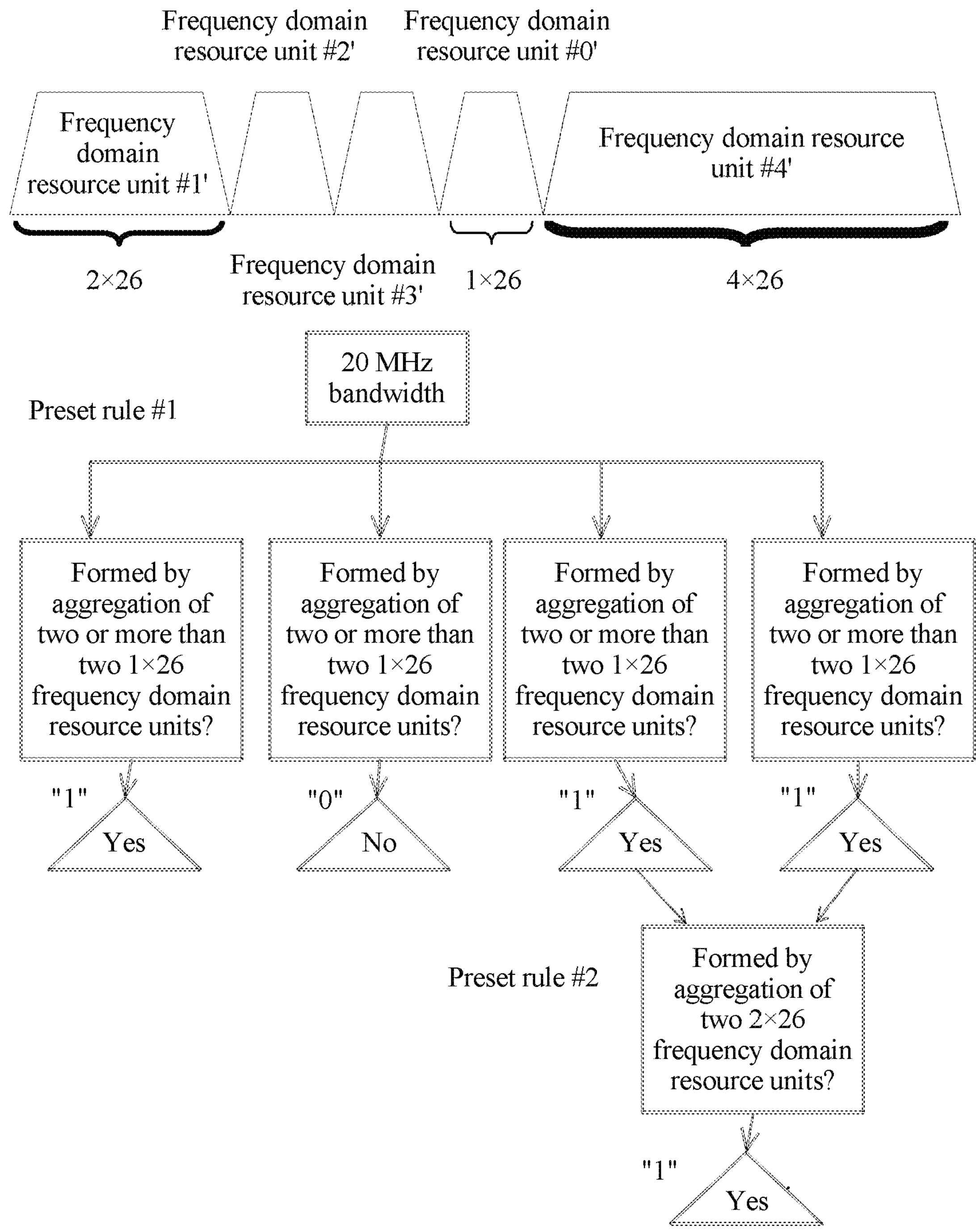
FIG. 8 is a schematic diagram of another example of a bit sequence generation process.

For another example, FIG. 8 shows another example of the 20 MHz bandwidth frequency domain resource. As shown in FIG. 8, the frequency domain resource (from left to right in sequence in FIG. 8) is divided into one 2×26-tone resource unit (namely, a resource unit #1'), three 1×26-tone resource units (namely, a resource unit #2', a resource unit #3', and a resource unit #0', where the resource unit #0' is a default resource unit), and one 4×26-tone resource unit (namely, a resource unit #4').

Optionally, the to-be-assigned frequency domain resource includes a symmetric center.

Specifically, as shown in FIG. 4, the 20 MHz bandwidth frequency domain resource includes a resource unit (namely, the resource unit in the default location) located in the center, and the locations of the resource units on the two sides of the resource unit located in the center are distributed symmetrically, that is, the resource unit located in the center may be used as a symmetric center of the 20 MHz bandwidth frequency domain resource.

2. For a 40 MHz Bandwidth Frequency Domain Resource

It may be considered that the 40 MHz bandwidth frequency domain resource includes two 20 MHz bandwidth frequency domain resources. Correspondingly, either 20 MHz bandwidth frequency domain resource may include a default resource unit located in the center of the 20 MHz bandwidth (namely, a resource unit located in a default location), and the component and the allocation mode of the default resource unit (two default resource units in total) in the 40 MHz bandwidth are similar to the component and the allocation mode of the default resource unit in the 20 MHz bandwidth. Herein for avoiding repetition, a detailed description thereof is omitted.

Optionally, two bits may be to respectively indicate whether the resource units in two default locations in the bandwidth are allocated to users for use. In addition to the default resource units located in the default locations, the 40 MHz bandwidth frequency domain resource further includes the following five types of resource units that are respectively located on a left side or a right side of a center frequency of the 40 MHz bandwidth frequency domain resource, that is:

a 1×26-tone resource unit, a smallest resource unit possibly allocated in the 40 MHz bandwidth, indicating that a resource unit includes one resource subunit (namely, 26 subcarriers);

a 2×26-tone resource unit, indicating that a resource unit includes two resource subunits (namely, 2×26 subcarriers);

a 4×26-tone resource unit, indicating that a resource unit includes four resource subunits (namely, 4×26 subcarriers);

a 242-tone resource unit, indicating that a resource unit includes 242 subcarriers; and 2×242, a largest resource unit possibly allocated in the 40 MHz bandwidth, indicating that a resource unit includes 2×242 subcarriers.

Figure 5:
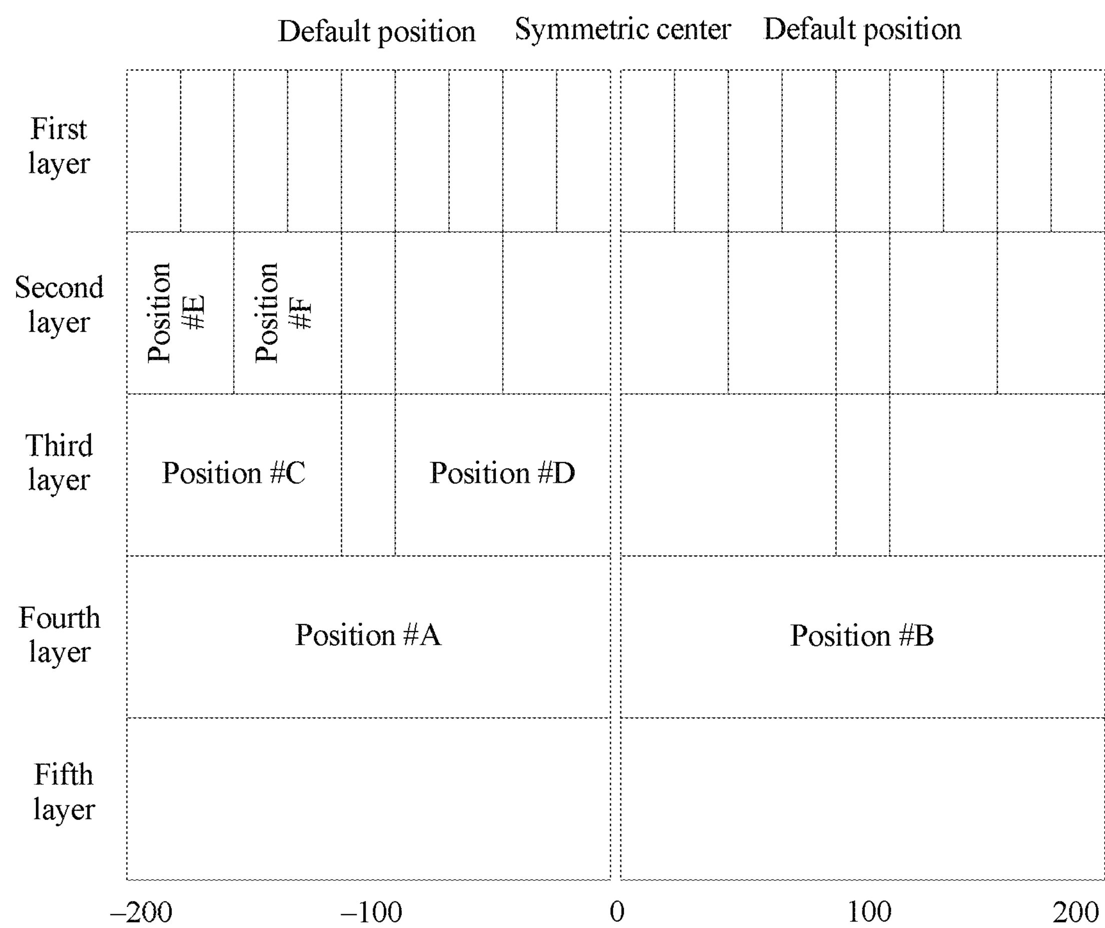
FIG. 5 is a schematic diagram of allocation locations of resource units in a 40 MHz bandwidth.

As shown in FIG. 5, to simply describe locations of resource units possibly allocated, an allocation map of the resource units in the 40 MHz bandwidth is drawn or described as five layers.

The first layer is an allocation map of 1×26-tone resource units and the default resource units (namely, the 1×26-tone resource unit located in the center location of either 20 MHz bandwidth). On a left side and a right side of either default resource unit, there are four 1×26-tone resource units respectively. Allocation of eight 1×26-tone resource units in either 20 MHz bandwidth is similar to allocation of 1×26-tone resource units shown at the first layer in FIG. 4. Herein for avoiding repetition, a detailed description thereof is omitted.

The second layer is an allocation map of 2×26-tone resource units and the default resource units (namely, the 1×26-tone resource unit located in the center location of either 20 MHz bandwidth). On the left side and the right side of either default resource unit, there are two 2×26-tone resource units respectively (for example, a location #E and a location #F in FIG. 5). Allocation of four 2×26-tone resource units in either 20 MHz bandwidth is similar to allocation of 1×26-tone resource units shown at the second layer in FIG. 4. Herein for avoiding repetition, a detailed description thereof is omitted.

The third layer is an allocation map of 4×26-tone resource units and the default resource units (namely, the 1×26-tone resource unit located in the center location of either 20 MHz bandwidth). On the left side and the right side of either default resource unit, there is one 4×26-tone resource unit respectively (for example, a location #C and a location #D in FIG. 5). Allocation of the 4×26-tone resource units in either 20 MHz bandwidth is similar to allocation of 4×26-tone resource units shown at the third layer in FIG. 4. Herein for avoiding repetition, a detailed description thereof is omitted.

The fourth layer is an allocation map of 242-tone resource units. On the left side and the right side of the center frequency (namely, a subcarrier 0) of the 40 MHz, there is one 242-tone resource unit respectively, that is, resource units located in a location #A and a location #B shown in FIG. 5.

The fifth layer is an allocation map of a 2×242-tone resource unit.

In an example, the 40 MHz bandwidth frequency domain resource (namely, an example of the to-be-assigned frequency domain resource) includes 484 subcarriers, and may be divided into any resource units at the first layer to the fourth layer in FIG. 5. The resource units allocated are allocated to multiple users, and only one resource unit allocated can be allocated to each user.

Alternatively, in another example, the 40 MHz bandwidth frequency domain resource may be divided into a resource unit at the fifth layer. In this case, the 40 MHz bandwidth frequency domain resource is allocated to one user, and resource allocation may be indicated by using aftermentioned bandwidth indication information and a single-user transmission indication bit.

In another example, the 40 MHz bandwidth frequency domain resource may be divided into a resource unit at the fifth layer. In this case, the 40 MHz bandwidth frequency domain resource is allocated to multiple users for MU-MIMO, and resource allocation may be indicated by using aftermentioned bandwidth indication information and a multi-user transmission indication bit.

The resource scheduling mode in the present invention mainly relates to a case in which the 40 MHz bandwidth frequency domain resource includes a combination of any resource units at the first layer to the fourth layer and is allocated to multiple users.

Figure 10:
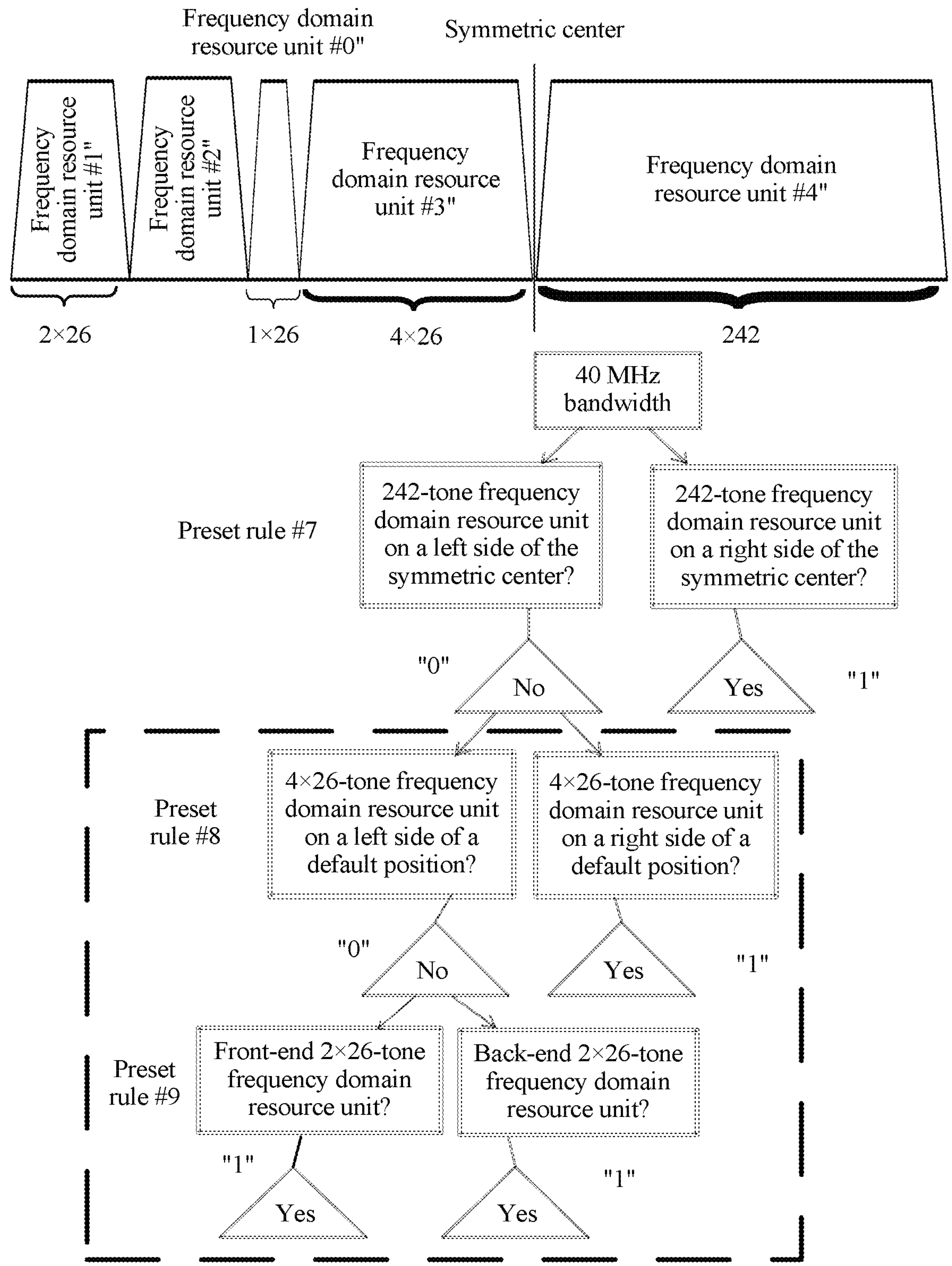
FIG. 10 is a schematic diagram of still another example of a bit sequence generation process.

For example, FIG. 10 shows an example of the 40 MHz bandwidth frequency domain resource. As shown in FIG. 10, the frequency domain resource (from left to right in sequence in FIG. 10) is divided into two 2×26-tone resource units (namely, a resource unit #1" and a resource unit #2"), one 1×26-tone resource unit (namely, a resource unit #0", which is a default resource unit), one 4×26-tone resource unit (namely, a resource unit #3"), and one 242-tone resource unit (namely, a resource unit #4").

Optionally, the to-be-assigned frequency domain resource includes a symmetric center.

Specifically, as shown in FIG. 5, locations of various resource units on the two sides of the center frequency of the 40 MHz bandwidth frequency domain resource are distributed symmetrically, that is, the center frequency may be used as a symmetric center of the 40 MHz bandwidth frequency domain resource.

3. For an 80 MHz Bandwidth Frequency Domain Resource

Optionally, the locations of the resource units possibly allocated for the to-be-assigned frequency domain resource include a default location(s), and a resource unit(s) corresponding to the default location is a resource unit that is not indicated by the bit sequence, as may be predefined by the next generation protocol.

Optionally, five bits may be to respectively indicate whether resource units in five default locations in the bandwidth are allocated to users for use.

Figure 6:
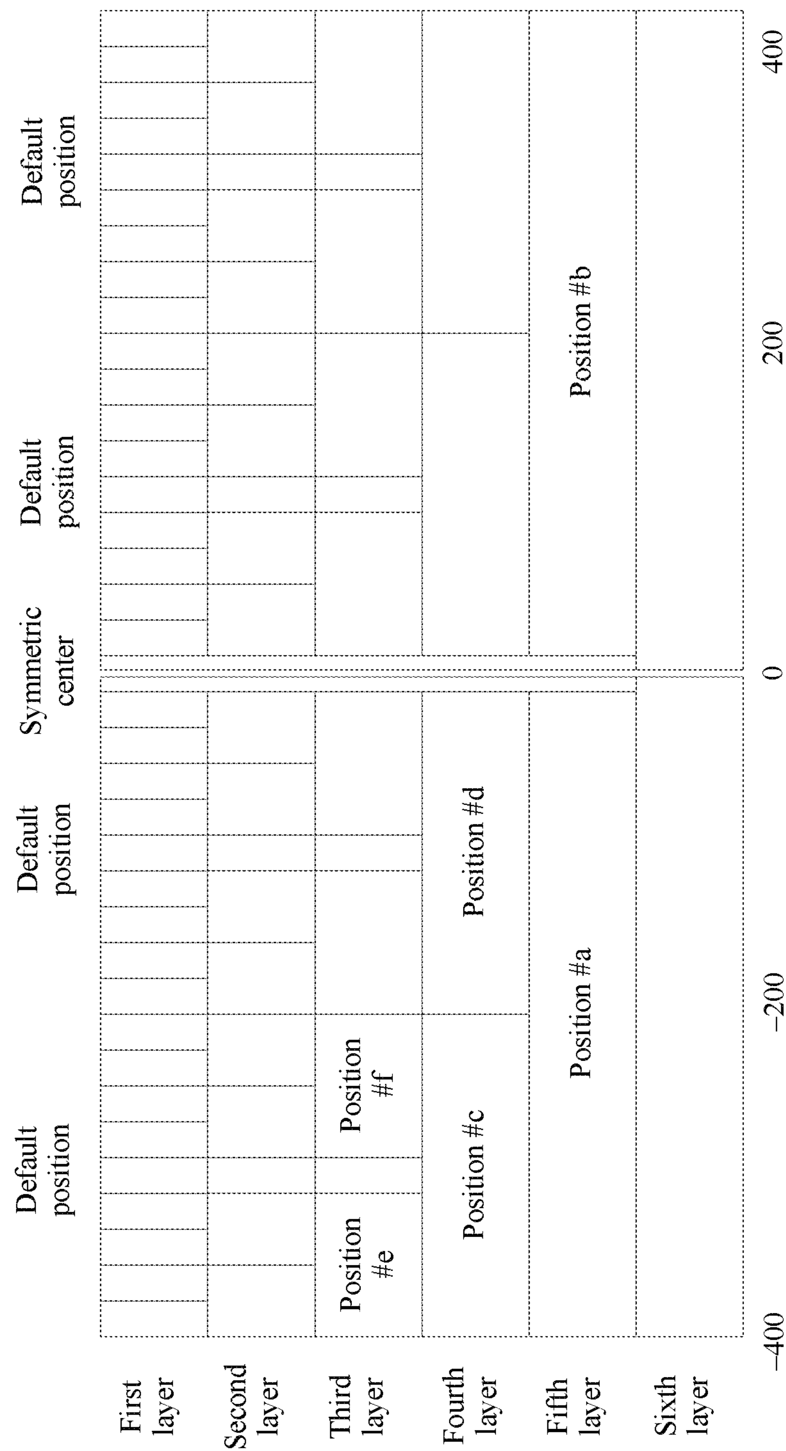
FIG. 6 is a schematic diagram of allocation locations of resource units in an 80 MHz bandwidth.

Specifically, as shown in FIG. 6, the 80 MHz bandwidth frequency domain resource may include a default resource unit located in the center (that is, a resource unit located in a default location), and the default resource unit may be a 1×26-tone resource unit, namely, a cross-DC (namely, subcarriers −1, 0, and 1) resource unit including 26 subcarriers. The default resource unit exists in the communications system by default and is allocated independently, that is, in each to-be-assigned resource with an 80 MHz bandwidth, a default 1×26-tone resource unit is allocated from a center location of the resource. The default resource unit is allocated independently to a receiving end. The receiving end to which the default resource unit is allocated may be the same as or different from a receiving end to which an adjacent resource unit on a left side or a right side of the default resource unit is allocated. This is not particularly limited in the present invention. For the 80 MHz bandwidth, when the receiving end to which the default resource unit is allocated is the same as the receiving end to which the adjacent resource unit on the left side or the right side of the default resource unit is allocated, it indicates that the 80 MHz bandwidth is allocated to only one user. Otherwise, the receiving end to which the default resource unit is allocated is different from the receiving end to which the adjacent resource unit on the left side or the right side of the default resource unit is allocated.

Moreover, it may be considered that the 80 MHz bandwidth frequency domain resource includes two 40 MHz bandwidth frequency domain resources and the default resource unit located in the symmetric center, and it may be considered that either 40 MHz bandwidth frequency domain resource includes two 20 MHz frequency domain resources. Correspondingly, each 20 MHz bandwidth frequency domain resource may include a default resource unit located in a center of the 20 MHz bandwidth (namely, a resource unit located in a default location).

In addition to the default resource units located in the default locations, the 80 MHz bandwidth frequency domain resource further includes the following six types of resource units that are respectively located on the left side or the right side of the default resource unit in the center of the 80 MHz bandwidth frequency domain resource, that is:

a 1×26-tone resource unit, a smallest resource unit possibly allocated in the 80 MHz bandwidth, indicating that a resource unit includes one resource subunit (namely, 26 subcarriers);

a 2×26-tone resource unit, indicating that a resource unit includes two resource subunits (namely, 2×26 subcarriers);

a 4×26-tone resource unit, indicating that a resource unit includes four resource subunits (namely, 4×26 subcarriers);

a 242-tone resource unit, indicating that a resource unit includes 242 subcarriers;

a 2×242-tone resource unit, indicating that a resource unit includes 2×242 subcarriers; and a 996-tone resource unit, a largest resource unit possibly allocated in the 80 MHz bandwidth, indicating that a resource unit includes 996 subcarriers.

To simply describe locations of resource units possibly allocated, an allocation map of the resource units in the 40 MHz bandwidth is drawn or described as six layers.

The first layer is an allocation map of 1×26-tone resource units and the default resource units (namely, the 1×26-tone resource unit located in the center location of each 20 MHz bandwidth and the 1×26-tone resource unit located in the center of the 80 MHz bandwidth). On a left side and a right side of the default resource unit in the center location of each 20 MHz bandwidth, there are four 1×26-tone resource units respectively. Allocation of 1×26-tone resource units in each 20 MHz bandwidth is similar to allocation of 1×26-tone resource units shown at the first layer in FIG. 4. Herein for avoiding repetition, a detailed description thereof is omitted.

The second layer is an allocation map of 2×26-tone resource units and the default resource units (namely, the 1×26-tone resource unit located in the center location of each 20 MHz bandwidth and the 1×26-tone resource unit located in the center location of the 80 MHz bandwidth). On the left side and the right side of the default resource unit in the center location of each 20 MHz bandwidth, there are two 2×26-tone resource units respectively. Allocation of 2×26-tone resource units in each 20 MHz bandwidth is similar to allocation of 2×26-tone resource units shown at the second layer in FIG. 4. Herein for avoiding repetition, a detailed description thereof is omitted.

The third layer is an allocation map of 4×26-tone resource units and the default resource units (namely, the 1×26-tone resource unit located in the center location of each 20 MHz bandwidth and the 1×26-tone resource unit located in the center location of the 80 MHz bandwidth). On the left side and the right side of the default resource unit in the center location of each 20 MHz bandwidth, there is one 4×26-tone resource unit respectively (for example, a location #e and a location #f in FIG. 6). Allocation of 4×26-tone resource units in each 20 MHz bandwidth is similar to allocation of 4×26-tone resource units shown at the third layer in FIG. 4. Herein for avoiding repetition, a detailed description thereof is omitted.

The fourth layer is an allocation map of 242-tone resource units and an allocation map of a default resource unit (namely, the 1×26-tone resource unit located in the center location of the 80 MHz bandwidth). On a left side and a right side of a center frequency of either 40 MHz bandwidth, there is one 242-tone resource unit respectively, namely, resource units located in a location #c and a location #d shown in FIG. 6. Allocation of 242-tone resource units in either 40 MHz bandwidth is similar to allocation of 242-tone resource units shown at the fourth layer in FIG. 5. Herein for avoiding repetition, a detailed description thereof is omitted.

The fifth layer is an allocation map of 2×242-tone resource units and an allocation map of a default resource unit (namely, the 1×26-tone resource unit located in the center location of the 80 MHz bandwidth). On the left side and the right side of the default resource unit located in the center location of the 80 MHz, there is one 242-tone resource unit respectively, namely, resource units located in a location #a and a location #b shown in FIG. 6. Allocation of the 242-tone resource unit in either 40 MHz bandwidth is similar to allocation of the 242-tone resource unit shown at the fifth layer in FIG. 5. Herein for avoiding repetition, a detailed description thereof is omitted.

The sixth layer is an allocation map of a 996-tone resource unit.

In an example, the 80 MHz bandwidth frequency domain resource (namely, an example of the to-be-assigned frequency domain resource) includes 996 subcarriers, and may be divided into any resource units at the first layer to the fifth layer in FIG. 6. The resource units allocated are allocated to multiple users, and only one resource unit allocated can be allocated to each user.

Alternatively, in another example, the 80 MHz bandwidth frequency domain resource may be divided into a resource unit at the sixth layer. In this case, the 80 MHz bandwidth frequency domain resource is allocated to one user, and resource allocation may be indicated by using aftermentioned bandwidth indication information and a single-user transmission indication bit.

In another example, the 80 MHz bandwidth frequency domain resource may be divided into a resource unit at the sixth layer. In this case, the 80 MHz bandwidth frequency domain resource is allocated to multiple users for MU-MIMO, and resource allocation may be indicated by using aftermentioned bandwidth indication information and a multi-user transmission indication bit.

The resource scheduling mode in the present invention mainly relates to a case in which the 80 MHz bandwidth frequency domain resource includes a combination of any resource units at the first layer to the fifth layer and is allocated to multiple users.

Figure 11:
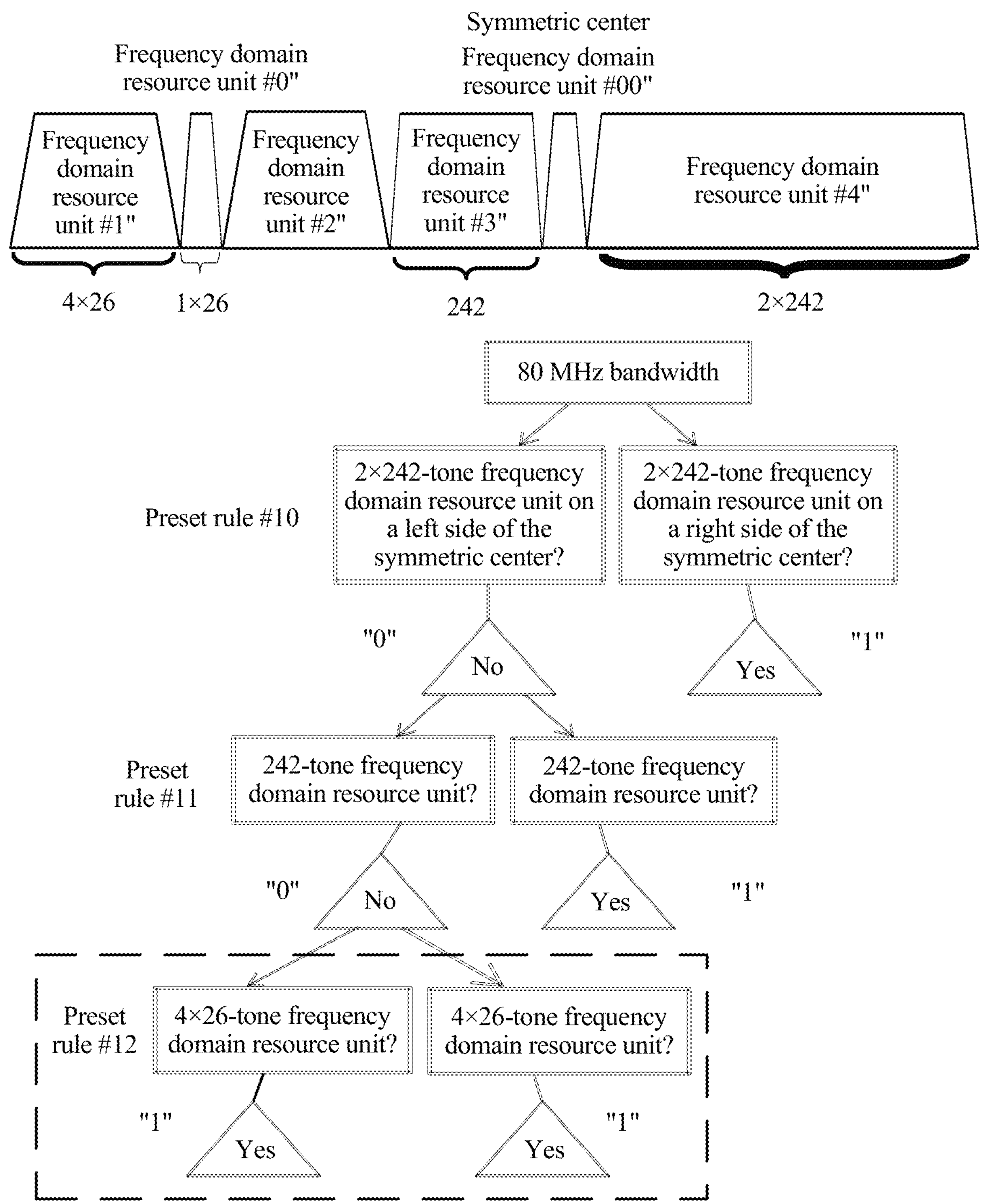
FIG. 11 is a schematic diagram of still another example of a bit sequence generation process.

For example, FIG. 11 shows an example of the 80 MHz bandwidth frequency domain resource. As shown in FIG. 11, the frequency domain resource (from left to right in sequence in FIG. 11) is divided into one 4×26-tone resource unit (namely, a resource unit #1'''), one 1×26-tone resource unit (namely, a resource unit #0''', which is a default resource unit), one 4×26-tone resource unit (namely, a resource unit #2'''), one 242-tone resource unit (namely, a resource unit #3'''), one 1×26-tone resource unit (namely, a resource unit #00''', which is a default resource unit), and one 2×242-tone resource unit (namely, a resource unit #4''').

Optionally, the to-be-assigned frequency domain resource includes a symmetric center.

Specifically, as shown in FIG. 4, the 80 MHz bandwidth frequency domain resource includes a resource unit (namely, the resource unit in the default location) located in the center, and the locations of the resource units on the two sides of the resource unit located in the center are distributed symmetrically, that is, the resource unit located in the center may be used as a symmetric center of the 80 MHz bandwidth frequency domain resource.

4. For a 160 MHz Bandwidth Frequency Domain Resource

It may be considered that the 160 MHz bandwidth frequency domain resource includes two 80 MHz frequency domain resources. Correspondingly, either 80 MHz bandwidth frequency domain resource may include a default resource unit (namely, a resource unit located in a default location) located in the center of the 80 MHz bandwidth, and each 20 MHz bandwidth frequency domain resource in the 160 MHz frequency domain resource may include a default resource unit located in the center of the 20 MHz bandwidth (namely, a resource unit located in a default location).

Optionally, 10 bits may be to respectively indicate whether resource units in 10 default locations in the bandwidth are allocated to users for use.

In addition to the default resource units located in the default locations, the 160 MHz bandwidth frequency domain resource further includes the following seven types of resource units that are respectively located on a left side or a right side of a center frequency of the 160 MHz bandwidth frequency domain resource, that is:

a 1×26-tone resource unit, a smallest resource unit possibly allocated in the 80 MHz bandwidth, indicating that a resource unit includes one resource subunit (namely, 26 subcarriers);

a 2×26-tone resource unit, indicating that a resource unit includes two resource subunits (namely, 2×26 subcarriers);

a 4×26-tone resource unit, indicating that a resource unit includes four resource subunits (namely, 4×26 subcarriers);

a 242-tone resource unit, indicating that a resource unit includes 242 subcarriers;

a 2×242-tone resource unit, indicating that a resource unit includes 2×242 subcarriers;

a 996-tone resource unit, indicating that a resource unit includes 996 subcarriers; and a 2×996-tone resource unit, a largest resource unit possibly allocated in the 160 MHz bandwidth, indicating that a resource unit includes 2×996 subcarriers.

To simply describe locations of resource units possibly allocated, an allocation map of the 160 MHz bandwidth resource unit is drawn or described as seven layers.

The first layer is an allocation map of 1×26-tone resource units and the default resource units (namely, the 1×26-tone resource unit located in the center location of each 20 MHz bandwidth and the 1×26-tone resource unit located in the center location of either 80 MHz bandwidth). On a left side and a right side of the default resource unit in the center location of each 20 MHz bandwidth, there are four 1×26-tone resource units respectively. Allocation of 1×26-tone resource units in each 20 MHz bandwidth is similar to allocation of 1×26-tone resource units shown at the first layer in FIG. 4. Herein for avoiding repetition, a detailed description thereof is omitted.

The second layer is an allocation map of 2×26-tone resource units and the default resource units (namely, the 1×26-tone resource unit located in the center location of each 20 MHz bandwidth and the 1×26-tone resource unit located in the center location of either 80 MHz bandwidth). On the left side and the right side of the default resource unit in the center location of each 20 MHz bandwidth, there are two 2×26-tone resource units respectively. Allocation of 2×26-tone resource units in each 20 MHz bandwidth is similar to allocation of 2×26-tone resource units shown at the second layer in FIG. 4. Herein for avoiding repetition, a detailed description thereof is omitted.

The third layer is an allocation map of 4×26-tone resource units and the default resource units (namely, the 1×26-tone resource unit located in the center location of each 20 MHz bandwidth and the 1×26-tone resource unit located in the center location of either 80 MHz bandwidth). On the left side and the right side of the default resource unit in the center location of each 20 MHz bandwidth, there is one 4×26-tone resource unit respectively. Allocation of 4×26-tone resource units in each 20 MHz bandwidth is similar to allocation of 4×26-tone resource units shown at the third layer in FIG. 4. Herein for avoiding repetition, a detailed description thereof is omitted.

The fourth layer is an allocation map of 242-tone resource units and an allocation map of default resource units (namely, the 1×26-tone resource unit located in the center location of either 80 MHz bandwidth). On a left side and a right side of a center frequency of either 40 MHz, there is one 242-tone resource unit respectively. Allocation of 242-tone resource units in either 40 MHz bandwidth is similar to allocation of 242-tone resource units shown at the fourth layer in FIG. 5. Herein for avoiding repetition, a detailed description thereof is omitted.

The fifth layer is an allocation map of 2×242-tone resource units and an allocation map of default resource units (namely, the 1×26-tone resource unit located in the center location of either 80 MHz bandwidth). On a left side and a right side of the default resource unit located in the center location of the 80 MHz, there is one 242-tone resource unit respectively. Allocation of the 242-tone resource unit in each 40 MHz bandwidth is similar to allocation of the 242-tone resource unit shown at the fifth layer in FIG. 5. Herein for avoiding repetition, a detailed description thereof is omitted.

The sixth layer is an allocation map of 996-tone resource units and an allocation map of default resource units (namely, the 1×26-tone resource unit located in the center location of each 80 MHz bandwidth). On the left side and the right side of the center frequency of the 160 MHz, there is one 996-tone resource unit respectively. Allocation of the 242-tone resource unit in either 80 MHz bandwidth is similar to allocation of the 996-tone resource unit shown at the sixth layer in FIG. 6. Herein for avoiding repetition, a detailed description thereof is omitted.

The seventh layer is an allocation map of a 2×996-tone resource unit.

In an example, the 160 MHz bandwidth frequency domain resource (namely, an example of the to-be-assigned frequency domain resource) includes 2×996 subcarriers, and may be divided into any resource units at the first layer to the sixth layer. The resource units allocated are allocated to multiple users, and only one resource unit allocated can be allocated to each user.

Alternatively, in another example, the 160 MHz bandwidth frequency domain resource may be divided into a resource unit at the seventh layer. In this case, the 160 MHz bandwidth frequency domain resource is allocated to one user, and resource allocation may be indicated by using aftermentioned bandwidth indication information and a single-user transmission indication bit.

In another example, the 160 MHz bandwidth frequency domain resource may be divided into a resource unit at the seventh layer. In this case, the 160 MHz bandwidth frequency domain resource is allocated to multiple users for MU-MIMO, and resource allocation may be indicated by using aftermentioned bandwidth indication information and a multi-user transmission indication bit.

The resource scheduling mode in the present invention mainly relates to a case in which the 160 MHz bandwidth frequency domain resource includes a combination of any resource units at the first layer to the sixth layer and is allocated to multiple users.

Optionally, the to-be-assigned frequency domain resource includes a symmetric center.

Specifically, as shown in FIG. 4, locations of various resource units on the left side and the right side of the center frequency of the 160 MHz bandwidth frequency domain resource are distributed symmetrically, that is, the center frequency may be used as a symmetric center of the 160 MHz bandwidth frequency domain resource.

The foregoing illustrates locations of resource units possibly allocated from a to-be-assigned frequency domain resource. The following describes in detail a process of generating resource scheduling information based on locations of resource units possibly allocated.

In this embodiment, a sending end needs to perform resource scheduling, for example, notify, by using resource scheduling information, a receiving end (the quantity of the receiving ends may be one or more) of a resource unit corresponding to the receiving end, so that the receiving end performs transmission by using the resource unit.

The sending end may notify the following information to each receiving end in the system by using a bit sequence, or, a bitmap: An allocation of resource units in the current to-be-assigned frequency domain resource. The allocation of resource units comprises: on the one hand, a quantity of subcarriers included in each resource unit allocated, i.e. a size of each resource unit allocated. the allocation of resource units also comprises: on the other hand, a location of each allocated resource unit in the to-be-assigned frequency domain resource. In the following embodiments, a simplified indication for the allocation of resource unit is provided, based on the protocol-predefined resource units possibly allocated for each bandwidth; for example, based on the predefined quantity and location of each resource unit with each size in each bandwidth. Correspondingly, a receiving end may determine each resource unit allocated by the sending end, based on the above mentioned information. Combined with the information about the scheduled receiving end, the receiving end may perform subsequent information communication on a corresponding scheduled resource unit.

Each of the following embodiments provides a solution for efficiently indicating allocation of resource units in the to-be-assigned frequency domain resource (bandwidth).

Embodiment 1

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location. Specifically, referring to FIG. 7 and FIG. 8, FIG. 7 and FIG. 8 are a simple schematic diagram of a resource unit allocation result and a schematic diagram of a corresponding bit sequence to indicate to-be-assigned resource units allocated.

For various bandwidths (only 20 MHz is illustrated in the figures, but this includes and is not limited to 40 MHz, 80 MHz, and 160 MHz), the bit sequence includes at least multiple (two or more) type-1 bits. The type-1 bits are to indicate whether locations of two contiguous smallest resource units (1×26) possibly allocated and located on one side of a default location (namely, a location in which a default resource unit is located) in the to-be-assigned frequency domain resource, are distributed in a same to-be-assigned resource unit.

Herein, as shown in FIG. 4 to FIG. 6, at the first layer of each bandwidth, there are four 1×26 resource unit locations on one side of a default location in each 20 MHz bandwidth. One side of a default location may include two resource unit location pairs. Each resource unit location pair may include two contiguous 1×26 resource unit locations, and each 1×26 resource unit location belongs to and only belongs to one resource unit location pair.

It should be noted that, according to the foregoing description, there may be multiple default locations in different bandwidths. If there are multiple default locations, one side of the default locations refers to band resources between two default locations.

Optionally, the method may further include: when two contiguous type-1 bits both indicate allocation in a same to-be-assigned resource unit, the bit sequence further includes multiple (two or more) type-4 bits, and the type-4 bits are to indicate whether locations of two contiguous second smallest resource units (locations of 2×26-tone resource units) are distributed in a same resource unit.

In different bandwidths, only a type-1 bit may be included. Except for a type-1 bit indication, other manners may be to indicate allocation of resource units according to the foregoing indication principle, until allocation of all resource units is indicated. It can be seen that, for a larger bandwidth, more bits are required to indicate allocation of all resource units.

Optionally, the resource scheduling information further includes first indication information to indicate the to-be-assigned frequency domain resource.

Using the manner shown in FIG. 7 or FIG. 8 as an example, the first indication information to indicate that the to-be-assigned frequency domain resource is 20 MHz, and the bit sequence includes at least four type-1 bits. Each bit corresponds to two 1×26 resource unit locations arranged in sequence from left to right, and is to indicate whether the two 1×26 resource unit locations are distributed in a same to-be-assigned resource unit.

Preferably, the solution further includes type-4 bits.

When a bit #1 and a bit #2 in the four bits both indicate that the two 1×26 resource units are distributed in a same to-be-assigned resource unit, the bit sequence further includes a bit #5, to indicate whether the 2×26 resource unit locations corresponding to the bit #1 and bit #2 are distributed in a same to-be-assigned resource unit; or when a bit #3 and a bit #4 in the four bits both indicate that the two 1×26 resource units are distributed in a same to-be-assigned resource unit, the bit sequence further includes a bit #6, to indicate whether the 2×26 resource unit locations corresponding to the bit #3 and bit #4 are distributed in a same to-be-assigned resource unit.

In addition, if two consecutive bits (for example, the bit #1 and the bit #2, or the bit #3 and the bit #4) in the four bits indicate that the two 1×26 resource units are not distributed in a same to-be-assigned resource unit, no type-4 bit is required.

It may be understood that, in different bandwidths, a type-1 bit may be included. Except for a type-1 bit indication, other manners may be to indicate allocation of other resource units according to the foregoing indication principle. Other bits are to indicate whether a to-be-assigned resource unit allocated is in locations of two contiguous second smallest resource units possibly allocated, until allocation of all resource units is indicated. For 40 MHz, 80 MHz, and 160 MHz bandwidths, a preferred manner is to only indicate whether locations of two contiguous smallest resource units (1×26) possibly allocated and located on one side of a default location (namely, a location in which a default resource unit is located) in the to-be-assigned frequency domain resource are distributed in a same to-be-assigned resource unit, or to only indicate whether a to-be-assigned resource unit allocated is in locations of two contiguous smallest resource units possibly allocated or locations of two contiguous second smallest resource units possibly allocated. For a location of a larger resource unit, other possible implementation manners are used for indicating.

Embodiment 2

Optionally, the bit sequence includes multiple type-2 bits, and the type-2 bit is to indicate whether a largest resource unit on one side of the symmetric center is in the actual allocation.

Figure 9:
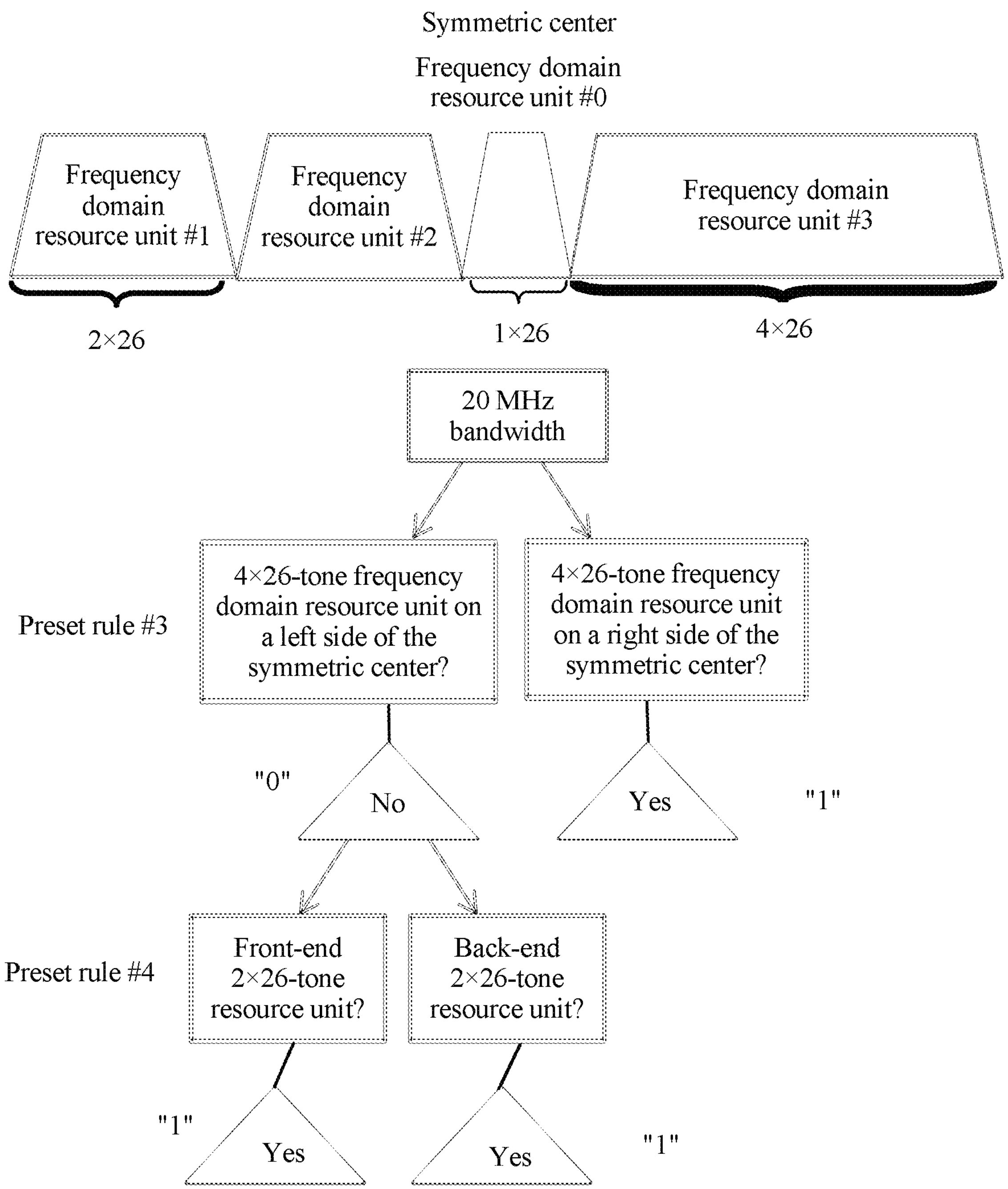
FIG. 9 is a schematic diagram of still another example of a bit sequence generation process.

Referring to FIG. 9, FIG. 10, and FIG. 11, FIG. 9, FIG. 10, and FIG. 11 are a simple schematic diagram of a resource unit allocation result and a schematic diagram of a corresponding bit sequence to indicate to-be-assigned resource units allocated.

For various bandwidths (cases of 20 MHz, 40 MHz, and 80 MHz are shown in the figures separately, but this also includes and is applicable to 160 MHz), the bit sequence includes at least multiple (two or more) type-2 bits. The type-2 bits are to indicate, when the to-be-assigned frequency domain resource is allocated to multiple users, whether the largest resource unit on one side of the symmetric center in the to-be-assigned frequency domain resource is in the actual allocation. As known from the foregoing description, in various bandwidths, there are different locations of largest resource units located on one side of the symmetric center. For example, if the to-be-assigned frequency domain resource is 20 MHz, a location of a largest resource unit possibly allocated is a location of a 4×26-tone resource unit; for another example, if the to-be-assigned frequency domain resource is 40 MHz, a location of a largest resource unit possibly allocated is a location of a 242-tone resource unit; for another example, if the to-be-assigned frequency domain resource is 80 MHz, a location of a largest resource unit possibly allocated is a location of a 2×242-tone resource unit; for another example, if the to-be-assigned frequency domain resource is 160 MHz, a location of a largest resource unit possibly allocated is a location of a 996-tone resource unit.

Optionally, the method may further include: when a certain type-2 bit indicates that the largest resource unit possibly allocated is not in the actual allocation, a type-5 bit is further included. In a range of the resource unit location indicated by the type-2 bit, the type-5 bit is to indicate whether the second largest resource unit possibly allocated on one side of the symmetric center is in the actual allocation.

In different bandwidths, it may only include a type-2 bit. Except for a type-2 bit indication, other manners may be to indicate allocation of other resource units. It may also, according to the foregoing indication principle, use other bits to indicate whether the third largest resource unit is an actually allocated resource unit, until allocation of all resource units is indicated.

For 40 MHz, 80 MHz, and 160 MHz, a preferred manner is: to only indicate whether the largest resource unit possibly allocated on one side of the symmetric center is an actually allocated resource unit, or to only indicate whether the location of a largest resource unit and the second largest resource units possibly allocated are actually allocated resource units; for the location of a smaller resource unit(s), other possible implementation manners may be used for indicating.

Optionally, the resource scheduling information further includes first indication information to indicate the to-be-assigned frequency domain resource.

Using the manner shown in FIG. 9 as an example, the first indication information to indicate the to-be-assigned frequency domain resource is 20 MHz. The bit sequence includes at least two bits (namely, an example of the type-2 bits), and a bit #A and a bit #B in the at least two bits are respectively to indicate whether a 4×26-tone resource unit location on the left side or the right side of the symmetric center (namely, a default location in the 20 MHz bandwidth) of the 20 MHz bandwidth is actually allocated. Certainly, the bit #A may indicate the right side and the bit #B indicates the left side. Principles thereof are consistent and are not described again.

Preferably, the example in FIG. 9 may further include:

when the bit #A in the type-2 bits indicates that the the 4×26-tone resource unit location is not actually allocated, the bit sequence may further include a bit #C and a bit #D. The bit #C is to indicate whether front-end 2×26-tone resource unit locations corresponding to the bit #A are allocated in a same to-be-assigned resource unit, and the bit #D is to indicate whether the to-be-assigned resource unit allocated is in a back-end 2×26-tone resource unit location corresponding to the bit #A; or when the bit #B in the type-2 bits indicates that 4×26-tone resource unit location is not actually allocated, the bit sequence further includes a bit #E and a bit #F. The bit #E is to indicate whether the front-end 2×26-tone resource unit locations corresponding to the bit #B are allocated in a same to-be-assigned resource unit, and the bit #F is to indicate whether the back-end 2×26-tone resource unit location corresponding to the bit #B are actually allocated.

Using the manner shown in FIG. 10 as an example, the first indication information to indicate that the to-be-assigned frequency domain resource is 40 MHz. The bit sequence includes at least two bits (namely, another example of the type-2 bits), and a bit #A' and a bit #B' in the at least two bits are respectively to indicate whether a 242-tone resource unit location on the left side or the right side of the symmetric center (namely, a center frequency in the 40 MHz bandwidth) of the 40 MHz bandwidth, is actually allocated. Certainly, the bit #A' may indicate the right side and the bit #B' indicates the left side. Principles thereof are consistent and are not described again.

If the the 242-tone resource unit location is not actually allocated, other manners may also be used for continuing with the indication, without being limited to this implementation manner.

Using the manner shown in FIG. 11 as an example, the first indication information to indicate that the to-be-assigned frequency domain resource is 80 MHz. The bit sequence includes at least two bits (namely, still another example of the type-2 bits), and a bit #A" and a bit #B" in the at least two bits are respectively to indicate whether a 2×242-tone resource unit location on the left side or the right side of the symmetric center (namely, a default location in the center of the 80 MHz bandwidth) of the 80 MHz bandwidth, is actually allocated. Certainly, the bit #A" may indicate the right side and the bit #B" indicates the left side. Principles thereof are consistent and are not described again.

If the the 2×242 resource unit location is not actually allocated, this implementation manner may continue to be to indicate whether a 242 resource unit location in the range of the 2×242 resource unit location is actually allocated. For subsequent resource units, other manners may continue to be used for indicating, without being limited to this implementation manner.

For 160 MHz or other bandwidths, similarly, refer to the foregoing solution.

Embodiment 3

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Figure 12:
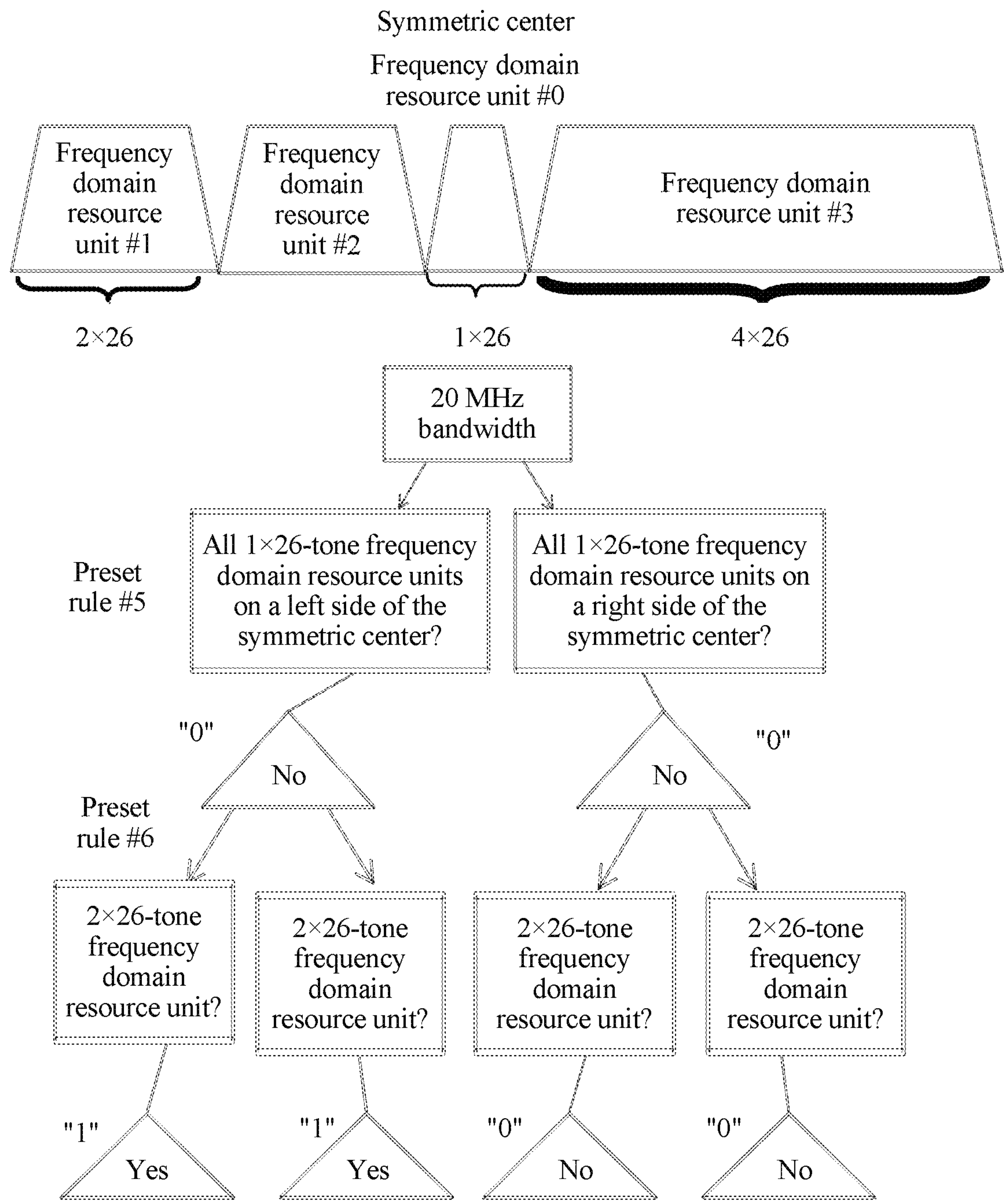
FIG. 12 is a schematic diagram of still another example of a bit sequence generation process.
Figure 13:
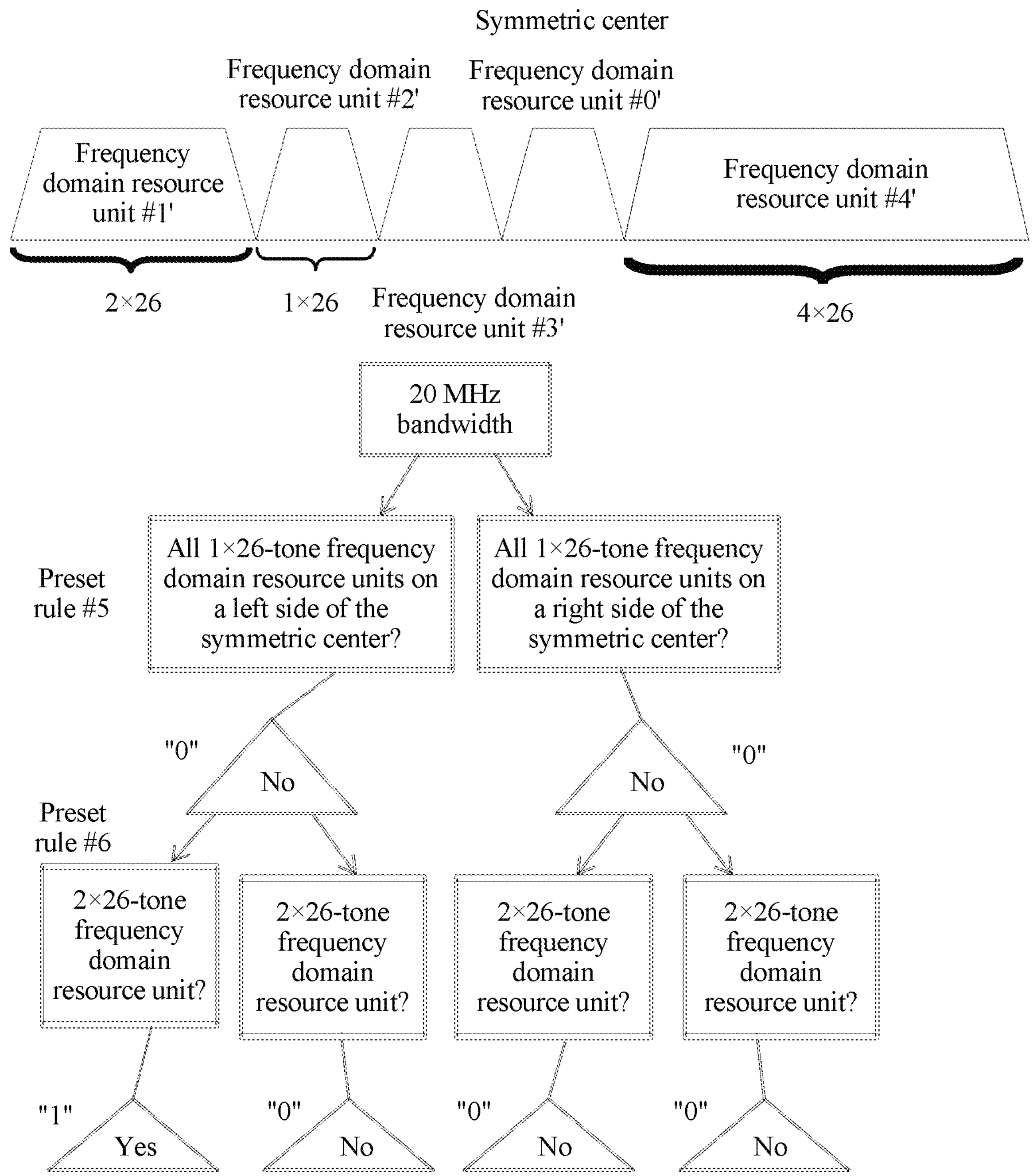
FIG. 13 is a schematic diagram of still another example of a bit sequence generation process.

Referring to FIG. 12 and FIG. 13, FIG. 12 and FIG. 13 are a simple schematic diagram of a resource unit allocation result and a schematic diagram of a corresponding bit sequence to indicate to-be-assigned resource units allocated.

For various bandwidths (only cases of 20 MHz, 40 MHz, and 80 MHz are shown in the figures, but this also includes and is applicable to 160 MHz), the bit sequence includes at least multiple type-3 bits. Some type-3 bits are to indicate whether all resource units in locations of multiple smallest resource units possibly allocated and located on one side of the symmetric center (for example, a default location in the 20 MHz bandwidth, a center frequency in the 40 MHz bandwidth, a default location in the center of the 80 MHz bandwidth, or a center frequency in the 160 MHz bandwidth) in the to-be-assigned frequency domain resource are to-be-assigned resource units allocated, and other type-3 bits are respectively to indicate whether all resource units in locations of multiple smallest resource units possibly allocated and located on the other side of the default location in the to-be-assigned frequency domain resource are to-be-assigned resource units allocated. Generally, a size of a smallest resource unit in each bandwidth is 1×26. For a location of the smallest resource unit, refer to the foregoing detailed descriptions. Details are not described herein again.

Herein, one side of the symmetric center may include a resource unit location group, or each resource unit location group may include all 1×26 resource unit locations except the default location on one side of the symmetric center, where each 1×26 resource unit location belongs to and only belongs to one resource unit location group.

Optionally, the method may further include: when a certain type-3 bit indicates that all resource units in locations of multiple smallest resource units possibly allocated are not to-be-assigned resource units allocated, a type-6 bit is further included. In a range of the resource unit locations indicated by the type-3 bit, the type-6 bit is to indicate whether all resource units in locations of multiple second smallest resource units possibly allocated are to-be-assigned resource units allocated.

In different bandwidths, only a type-3 bit may be included. Except for a type-3 bit indication, other manners may be to indicate allocation of other resource units according to the foregoing indication principle. Other bits are to indicate whether the third largest resource units are actually allocated resource units, until allocation of all resource units is indicated. For 40 MHz, 80 MHz, and 160 MHz, a preferred manner is to only indicate whether the locations of the smallest resource units possibly allocated are actually allocated resource units, or to only indicate whether the locations of the smallest resource units and the locations of the second smallest resource unit are actually allocated resource units. For a location of a larger resource unit, other possible implementation manners are used for indicating.

Embodiment 4

Optionally, the aforementioned bit sequence to indicate resource unit allocation includes a type-0 bit, and the bit indicates whether the location of the largest resource unit possibly allocated is actually allocated. and corresponding to a particular bandwidth, that is, the bit indicates that the largest resource unit is used for MU-MIMO transmission. Subsequently, other resource indication information is to allocate the to-be-assigned resource unit allocated to a corresponding station. The location of the largest resource unit possibly allocated and corresponding to the particular bandwidth is, for example, the fourth layer in FIG. 4 for the 20 MHz bandwidth, the fifth layer in FIG. 5 for 40 MHz, the sixth layer in FIG. 6 for 80 MHz, or the seventh layer for 160 MHz, as described above.

In this case, it may be understood that, when the type-0 bit indicates that the largest resource unit possibly allocated from a current bandwidth is not an actually allocated resource unit, subsequently, the foregoing type-1 bit, type-2 bit, or type-3 bit, or bits of other types need to be included to indicate allocation of resource units. If the type-0 bit indicates that a to-be-assigned resource unit allocated is in the location of the largest resource unit corresponding to the current bandwidth, subsequently, other bit sequences do not need to be included to indicate allocation of resource units.

In addition, it should be noted that, similar manners are used in principle in the foregoing embodiments to indicate allocation of resource units for different bandwidths. That is, for 40 MHz, 80 MHz, and 160 MHz bandwidths, the foregoing indicating method is used for indicating on the whole.

The following describes in detail the method and process of determining the foregoing bit sequence based on the foregoing Embodiment 1, 2, 3, or 4.

Optionally, the sending end obtains N mapping rules, where the N mapping rules correspond to N preset subcarrier quantities on a one-to-one basis, the mapping rule is to indicate a mapping relationship between a determining result and an indication identifier, the determining result is obtained based on a relationship between a preset subcarrier quantity corresponding to the mapping rule and a determining object, and N≥1;

when allocating M frequency domain resource units included in the to-be-assigned frequency domain resource to M receiving ends, the sending end uses a quantity of subcarriers included in each frequency domain resource unit as the determining object, and determines, according to the N mapping rules, an indication identifier corresponding to each frequency domain resource unit under each mapping rule, where the M frequency domain resource units correspond to the M receiving ends on a one-to-one basis;

the sending end determines a bit sequence according to the indication identifier, where the bit sequence is to indicate the quantity of the subcarriers included in each frequency domain resource unit and a location of each frequency domain resource unit in the to-be-assigned frequency domain resource; and the sending end sends resource scheduling information including the bit sequence to the receiving end, so that the receiving end determines, according to the resource scheduling information, a frequency domain resource unit corresponding to the receiving end.

Optionally, the preset subcarrier quantity is determined according to a type of the resource unit.

Specifically, in this embodiment, the preset subcarrier quantity may be determined according to a possible quantity of resource unit types in the WLAN system.

Optionally, that the sending end obtains N mapping rules includes:

obtaining the N mapping rules according to a quantity of subcarriers included in the to-be-assigned frequency domain resource, a minimum value of the preset subcarrier quantity, and a maximum value of the preset subcarrier quantity.

Specifically, in this embodiment, the preset rule may be determined according to a bandwidth of the to-be-assigned frequency domain resource (namely, the quantity of the subcarriers included in the to-be-assigned frequency domain resource (herein, the subcarriers included in the to-be-assigned frequency domain resource do not include a direct current subcarrier and a sideband guard subcarrier; hereinafter for avoiding repetition, descriptions about same or similar cases are omitted), sizes of the foregoing resource subunits (namely, the minimum value of the preset subcarrier quantity), and a maximum value of a quantity of subcarriers included in a resource unit in the bandwidth (namely, the maximum value of the preset subcarrier quantity).

For example, when a 20 MHz bandwidth frequency domain resource is used, the frequency domain resource may include three types of resource units shown in FIG. 4. Therefore, the preset subcarrier quantity may be:

1×26, 2×26, and 4×26.

For another example, when a 40 MHz bandwidth frequency domain resource is used, the frequency domain resource may include four types of resource units shown in FIG. 5. Therefore, the preset subcarrier quantity may be:

1×26, 2×26, 4×26, and 242.

For another example, when an 80 MHz bandwidth frequency domain resource is used, the frequency domain resource may include five types of resource units shown in FIG. 6. Therefore, the preset subcarrier quantity may be:

1×26, 2×26, 4×26, 242, and 2×242.

For another example, when a 160 MHz bandwidth frequency domain resource is used, the frequency domain resource may include six types of resource units, that is, the preset subcarrier quantity may be:

1×26, 2×26, 4×26, 242, 2×242, and 996.

Moreover, in this embodiment, the receiving end may also use a similar method and process to determine the preset subcarrier quantity. Moreover, to ensure reliability of the method 100, it should be ensured that preset subcarrier quantities determined by the sending end and the receiving end are the same.

It should be understood that, the foregoing illustrated method for determining a preset subcarrier quantity is merely an example, and the present invention is not limited thereto. The preset subcarrier quantity may also be indicated to the sending end or the receiving end by a higher-layer management device, or may be preset on the sending end or the receiving end by a network administrator, or may be directly determined by the sending end or the receiving end according to the bandwidth of the to-be-assigned frequency domain resource, as long as it can be ensured that the preset subcarrier quantities determined by the sending end and the receiving end are the same. This is not particularly limited in the present invention.

In this embodiment, a corresponding indication identifier of any resource unit in the to-be-assigned frequency domain resource may be obtained for any mapping rule. That is, a relationship (for example, a magnitude relationship) between a quantity of subcarriers (or a type of the resource unit) included in the resource unit and the preset subcarrier quantity (or a type of a resource unit corresponding to the preset subcarrier quantity) may be determined, and different relationships may correspond to different indication identifiers.

The following describes in detail content of the mapping rule and a method for determining an indication identifier.

Optionally, the determining, according to the N mapping rules, an indication identifier corresponding to each resource unit under each mapping rule includes:

based on the preset subcarrier quantity corresponding to each mapping rule, according to a preset order, and according to the N mapping rules in sequence, determining the indication identifier corresponding to each resource unit under each mapping rule.

Specifically, in this embodiment, a tree method may be to determine the indication identifier of each resource unit under each mapping rule in sequence according to an order (for example, descending or ascending) of preset subcarrier quantities.

In this embodiment, as mapping rules for the foregoing determined preset subcarrier quantity, the following three types may be illustrated. The following describes in detail various mapping rules and processing procedures based on various mapping rules.

α. Type-1 Mapping Rule (Corresponding to Embodiment 1)

In this embodiment, the sending end may determine the identifier of each resource unit under each mapping rule in the ascending order of the preset subcarrier quantities.

In this case, a type-1 mapping rule (hereinafter denoted as a mapping rule #A for ease of understanding and distinguishing) may be described as determining whether a size of a resource unit located in a specified frequency domain location (namely, a quantity of included subcarriers) is greater than or equal to a preset subcarrier quantity corresponding to the mapping rule #A. If yes is determined, an indication identifier of the frequency domain location under the mapping rule #A is 1. If no is determined, an indication identifier of the frequency domain location under the mapping rule #A is 0.

In other words, the foregoing order of the preset subcarrier quantities may be correspondingly an order of layers shown in FIG. 4 to FIG. 7, that is, the sending end may determine a mapping rule corresponding to each layer in a top-down order (namely, the ascending order of the preset subcarrier quantities) in the foregoing allocation map of resource units.

That is, the mapping rule #A at an Xth layer may be further described as: if (one or more) resource units in a specified frequency domain location are formed by aggregation of resource units at an (X−1)th layer (namely, an upper layer of the Xth layer), the indication identifier of the frequency domain location under the mapping rule #A is 1; or if (one or more) resource units in a specified frequency domain location are not formed by aggregation of resource units at an (X−1)th layer (namely, an upper layer of the Xth layer), the indication identifier of the frequency domain location under the mapping rule #A is 0.

It should be particularly noted that, herein "aggregation" can only be aggregation of adjacent resource units at one upper layer, and aggregation of resource units at two upper layers does not exist. Therefore, bits may be further compressed in this solution, that is, a bit indicating that upper layer aggregation is impossible may be omitted. For example, one 2×26 and two 1×26 resource units are on a left side of a 1×26-tone resource unit (namely, a symmetric center of the 20 MHz bandwidth) located in a center location in the 20 MHz bandwidth. In this case, the resource units at the upper layer cannot be aggregated into a 4×26 resource unit, and therefore, a corresponding indication bit may be omitted.

FIG. 7 shows a tree diagram of an example of a determining process based on the type-1 mapping rule. Using a to-be-assigned frequency domain resource with a 20 MHz bandwidth as an example, the to-be-assigned frequency domain resource includes two 2×26-tone resource units (hereinafter denoted as a resource unit #1 and a resource unit #2 for ease of understanding and distinguishing), one 1×26-tone resource unit (hereinafter denoted as a resource unit #0 for ease of understanding and distinguishing), and one 4×26-tone resource unit (hereinafter denoted as a resource unit #3 for ease of understanding and distinguishing) from left to right in sequence.

It should be noted that, in the 20 MHz bandwidth, because one 1×26-tone resource unit (namely, the resource unit #0) located in a middle location of the bandwidth always exists, the resource unit may be implicitly indicated. Therefore, the method 100 is mainly to determine an indication identifier corresponding to any resource unit except the resource unit #0. For avoiding repetition, the following omits descriptions about same or similar cases.

Certainly, in another example, one bit may also be to indicate whether the resource unit #0 is available.

First, as shown in FIG. 7, a preset rule (hereinafter denoted as a preset rule #1 for ease of understanding and distinguishing) corresponding to a preset subcarrier quantity of 2×26 is determined, and determining is performed from left to right in sequence.

In other words, allocation of resource units at the second layer in FIG. 4 is used as a determining criterion, and determining is performed from left to right in sequence.

In a determining process of the sending end, a resource unit corresponding to the location #1 at the second layer in FIG. 4 is the resource unit #1, and a quantity of subcarriers included in the resource unit #1 is 2×26, meeting a determining condition corresponding to the preset rule #1, that is, the quantity of the subcarriers included in the resource unit #1 is greater than or equal to the preset subcarrier quantity corresponding to the preset rule #1. Therefore, an indication identifier of the location #1 (or the resource unit #1) under the preset rule #1 is 1. In other words, the resource unit #1 is formed by aggregation of two or more than two 1×26 resource units. Therefore, the indication identifier of the location #1 (or the resource unit #1) under the preset rule #1 is 1.

A resource unit corresponding to the location #2 at the second layer in FIG. 4 is the resource unit #2, and a quantity of subcarriers included in the resource unit #2 is 2×26, meeting the determining condition corresponding to the preset rule #1, that is, the quantity of the subcarriers included in the resource unit #2 is greater than or equal to the preset subcarrier quantity corresponding to the preset rule #1. Therefore, an indication identifier of the location #2 (or the resource unit #2) under the preset rule #1 is 1. In other words, the resource unit #2 is formed by aggregation of two 1×26 resource units. Therefore, the indication identifier of the location #2 (or the resource unit #2) under the preset rule #1 is 1.

A resource unit corresponding to the location #3 at the second layer in FIG. 4 is the resource unit #3 (namely, a part of the resource unit #3), and a quantity of subcarriers included in the resource unit #3 is 4×26, meeting the determining condition corresponding to the preset rule #1, that is, the quantity of the subcarriers included in the resource unit #3 is greater than or equal to the preset subcarrier quantity corresponding to the preset rule #1. In other words, the resource unit #3 is formed by aggregation of two 1×26 resource units. Therefore, an indication identifier of the location #3 under the preset rule #1 is 1.

Moreover, a resource unit corresponding to the location #4 at the second layer in FIG. 4 is the resource unit #3 (namely, a part of the resource unit #3), and the quantity of the subcarriers included in the resource unit #3 is 4×26, meeting the determining condition corresponding to the preset rule #1, that is, the quantity of the subcarriers included in the resource unit #3 is greater than or equal to the preset subcarrier quantity corresponding to the preset rule #1. In other words, the resource unit #3 is formed by aggregation of two 1×26 resource units. Therefore, an indication identifier of the location #4 under the preset rule #1 is 1.

Therefore, the indication identifier of the resource unit #3 under the preset rule #1 is 11.

Afterward, as shown in FIG. 7, a preset rule (hereinafter denoted as a preset rule #2 for ease of understanding and distinguishing) corresponding to a preset subcarrier quantity of 4×26 is determined, and determining is performed from left to right.

In other words, allocation of resource units at the third layer in FIG. 4 is used as a determining criterion, and determining is performed from left to right in sequence.

Resource units corresponding to the location #5 at the third layer in FIG. 4 are the resource unit #1 and the resource unit #2, and the quantities of the subcarriers included in the resource unit #1 and the resource unit #2 are 2×26, not meeting a determining condition corresponding to the preset rule #2, that is, the quantities of the subcarriers included in the resource unit #1 and the resource unit #2 are smaller than the preset subcarrier quantity corresponding to the preset rule #2. Therefore, an indication identifier of the location #5 (or the resource unit #1 and the resource unit #2) under the preset rule #1 is 0. In other words, the resource unit #1 and the resource unit #2 are not formed by aggregation of two 2×26 resource units. Therefore, the indication identifier of the location #5 (or the resource unit #1 and the resource unit #2) under the preset rule #2 is 0, that is, a bit "0" is used as the indication identifier of the resource unit #1 and the resource unit #2 under the preset rule #2.

A resource unit corresponding to the location #6 at the third layer in FIG. 4 is the resource unit #3, and the quantity of the subcarriers included in the resource unit #3 is 4×26, meeting the determining condition corresponding to the preset rule #2, that is, the quantity of the subcarriers included in the resource unit #2 is greater than or equal to the preset subcarrier quantity corresponding to the preset rule #2. Therefore, an indication identifier of the location #6 (or the resource unit #3) under the preset rule #2 is 1. In other words, the resource unit #3 is formed by aggregation of two 2×26 resource units. Therefore, the indication identifier of the location #6 (or the resource unit #3) under the preset rule #2 is 1.

A bit sequence formed by various indication identifiers generated for the to-be-assigned frequency domain resource shown in FIG. 7 based on the type-1 mapping rule is 111101, and in comparison with the method for generating a bit sequence in the prior art, three bits of overheads can be spared.

Correspondingly, in a determining process of the receiving end, first four bits in the bit sequence indicate allocation of resource units in the to-be-assigned frequency domain resource in the location #1 to the location #4 at the second layer in FIG. 4.

The first indication identifier is 1. Therefore, the receiving end may determine: the quantity of the subcarriers included in the resource unit (namely, the resource unit #1) in the location #1 at the second layer in FIG. 4 meets the determining condition corresponding to the preset rule #1, that is, the quantity of the subcarriers included in the resource unit in the location #1 is greater than or equal to the preset subcarrier quantity (namely, 2×26) corresponding to the preset rule #1. In other words, the resource unit located in the location #1 is formed by aggregation of two or more than two 1×26 resource units.

The second indication identifier is 1. Therefore, the receiving end may determine: the quantity of the subcarriers included in the resource unit (namely, the resource unit #2) in the location #2 at the second layer in FIG. 4 meets the determining condition corresponding to the preset rule #1, that is, the quantity of the subcarriers included in the resource unit in the location #2 is greater than or equal to the preset subcarrier quantity (namely, 2×26) corresponding to the preset rule #1. In other words, the resource unit located in the location #2 is formed by aggregation of two or more than two 1×26 resource units.

The third indication identifier is 1. Therefore, the receiving end may determine: the quantity of the subcarriers included in the resource unit (namely, the resource unit #3) in the location #3 at the second layer in FIG. 4 meets the determining condition corresponding to the preset rule #1, that is, the quantity of the subcarriers included in the resource unit in the location #3 is greater than or equal to the preset subcarrier quantity (namely, 2×26) corresponding to the preset rule #1. In other words, the resource unit located in the location #3 is formed by aggregation of two or more than two 1×26 resource units.

The fourth indication identifier is 1. Therefore, the receiving end may determine: the quantity of the subcarriers included in the resource unit (namely, the resource unit #3) in the location #4 at the second layer in FIG. 4 meets the determining condition corresponding to the preset rule #1, that is, the quantity of the subcarriers included in the resource unit in the location #4 is greater than or equal to the preset subcarrier quantity (namely, 2×26) corresponding to the preset rule #1. In other words, the resource unit located in the location #4 is formed by aggregation of two or more than two 1×26 resource units.

The fifth bit and the sixth bit in the bit sequence indicate allocation of resource units in the to-be-assigned frequency domain resource in the location #5 and the location #6 at the third layer in FIG. 4.

The fifth indication identifier is 0. Therefore, the receiving end may determine: the quantity of the subcarriers included in the resource unit (namely, the resource unit #1 and the resource unit #2) in the location #5 at the third layer in FIG. 4 does not meet the determining condition corresponding to the preset rule #2, that is, the quantity of the subcarriers included in the resource unit in the location #5 is smaller than the preset subcarrier quantity (namely, 4×26) corresponding to the preset rule #2. In other words, the resource unit located in the location #5 is not formed by aggregation of two 2×26 resource units.

Therefore, with reference to the first indication identifier, the second indication identifier, and the fifth indication identifier, the receiving end can determine that the resource units located in the location #1 and the location #2 are two 2×26-tone resource units, that is, can determine that the to-be-assigned frequency domain resource includes the resource unit #1 and the resource unit #2.

The sixth indication identifier is 1. Therefore, the receiving end may determine: the quantity of the subcarriers included in the resource unit (namely, the resource unit #3) in the location #6 at the third layer in FIG. 4 meets the determining condition corresponding to the preset rule #2, that is, the quantity of the subcarriers included in the resource unit in the location #5 is greater than or equal to the preset subcarrier quantity (namely, 4×26) corresponding to the preset rule #2. In other words, the resource unit located in the location #5 is formed by aggregation of two 2×26 resource units.

Therefore, with reference to the third indication identifier, the fourth indication identifier, and the sixth indication identifier, the receiving end can determine that the resource unit located in the location #3 and the location #4 is a 4×26-tone resource unit, that is, can determine that the to-be-assigned frequency domain resource includes the resource unit #3.

Therefore, the receiving end may determine: the first resource unit (namely, the resource unit #1) in the to-be-assigned frequency domain resource is a 2×26-tone resource unit, the second resource unit (namely, the resource unit #2) in the to-be-assigned frequency domain resource is a 2×26-tone resource unit, and the third resource unit (namely, the resource unit #3) in the to-be-assigned frequency domain resource is a 4×26-tone resource unit.

As described above, the determining process of the receiving end is a process inverse to the determining process of the sending end. For avoiding repetition, the following omits the detailed description about the determining process of the receiving end that is inverse to the determining process of the sending end.

Certainly, referring to the foregoing Embodiment 4, in another optional example, for allocation of resource units shown in FIG. 7, first, determining is performed according to a quantity of subcarriers included in a largest resource unit possibly allocated and corresponding to the current 20 MHz bandwidth, that is, a preset rule (hereinafter denoted as a preset rule #22 for ease of understanding and distinguishing) corresponding to a preset subcarrier quantity of 242 is determined, and determining is performed to obtain a value of a type-0 bit. In other words, allocation of resource units at the fourth layer in FIG. 4 is used as a determining criterion, and determining is performed to obtain the value of the type-0 bit.

Specifically, in a determining process of the sending end, allocation of resource units shown in FIG. 7 is: the resource unit #1, the resource unit #2, the resource unit #0, and the resource unit #3 (the whole resource unit at the fourth layer in FIG. 4), and the quantities of the subcarriers included in the resource units are 2×26, 2×26, 1×26, and 4×26 respectively, not meeting a determining condition corresponding to the preset rule #22, that is, the quantity of the subcarriers included in any one of the resource unit #0, the resource unit #1, the resource unit #2, and the resource unit #3 is not equal to the preset subcarrier quantity (namely, 242) corresponding to the preset rule #22. Therefore, an indication identifier of the fourth layer under the preset rule #22 in FIG. 4 is 0, and the indication identifier is optional. That is, the value of the type-0 bit is 0. After the value of the type-0 bit is obtained, a value of the foregoing type-1 bit continues to be obtained according to the manner shown in FIG. 7.

FIG. 8 shows a tree diagram of another example of a determining process based on the type-1 mapping rule. Using a to-be-assigned frequency domain resource with a 20 MHz bandwidth as an example, the to-be-assigned frequency domain resource includes one 2×26-tone resource unit (hereinafter denoted as a resource unit #1' for ease of understanding and distinguishing), three 1×26-tone resource units (hereinafter denoted as a resource unit #2', a resource unit #3', and a resource unit #0' for ease of understanding and distinguishing), and one 4×26-tone resource unit (hereinafter denoted as a resource unit #4' for ease of understanding and distinguishing) from left to right in sequence.

It should be noted that, in the 20 MHz bandwidth, because one 1×26-tone resource unit (namely, the resource unit #0') located in a center location of the bandwidth always exists, the resource unit may be implicitly indicated. Therefore, the method 100 is mainly to determine an indication identifier corresponding to any resource unit except the resource unit #0'. For avoiding repetition, the following omits descriptions about same or similar cases.

First, as shown in FIG. 8, a preset rule (namely, a preset rule #1) corresponding to a preset subcarrier quantity of 2×26 is determined, and determining is performed from left to right in sequence.

In other words, allocation of resource units at the second layer in FIG. 4 is used as a determining criterion, and determining is performed from left to right in sequence.

A resource unit corresponding to the location #1 at the second layer in FIG. 4 is the resource unit #1', and a quantity of subcarriers included in the resource unit #1' is 2×26, meeting a determining condition corresponding to the preset rule #1, that is, the quantity of the subcarriers included in the resource unit (namely, the resource unit #1') in the location #1 is greater than or equal to the preset subcarrier quantity corresponding to the preset rule #1. Therefore, an indication identifier of the location #1 (or the resource unit #1') under the preset rule #1 is 1. In other words, the resource unit #1 is formed by aggregation of two 1×26 resource units. Therefore, the indication identifier of the location #1 (or the resource unit #1') under the preset rule #1 is 1.

Resource units corresponding to the location #2 at the second layer in FIG. 4 are the resource unit #2' and the resource unit #3', and quantities of subcarriers included in the resource unit #2' and the resource unit #3' are 1×26, not meeting the determining condition corresponding to the preset rule #1, that is, the quantities of the subcarriers included in the resource unit #2' and the resource unit #3' are smaller than the preset subcarrier quantity corresponding to the preset rule #1. Therefore, an indication identifier of the location #2 (or the resource unit #2' and the resource unit #3') under the preset rule #1 is 0. In other words, the resource unit #2' and the resource unit #3' are not formed by aggregation of two 1×26 resource units. Therefore, the indication identifier of the location #2 (or the resource unit #2' and the resource unit #3') under the preset rule #1 is 0, that is, a bit "0" is used as the indication identifier of the resource unit #2' and the resource unit #3' under the preset rule #1.

A resource unit corresponding to the location #3 at the second layer in FIG. 4 is the resource unit #4' (namely, a part of the resource unit #4'), and a quantity of subcarriers included in the resource unit #4' is 4×26, meeting the determining condition corresponding to the preset rule #1, that is, the quantity of the subcarriers included in the resource unit #4' is greater than or equal to the preset subcarrier quantity corresponding to the preset rule #1. In other words, the resource unit #4' is formed by aggregation of two 1×26 resource units. Therefore, an indication identifier of the location #3 under the preset rule #1 is 1.

Moreover, a resource unit corresponding to the location #4 at the second layer in FIG. 4 is the resource unit #4' (namely, a part of the resource unit #4'), and the quantity of the subcarriers included in the resource unit #4' is 4×26, meeting the determining condition corresponding to the preset rule #1, that is, the quantity of the subcarriers included in the resource unit #4' is greater than or equal to the preset subcarrier quantity corresponding to the preset rule #1. In other words, the resource unit #4' is formed by aggregation of two 1×26 resource units. Therefore, an indication identifier of the location #4 under the preset rule #1 is 1.

Therefore, an indication identifier of the resource unit #4' located in the location #3 and the location #4 under the preset rule #1 is 11.

Afterward, as shown in FIG. 8, a preset rule (hereinafter denoted as a preset rule #2 for ease of understanding and distinguishing) corresponding to a preset subcarrier quantity of 4×26 is determined, and determining is performed from left to right.

In other words, an allocation map of resource units at the third layer in FIG. 4 is used as a determining criterion, and determining is performed from left to right in sequence.

Resource units corresponding to the location #5 at the third layer in FIG. 4 are the resource unit #1', the resource unit #2', and the resource unit #3', and none of the quantities of the subcarriers included in the resource unit #1', the resource unit #2', and the resource unit #3' meets a determining condition corresponding to the preset rule #2, that is, the quantities of the subcarriers included in the resource unit #1', the resource unit #2', and the resource unit #3' are all smaller than the preset subcarrier quantity corresponding to the preset rule #2. Therefore, an indication identifier of the location #5 (or the resource unit #1', the resource unit #2', and the resource unit #3') under the preset rule #2 is 0. In other words, the resource unit #1', the resource unit #2', and the resource unit #3' are not formed by aggregation of two 2×26 resource units. Therefore, an indication identifier of the resource unit #1', the resource unit #2', and the resource unit #3' under the preset rule #2 is 0. That is, a bit "0" is used as the indication identifier of the resource unit #1', the resource unit #2', and the resource unit #3' under the preset rule #2.

In addition, because it is determined under the rule 1 that the resource units in the location #5 at the third layer in FIG. 4 are one 2×26 resource unit and two 1×26 resource units, allocation of the location #5 at the third layer in FIG. 4 is already complete. Therefore, the indication identifier of the resource unit #1', the resource unit #2', and the resource unit #3' under the preset rule #2 may also be omitted.

A resource unit corresponding to the location #6 at the third layer in FIG. 4 is the resource unit #4', and the quantity of the subcarriers included in the resource unit #4' is 4×26, meeting the determining condition corresponding to the preset rule #2, that is, the quantity of the subcarriers included in the resource unit #4' is greater than or equal to the preset subcarrier quantity corresponding to the preset rule #2. Therefore, an indication identifier of the location #6 (or the resource unit #4') under the preset rule #2 is 1. In other words, the resource unit #4' is formed by aggregation of two 2×26 resource units. Therefore, the indication identifier of the resource unit #4' under the preset rule #2 is 1.

That is, a bit sequence formed by various indication identifiers generated for the to-be-assigned frequency domain resource shown in FIG. 8 based on the type-1 mapping rule is 101101 or 10111. That is, in comparison with the method for generating a bit sequence in the prior art, three or four bits of overheads can be spared.

Certainly, similarly, referring to the foregoing Embodiment 4, in another optional example, for allocation of resource units shown in FIG. 8, first, determining is performed according to a quantity of subcarriers included in a largest resource unit possibly allocated and corresponding to the current 20 MHz bandwidth, that is, a preset rule (hereinafter denoted as a preset rule #22 for ease of understanding and distinguishing) corresponding to a preset subcarrier quantity of 242 is determined, and determining is performed to obtain a value of a type-0 bit. In other words, allocation of resource units at the fourth layer in FIG. 4 is used as a determining criterion, and determining is performed to obtain the value of the type-0 bit.

Specifically, in a determining process of the sending end, allocation of resource units shown in FIG. 8 is: the resource unit #1', the resource unit #2', the resource unit #3', the resource unit #0', and the resource unit #4', and the quantities of the subcarriers included in the resource units are 2×26, 1×26, 1×26, 1×26, and 4×26 respectively, not meeting a determining condition corresponding to the preset rule #22, that is, the quantity of the subcarriers included in any one of the resource unit #1', the resource unit #2', the resource unit #3', the resource unit #0', and the resource unit #4' is not equal to the preset subcarrier quantity (namely, 242) corresponding to the preset rule #22. Therefore, an indication identifier under the preset rule #22 is 0, and the indication identifier is optional. That is, the value of the type-0 bit is 0. After the value of the type-0 bit is obtained, a value of the foregoing type-1 bit continues to be obtained according to the manner shown in FIG. 8.

In other words, if the optional indication identifier under the preset rule #22 is included, a bit sequence formed by various indication identifiers generated for the to-be-assigned frequency domain resource shown in FIG. 8 based on the type-1 mapping rule is 0101101 or 010111, and in comparison with the method for generating a bit sequence in the prior art, two bits or three bits of overheads can be spared. Optionally, one bit indicating whether a default resource unit location is available may be further included.

The type-1 mapping rule and the processing procedure based on the type-1 mapping rule are described above with reference to FIG. 7 and FIG. 8. Type-2 and type-3 mapping rules and processing procedures based on the type-2 and type-3 mapping rules are hereinafter described in detail with reference to FIG. 9 to FIG. 14.

Optionally, the to-be-assigned frequency domain resource has a symmetric center; and the determining a bit sequence according to the indication identifier includes:

determining an arrangement order according to a location of each resource unit in the to-be-assigned frequency domain resource relative to the symmetric center of the to-be-assigned frequency domain resource; and determining, based on the arrangement order and according to the indication identifier, a bit sequence to indicate the to-be-assigned frequency domain resource.

Specifically, as shown in FIG. 4 to FIG. 6, allocation of resource units (or resource unit locations) of a 20 MHz bandwidth frequency domain resource at each layer is in symmetry relative to a 1×26-tone resource subunit located in a center location (namely, an example of the symmetric center); allocation of resource units of a 40 MHz bandwidth frequency domain resource at each layer is in symmetry relative to a center point (namely, another example of the symmetric center); allocation of resource units of an 80 MHz bandwidth frequency domain resource at each layer is in symmetry relative to a 1×26-tone resource subunit located in a center location (namely, still another example of a symmetric center); and allocation of resource units of a 160 MHz bandwidth frequency domain resource at each layer is in symmetry relative to a center point (namely, still another example of the symmetric center).

In this embodiment, the sending end may determine the identifier of each resource unit under each mapping rule by using the foregoing symmetry.

β. Type-2 Mapping Rule (Corresponding to Embodiment 2)

In this embodiment, the sending end may determine the identifier of each resource unit under each mapping rule in the descending order of the preset subcarrier quantities.

In this case, a type-2 mapping rule (hereinafter denoted as a mapping rule #B for ease of understanding and distinguishing) may be described as determining whether a size of a resource unit located in a specified frequency domain location (namely, a quantity of included subcarriers) on a left side or a right side of the symmetric center is greater than or equal to a preset subcarrier quantity corresponding to the mapping rule #B. If yes is determined, an indication identifier of the frequency domain location under the mapping rule #B is 1. If no is determined, an indication identifier of the frequency domain location under the mapping rule #B is 0.

In other words, the foregoing order of the preset subcarrier quantities may be correspondingly an order of layers shown in FIG. 4 to FIG. 6, that is, the sending end may determine a mapping rule corresponding to each layer in a bottom-up order (namely, the descending order of the preset subcarrier quantities) in the foregoing allocation map of resource units.

FIG. 9 shows a tree diagram of an example of a determining process based on the type-2 mapping rule. Using a to-be-assigned frequency domain resource with a 20 MHz bandwidth as an example, the to-be-assigned frequency domain resource includes two 2×26-tone resource units (namely, a resource unit #1 and a resource unit #2), one 1×26-tone resource unit (namely, a resource unit #0), and one 4×26-tone resource unit (namely, a resource unit #3) from left to right in sequence.

Likewise, in the 20 MHz bandwidth, because one 1×26-tone resource unit (namely, the resource unit #0) located in a middle location of the bandwidth always exists, the resource unit may be implicitly indicated. Therefore, the method 100 is mainly to determine an indication identifier corresponding to any resource unit except the resource unit #0.

First, as shown in FIG. 9, determining is performed according to a quantity of subcarriers included in the largest resource unit located on one side of a default location in the 20 MHz bandwidth, that is, a preset rule (hereinafter denoted as a preset rule #3 for ease of understanding and distinguishing) corresponding to a preset subcarrier quantity of 4×26 is determined, and determining is performed from left to right in sequence.

In other words, allocation of resource units at the third layer in FIG. 4 is used as a determining criterion, and determining is performed from left to right in sequence.

In a determining process of the sending end, resource units corresponding to the location #5 (on the left side of the symmetric center of 20 MHz) at the third layer in FIG. 4 are the resource unit #1 and the resource unit #2, and quantities of subcarriers included in the resource unit #1 and the resource unit #2 are 2×26, not meeting a determining condition corresponding to the preset rule #3, that is, the quantities of the subcarriers included in the resource unit #1 and the resource unit #2 are not equal to the preset subcarrier quantity (namely, 4×26) corresponding to the preset rule #1. Therefore, an indication identifier of the location #1 (or the resource unit #1 and the resource unit #2) under the preset rule #3 is 0.

A resource unit corresponding to the location #6 (namely, on the right side of the symmetric center of 20 MHz) at the third layer in FIG. 4 is the resource unit #3, and a quantity of subcarriers included in the resource unit #3 is 4×26, meeting the determining condition corresponding to the preset rule #3, that is, the quantity of the subcarriers included in the resource unit #2 is equal to the preset subcarrier quantity corresponding to the preset rule #3. Therefore, an indication identifier of the location #3 (or the resource unit #3) under the preset rule #3 is 1.

Herein, in the 20 MHz bandwidth, because a type of the largest resource unit on one side of the symmetric center is a 4×26 RU (except that a 242 RU is allocated to one user for single-user transmission), allocation of the frequency domain resource on the right side of the symmetric center, namely, the frequency domain resource corresponding to the location #6 (or the location #3 and the location #4), is complete.

Afterward, as shown in FIG. 9, a preset rule (hereinafter denoted as a preset rule #4 for ease of understanding and distinguishing) corresponding to a preset subcarrier quantity of 2×26 is determined, and determining is performed from left to right.

In other words, allocation of resource units at the second layer in FIG. 4 is used as a determining criterion, and determining is performed from left to right in sequence.

A resource unit corresponding to the location #1 (namely, on the left side of the symmetric center of 10 MHz) at the second layer in FIG. 4 is the resource unit #1, and the quantity of the subcarriers included in the resource unit #1 is 2×26, meeting a determining condition corresponding to the preset rule #4, that is, the quantity of the subcarriers included in the resource unit #1 is equal to the preset subcarrier quantity corresponding to the preset rule #4. Therefore, an indication identifier of the location #1 (or the resource unit #1) under the preset rule #4 is 1.

A resource unit corresponding to the location #2 (namely, on the right side of the symmetric center of 10 MHz) at the second layer in FIG. 4 is the resource unit #2, and the quantity of the subcarriers included in the resource unit #2 is 2×26, meeting the determining condition corresponding to the preset rule #4, that is, the quantity of the subcarriers included in the resource unit #2 is equal to the preset subcarrier quantity corresponding to the preset rule #4. Therefore, an indication identifier of the location #2 (or the resource unit #2) under the preset rule #4 is 1.

Therefore, allocation of the frequency domain resource on the left side of the symmetric center, namely, the frequency domain resource corresponding to the location #5 (or the location #1 and the location #2), is complete.

A bit sequence formed by various indication identifiers generated for the to-be-assigned frequency domain resource shown in FIG. 9 based on the type-2 mapping rule is 0111, and in comparison with the method for generating a bit sequence in the prior art, five bits of overheads can be spared.

Correspondingly, in a determining process of the receiving end, first two bits in the bit sequence indicate allocation of resource units in the to-be-assigned frequency domain resource in the location #5 and the location #6 at the third layer in FIG. 4.

The first indication identifier is 1. Therefore, the receiving end may determine: the quantity of the subcarriers included in the resource unit (namely, the resource unit #1 and the resource unit #2) in the location #5 at the third layer in FIG. 4 does not meet the determining condition corresponding to the preset rule #3, that is, the quantity of the subcarriers included in the resource unit in the location #5 is not equal to the preset subcarrier quantity (namely, 4×26) corresponding to the preset rule #3. In other words, the resource unit located in the location #5 is not a 4×26-tone resource unit.

The second indication identifier is 1. Therefore, the receiving end may determine: the quantity of the subcarriers included in the resource unit (namely, the resource unit #3) in the location #6 at the third layer in FIG. 4 meets the determining condition corresponding to the preset rule #3, that is, the quantity of the subcarriers included in the resource unit in the location #6 is equal to the preset subcarrier quantity (namely, 4×26) corresponding to the preset rule #3.

Therefore, with reference to the second indication identifier, the receiving end can determine that the resource unit located in the location #6 is a 4×26-tone resource unit, that is, the receiving end can determine that the resource unit on the right side of the symmetric center is a 4×26-tone resource unit. Therefore, the resource unit #3 (the location #3, location #4, or location #6) located on the right side of the symmetric center may be determined.

Therefore, the receiving end may determine that the third bit and the fourth bit in the bit sequence indicate allocation of resource units in the to-be-assigned frequency domain resource in the location #1 and the location #2 at the second layer in FIG. 4.

The third indication identifier is 1. Therefore, the receiving end may determine: the quantity of the subcarriers included in the resource unit (namely, the resource unit #1) in the location #1 at the second layer in FIG. 4 meets the determining condition corresponding to the preset rule #4, that is, the quantity of the subcarriers included in the resource unit in the location #1 is equal to the preset subcarrier quantity (namely, 2×26) corresponding to the preset rule #4. In other words, the resource unit located in the location #1 is a 2×26-tone resource unit.

The fourth indication identifier is 1. Therefore, the receiving end may determine: the quantity of the subcarriers included in the resource unit (namely, the resource unit #2) in the location #2 at the second layer in FIG. 4 meets the determining condition corresponding to the preset rule #4, that is, the quantity of the subcarriers included in the resource unit in the location #2 is equal to the preset subcarrier quantity (namely, 2×26) corresponding to the preset rule #4. In other words, the resource unit located in the location #2 is a 2×26-tone resource unit.

Therefore, with reference to the first indication identifier, the third indication identifier, and the fourth indication identifier, the receiving end can determine that resource units located in the location #1 and the location #2 are two 2×26-tone resource units, that is, can determine that the to-be-assigned frequency domain resource includes the resource unit #1 and the resource unit #2.

Therefore, the receiving end may determine: the first resource unit (namely, the resource unit #1) in the to-be-assigned frequency domain resource is a 2×26-tone resource unit, the second resource unit (namely, the resource unit #2) in the to-be-assigned frequency domain resource is a 2×26-tone resource unit, and the third resource unit (namely, the resource unit #3) in the to-be-assigned frequency domain resource is a 4×26-tone resource unit.

As described above, the determining process of the receiving end is a process inverse to the determining process of the sending end. For avoiding repetition, the following omits the detailed description about the determining process of the receiving end that is inverse to the determining process of the sending end.

Certainly, similarly, referring to the foregoing Embodiment 4, in another optional example, for allocation of resource units shown in FIG. 9, first, determining is performed according to a quantity of subcarriers included in a largest resource unit possibly allocated and corresponding to the 20 MHz bandwidth, that is, a preset rule (hereinafter denoted as a preset rule #22 for ease of understanding and distinguishing) corresponding to a preset subcarrier quantity of 242 is determined, and determining is performed to obtain a value of a type-0 bit. In other words, allocation of resource units at the fourth layer in FIG. 4 is used as a determining criterion, and determining is performed to obtain the value of the type-0 bit.

Specifically, in a determining process of the sending end, allocation of resource units shown in FIG. 9 is: the resource unit #1, the resource unit #2, the resource unit #0, and the resource unit #3, and the quantities of the subcarriers included in the resource units are 2×26, 1×26, 1×26, 1×26, and 4×26 respectively, not meeting a determining condition corresponding to the preset rule #22, that is, the quantity of the subcarriers included in any one of the resource unit #1, the resource unit #2, the resource unit #0, and the resource unit #3 is not equal to the preset subcarrier quantity (namely, 242) corresponding to the preset rule #22. Therefore, an indication identifier under the preset rule #22 is 0, and the indication identifier is optional. That is, the value of the type-0 bit is 0. After the value of the type-0 bit is obtained, a value of the foregoing type-2 bit continues to be obtained according to the manner shown in FIG. 9.

In other words, if the optional indication identifier under the preset rule #22 is included, a bit sequence formed by various indication identifiers generated for the to-be-assigned frequency domain resource shown in FIG. 9 based on the type-2 mapping rule is 00111, and in comparison with the method for generating a bit sequence in the prior art, four bits of overheads can be spared. Optionally, one bit indicating whether a default resource unit location is available may be further included.

FIG. 10 shows a tree diagram of another example of a determining process based on the type-2 mapping rule. Using a to-be-assigned frequency domain resource with a 40 MHz bandwidth as an example, the to-be-assigned frequency domain resource includes two 2×26-tone resource units (hereinafter denoted as a resource unit #1" and a resource unit #2" for ease of understanding and distinguishing), one 1×26-tone resource unit (hereinafter denoted as a resource unit #0" for ease of understanding and distinguishing), one 4×26-tone resource unit (hereinafter denoted as a resource unit #3" for ease of understanding and distinguishing), and one 4×26-tone resource unit (hereinafter denoted as a resource unit #4" for ease of understanding and distinguishing) from left to right in sequence.

First, as shown in FIG. 10, a quantity of subcarriers included in a largest resource unit in the 40 MHz bandwidth is determined, that is, a preset rule (hereinafter denoted as a preset rule #7 for ease of understanding and distinguishing) corresponding to a preset subcarrier quantity of 242 is determined, and determining is performed from left to right in sequence.

In other words, allocation of resource units at the fourth layer in FIG. 5 is used as a determining criterion, and determining is performed from left to right in sequence.

In a determining process of the sending end, resource units corresponding to the location #A (namely, on the left side of the symmetric center of 40 MHz) at the fourth layer in FIG. 5 are the resource unit #1", the resource unit #2", the resource unit #0", and the resource unit #3", and quantities of subcarriers included in the resource units are not 242, not meeting a determining condition corresponding to the preset rule #7, that is, the quantities of the subcarriers included in the resource unit #1", the resource unit #2", the resource unit #0", and the resource unit #3" are not equal to the preset subcarrier quantity (namely, 242) corresponding to the preset rule #7. Therefore, an indication identifier of the location #A (or the resource unit #1", the resource unit #2", the resource unit #0", and the resource unit #3") under the preset rule #7 is 0.

A resource unit corresponding to the location #B (namely, on the right side of the symmetric center of 40 MHz) at the fourth layer in FIG. 5 is the resource unit #4", and a quantity of subcarriers included in the resource unit 4" is 242, meeting the determining condition corresponding to the preset rule #7, that is, the quantity of the subcarriers included in the resource unit #4" is equal to the preset subcarrier quantity corresponding to the preset rule #7. Therefore, an indication identifier of the location #B (or the resource unit #4") under the preset rule #7 is 1.

Herein, in the 40 MHz bandwidth, because a type of the largest resource unit is 242, allocation of the frequency domain resource on the right side of the symmetric center, namely, the frequency domain resource corresponding to the location #B, is complete.

Afterward, as shown in FIG. 10, a quantity of subcarriers included in a largest resource unit on one side of the symmetric center in a 20 MHz bandwidth, in a 20 MHz bandwidth frequency domain resource that is not completely allocated on the left side of the symmetric center is determined, that is, a preset rule (hereinafter denoted as a preset rule #8 for ease of understanding and distinguishing) corresponding to a preset subcarrier quantity of 4×26 is determined, and determining is performed from left to right in sequence.

In other words, allocation of resource units at the third layer in FIG. 5 is used as a determining criterion, and determining is performed from left to right in sequence.

In a determining process of the sending end, resource units corresponding to the location #C (on the left side of the symmetric center of 20 MHz) at the third layer in FIG. 5 are the resource unit #1" and the resource unit #2", and the quantities of the subcarriers included in the resource unit #1" and the resource unit #2" are 2×26, not meeting a determining condition corresponding to the preset rule #8, that is, the quantities of the subcarriers included in the resource unit #1" and the resource unit #2" are not equal to the preset subcarrier quantity (namely, 4×26) corresponding to the preset rule #8. Therefore, an indication identifier of the location #C (or the resource unit #1" and the resource unit #2") under the preset rule #8 is 0.

In addition, in the 20 MHz bandwidth, because one 1×26-tone resource unit (namely, the resource unit #0") located in a middle location of the bandwidth always exists, the resource unit may be implicitly indicated.

A resource unit corresponding to the location #D (namely, on the right side of the symmetric center of 20 MHz) at the third layer in FIG. 5 is the resource unit #3", and the quantity of the subcarriers included in the resource unit #3" is 4×26, meeting the determining condition corresponding to the preset rule #8, that is, the quantity of the subcarriers included in the resource unit #3" is equal to the preset subcarrier quantity corresponding to the preset rule #8. Therefore, an indication identifier of the location #D (or the resource unit #3") under the preset rule #8 is 1.

Herein, in the 20 MHz bandwidth, because a type of the largest resource unit is 4×26, allocation of the frequency domain resource on the right side of the symmetric center, namely, the frequency domain resource corresponding to the location #D, is complete.

Afterward, as shown in FIG. 10, a preset rule (hereinafter denoted as a preset rule #9 for ease of understanding and distinguishing) corresponding to a preset subcarrier quantity of 2×26 is determined, and determining is performed from left to right.

In other words, allocation of resource units at the second layer in FIG. 5 is used as a determining criterion, and determining is performed from left to right in sequence.

A resource unit corresponding to the location #E (namely, on the left side of the symmetric center of 10 MHz) at the second layer in FIG. 5 is the resource unit #1", and the quantity of the subcarriers included in the resource unit #1" is 2×26, meeting a determining condition corresponding to the preset rule #9, that is, the quantity of the subcarriers included in the resource unit 1" is equal to the preset subcarrier quantity corresponding to the preset rule #9. Therefore, an indication identifier of the location #E (or the resource unit 1") under the preset rule #9 is 1.

A resource unit corresponding to the location #F (namely, on the right side of the symmetric center of 10 MHz) at the second layer in FIG. 5 is the resource unit #2", and the quantity of the subcarriers included in the resource unit #2" is 2×26, meeting the determining condition corresponding to the preset rule #9, that is, the quantity of the subcarriers included in the resource unit 2" is equal to the preset subcarrier quantity corresponding to the preset rule #9. Therefore, an indication identifier of the location #F (or the resource unit 2") under the preset rule #9 is 1.

It should be noted that, in the foregoing description, to correspond to processing in different bandwidths, different marks are used for distinguishing the preset rule #3 and the preset rule #8, as well as the preset rule #4 and the preset rule #9; however, preset subcarrier quantities corresponding to the preset rules are the same.

A bit sequence formed by various indication identifiers generated for the to-be-assigned frequency domain resource shown in FIG. 10 based on the type-1 mapping rule is 010111, and in comparison with the method for generating a bit sequence in the prior art, 12 bits of overheads can be spared.

Certainly, similarly, referring to the foregoing Embodiment 4, in another optional example, for allocation of resource units shown in FIG. 10, first, determining is performed according to a quantity of subcarriers included in a largest resource unit possibly allocated and corresponding to the 40 MHz bandwidth, that is, a preset rule (hereinafter denoted as a preset rule #23 for ease of understanding and distinguishing) corresponding to a preset subcarrier quantity of 484 is determined, and determining is performed to obtain a value of a type-0 bit. In other words, allocation of resource units at the fifth layer in FIG. 5 is used as a determining criterion, and determining is performed to obtain the value of the type-0 bit.

Specifically, in a determining process of the sending end, allocation of resource units shown in FIG. 10 is: the resource unit #1", the resource unit #2", the resource unit #0", the resource unit #3", and the resource unit #4", and the quantities of the subcarriers included in the resource units are 2×26, 2×26, 1×26, 4×26, and 242 respectively, not meeting a determining condition corresponding to the preset rule #22, that is, the quantity of the subcarriers included in any one of the resource unit #1", the resource unit #2", the resource unit #0", the resource unit #3", and the resource unit #4" is not equal to the preset subcarrier quantity (namely, 484) corresponding to the preset rule #23. Therefore, an indication identifier under the preset rule #23 is 0, and the indication identifier is optional. That is, the value of the type-0 bit is 0. After the value of the type-0 bit is obtained, a value of the foregoing type-2 bit continues to be obtained according to the manner shown in FIG. 10.

In other words, if the optional indication identifier under the preset rule #23 is included, a bit sequence formed by various indication identifiers generated for the to-be-assigned frequency domain resource shown in FIG. 10 based on the type-2 mapping rule is 0010111, and in comparison with the method for generating a bit sequence in the prior art, 11 bits of overheads can be spared. Optionally, two bits indicating whether two default resource unit locations are available may be further included.

FIG. 11 shows a tree diagram of still another example of a determining process based on the type-2 mapping rule. Using a to-be-assigned frequency domain resource with a 80 MHz bandwidth as an example, the to-be-assigned frequency domain resource includes one 4×26-tone resource unit (hereinafter denoted as a resource unit #1'" for ease of understanding and distinguishing), one 1×26-tone resource unit (hereinafter denoted as a resource unit #0'" for ease of understanding and distinguishing), one 4×26-tone resource unit (hereinafter denoted as a resource unit #2'" for ease of understanding and distinguishing), one 242-tone resource unit (hereinafter denoted as a resource unit #3'" for ease of understanding and distinguishing), one 1×26-tone resource unit (hereinafter denoted as a resource unit #00'" for ease of understanding and distinguishing), and one 2×242-tone resource unit (hereinafter denoted as a resource unit #4'" for ease of understanding and distinguishing) from left to right in sequence.

First, as shown in FIG. 11, a quantity of subcarriers included in the largest resource unit located on one side the symmetric center in the 80 MHz bandwidth is determined, that is, a preset rule (hereinafter denoted as a preset rule #10 for ease of understanding and distinguishing) corresponding to a preset subcarrier quantity of 2×242 is determined, and determining is performed from left to right in sequence.

In other words, allocation of resource units at the fifth layer in FIG. 6 is used as a determining criterion, and determining is performed from left to right in sequence.

In a determining process of the sending end, resource units corresponding to the location #a (namely, on the left side of the resource unit #00" in the symmetric center of 80 MHz) at the fifth layer in FIG. 6 are the resource unit #1'", the resource unit #0'", the resource unit #2'", and the resource unit #3'", and quantities of subcarriers included in the resource units are not 2×242, not meeting a determining condition corresponding to the preset rule #10, that is, the quantities of the subcarriers included in the resource unit #1'", the resource unit #0'", the resource unit #2'", and the resource unit #3" are not equal to the preset subcarrier quantity (namely, 2×242) corresponding to the preset rule #10. Therefore, an indication identifier of the location #A (or the resource unit #1'", the resource unit #0'", the resource unit #2'", and the resource unit #3") under the preset rule #10 is 0.

In addition, in the 80 MHz bandwidth, because one 1×26-tone resource unit (namely, the resource unit #00'") located in a middle location of the bandwidth always exists, the resource unit may be implicitly indicated.

A resource unit corresponding to the location #b (namely, on the right side of the resource unit #00" in the symmetric center of 80 MHz) at the fifth layer in FIG. 6 is the resource unit #4'", and a quantity of subcarriers included in the resource unit #4''' is 2×242, meeting the determining condition corresponding to the preset rule #10, that is, the quantity of the subcarriers included in the resource unit #4''' is equal to the preset subcarrier quantity corresponding to the preset rule #10. Therefore, an indication identifier of the location #b (or the resource unit #4''') under the preset rule #10 is 1.

Herein, in the 80 MHz bandwidth, because a type of the largest resource unit is 2×242, allocation of the frequency domain resource on the right side of the symmetric center, namely, the frequency domain resource corresponding to the location #b, is complete.

Afterward, as shown in FIG. 11, a quantity of subcarriers included in a largest resource unit in a 40 MHz bandwidth, in a 40 MHz bandwidth frequency domain resource that is not completely allocated on the left side of the symmetric center is determined, that is, a preset rule (hereinafter denoted as a preset rule #11 for ease of understanding and distinguishing) corresponding to a preset subcarrier quantity of 242 is determined, and determining is performed from left to right in sequence.

In other words, allocation of resource units at the fourth layer in FIG. 6 is used as a determining criterion, and determining is performed from left to right in sequence.

In a determining process of the sending end, resource units corresponding to the location #c (namely, on the left side of the symmetric center of 40 MHz) at the fourth layer in FIG. 6 are the resource unit #1''', the resource unit #0''', and the resource unit #2''', and the quantities of the subcarriers included in the resource units are not 242, not meeting a determining condition corresponding to the preset rule #11, that is, the quantities of the subcarriers included in the resource unit #1''', the resource unit #0''', and the resource unit #2''' are not equal to the preset subcarrier quantity (namely, 242) corresponding to the preset rule #11. Therefore, an indication identifier of the location #c (or the resource unit #1''', the resource unit #0''', and the resource unit #2''') under the preset rule #11 is 0.

A resource unit corresponding to the location #d (namely, on the right side of the symmetric center of 40 MHz) at the fourth layer in FIG. 6 is the resource unit #3''', and the quantity of the subcarriers included in the resource unit #3''' is 242, meeting the determining condition corresponding to the preset rule #11, that is, the quantity of the subcarriers included in the resource unit #3''' is equal to the preset subcarrier quantity corresponding to the preset rule #11. Therefore, an indication identifier of the location #d (or the resource unit #3''') under the preset rule #11 is 1.

Herein, in the 40 MHz bandwidth, because a type of the largest resource unit is 242, allocation of the frequency domain resource on the right side of the symmetric center, namely, the frequency domain resource corresponding to the location #d, is complete.

Afterward, as shown in FIG. 11, a preset rule (hereinafter denoted as a preset rule #12 for ease of understanding and distinguishing) corresponding to a preset subcarrier quantity of 4×26 is determined, and determining is performed from left to right.

In other words, allocation of resource units at the third layer in FIG. 6 is used as a determining criterion, and determining is performed from left to right in sequence.

A resource unit corresponding to the location #e (namely, on the left side of the symmetric center of 20 MHz) at the third layer in FIG. 6 is the resource unit #1''', and the quantity of the subcarriers included in the resource unit #1''' is 4×26, meeting a determining condition corresponding to the preset rule #12, that is, the quantity of the subcarriers included in the resource unit 1''' is equal to the preset subcarrier quantity corresponding to the preset rule #12. Therefore, an indication identifier of the location #e (or the resource unit 1''') under the preset rule #12 is 1.

In addition, in the 20 MHz bandwidth, because one 1×26-tone resource unit (namely, the resource unit #0''') located in a middle location of the bandwidth always exists, the resource unit may be implicitly indicated.

A resource unit corresponding to the location #f (namely, on the right side of the symmetric center of 20 MHz) at the third layer in FIG. 6 is the resource unit #2''', and the quantity of the subcarriers included in the resource unit #2''' is 4×26, meeting the determining condition corresponding to the preset rule #12, that is, the quantity of the subcarriers included in the resource unit 2''' is equal to the preset subcarrier quantity corresponding to the preset rule #12. Therefore, an indication identifier of the location #f (or the resource unit 2''') under the preset rule #12 is 1.

Herein, in the 20 MHz bandwidth, because a type of a largest resource unit is 4×26, allocation of the frequency domain resources on the left side and the right side of the symmetric center, namely, the frequency domain resources corresponding to the location #e and the location #f, is complete.

It should be noted that, in the foregoing description, to correspond to processing in different bandwidths, different marks are used for distinguishing the preset rule #3 and the preset rule #8, as well as the preset rule #4 and the preset rule #9; however, preset subcarrier quantities corresponding to the preset rules are the same.

A bit sequence formed by various indication identifiers generated for the to-be-assigned frequency domain resource shown in FIG. 11 based on the type-1 mapping rule is 010111, and in comparison with the method for generating a bit sequence in the prior art, 31 bits of overheads can be spared.

Certainly, similarly, referring to the foregoing Embodiment 4, in another optional example, for allocation of resource units shown in FIG. 10, first, determining is performed according to a quantity of subcarriers included in a largest resource unit possibly allocated and corresponding to the 80 MHz bandwidth, that is, a preset rule (hereinafter denoted as a preset rule #24 for ease of understanding and distinguishing) corresponding to a preset subcarrier quantity of 996 is determined, and determining is performed to obtain a value of a type-0 bit. In other words, allocation of resource units at the sixth layer in FIG. 6 is used as a determining criterion, and determining is performed to obtain the value of the type-0 bit.

Specifically, in a determining process of the sending end, allocation of resource units shown in FIG. 11 is: the resource unit #1'', the resource unit #0'', the resource unit #2'', the resource unit #3'', the resource unit #00'', and the resource unit #4'', and the quantities of the subcarriers included in the resource units are 4×26, 1×26, 4×26, 242, 1×26, and 2×242 respectively, not meeting a determining condition corresponding to the preset rule #24, that is, the quantity of the subcarriers included in any one of the resource unit #1'', the resource unit #0'', the resource unit #2'', the resource unit #3'', the resource unit #00'', and the resource unit #4'' is not equal to the preset subcarrier quantity (namely, 996) corresponding to the preset rule #24. Therefore, an indication identifier under the preset rule #24 is 0, and the indication identifier is optional. That is, the value of the type-0 bit is 0. After the value of the type-0 bit is obtained, a value of the foregoing type-2 bit continues to be obtained according to the manner shown in FIG. 11.

In other words, if the optional indication identifier under the preset rule #24 is included, a bit sequence formed by various indication identifiers generated for the to-be-assigned frequency domain resource shown in FIG. 11 based on the type-2 mapping rule is 0010111, and in comparison with the method for generating a bit sequence in the prior art, 30 bits of overheads can be spared. Optionally, five bits indicating whether five default resource unit locations are available may be further included.

For a large bandwidth (larger than 20 MHz), the methods of the embodiments corresponding to FIG. 10 and FIG. 11 may also be applicable only for indicating a minimum granularity of a 20M bandwidth, that is, other methods may be to indicate resource allocation within the 20M bandwidth. In this case, a corresponding dashed line box in FIG. 10 may be removed, and a bit sequence formed by various indication identifiers generated for the to-be-assigned frequency domain resource in FIG. 10 based on the type-1 mapping rule is 01. A corresponding black box in FIG. 11 may be removed, and a bit sequence formed by various indication identifiers generated for the to-be-assigned frequency domain resource in FIG. 11 based on the type-1 mapping rule is 0101.

γ. Type-3 Mapping Rule (Corresponding to Embodiment 3)

In this embodiment, the sending end may determine the identifier of each resource unit under each mapping rule in the ascending order of the preset subcarrier quantities.

In this case, a type-3 mapping rule (hereinafter denoted as a mapping rule #C for ease of understanding and distinguishing) may be described as determining whether a size of a resource unit located in a specified frequency domain location (namely, a quantity of included subcarriers) on a left side or a right side of a symmetric center is greater than or equal to a preset subcarrier quantity corresponding to the mapping rule #C. If yes is determined, an indication identifier of the frequency domain location under the mapping rule #C is 1. If no is determined, an indication identifier of the frequency domain location under the mapping rule #C is 0.

In other words, the foregoing order of the preset subcarrier quantities may be correspondingly an order of layers shown in FIG. 4 to FIG. 6, that is, the sending end may determine a mapping rule corresponding to each layer in a bottom-up order (namely, the ascending order of the preset subcarrier quantities) in the foregoing allocation map of resource units.

FIG. 12 shows a tree diagram of an example of a determining process based on the type-3 mapping rule. Using a to-be-assigned frequency domain resource with a 20 MHz bandwidth as an example, the to-be-assigned frequency domain resource includes two 2×26-tone resource units (namely, a resource unit #1 and a resource unit #2), one 1×26-tone resource unit (namely, a resource unit #0), and one 4×26-tone resource unit (namely, a resource unit #3) from left to right in sequence.

It should be noted that, in the 20 MHz bandwidth, because one 1×26-tone resource unit (namely, the resource unit #0) located in a middle location of the bandwidth always exists, the resource unit may be implicitly indicated. Therefore, the method 100 is mainly to determine an indication identifier corresponding to any resource unit except the resource unit #0. For avoiding repetition, the following omits descriptions about same or similar cases.

First, as shown in FIG. 12, a preset rule (hereinafter denoted as a preset rule #5 for ease of understanding and distinguishing) corresponding to a preset subcarrier quantity of 1×26 is determined, and determining is performed from left to right in sequence.

In other words, allocation of resource units at the first layer in FIG. 4 is used as a determining criterion, and determining is performed from left to right in sequence.

In a determining process of the sending end, first, whether sizes of resource units (namely, the resource unit #1 and the resource unit #2) on a left side of a symmetric center of the to-be-assigned frequency domain resource (namely, corresponding to the location #7 to the location #10 in FIG. 4) are all 1×26 is determined. Because quantities of subcarriers included in the resource unit #1 and the resource unit #2 are 2×26, not meeting a determining condition corresponding to the preset rule #5, that is, the quantities of the subcarriers included in the resource unit #1 and the resource unit #2 are not both equal to the preset subcarrier quantity corresponding to the preset rule #5, an indication identifier of the location #7 to the location #10 (or the resource unit #1 and the resource unit #2) in FIG. 4 under the preset rule #5 is 0.

Afterward, whether sizes of resource units (namely, a resource unit #3) on a right side of the symmetric center of the to-be-assigned frequency domain resource (namely, corresponding to the location #11 to the location #14 in FIG. 4) are all 1×26 is determined. Because a quantity of subcarriers included in the resource unit #3 is 4×26, not meeting the determining condition corresponding to the preset rule #5, that is, the quantity of the subcarriers included in the resource unit #3 is not equal to the preset subcarrier quantity corresponding to the preset rule #5, an indication identifier of the location #11 to the location #14 (or the resource unit #3) in FIG. 4 under the preset rule #5 is 0.

Afterward, as shown in FIG. 12, a preset rule (hereinafter denoted as a preset rule #6 for ease of understanding and distinguishing) corresponding to a preset subcarrier quantity of 2×26 is determined, and determining is performed from left to right.

In other words, allocation of resource units at the second layer in FIG. 4 is used as a determining criterion, and determining is performed from left to right in sequence.

A resource unit corresponding to the location #1 at the second layer in FIG. 4 is the resource unit #1, and the quantity of the subcarriers included in the resource unit #1 is 2×26, meeting a determining condition corresponding to the preset rule #6, that is, the quantity of the subcarriers included in the resource unit #1 is equal to the preset subcarrier quantity corresponding to the preset rule #6. Therefore, an indication identifier of the location #1 (or the resource unit #1) under the preset rule #6 is 1.

A resource unit corresponding to the location #2 at the second layer in FIG. 4 is the resource unit #2, and the quantity of the subcarriers included in the resource unit #2 is 2×26, meeting the determining condition corresponding to the preset rule #6, that is, the quantity of the subcarriers included in the resource unit #2 is equal to the preset subcarrier quantity corresponding to the preset rule #6. Therefore, an indication identifier of the location #2 (or the resource unit #2) under the preset rule #6 is 1.

A resource unit corresponding to the location #3 at the second layer in FIG. 4 is the resource unit #3, and the quantity of the subcarriers included in the resource unit #3 is 4×26, not meeting the determining condition corresponding to the preset rule #6, that is, the quantity of the subcarriers included in the resource unit #3 is not equal to the preset subcarrier quantity corresponding to the preset rule #6. Therefore, an indication identifier of the location #3 under the preset rule #6 is 0.

A resource unit corresponding to the location #4 at the second layer in FIG. 4 is the resource unit #3, and the quantity of the subcarriers included in the resource unit #3 is 4×26, not meeting the determining condition corresponding to the preset rule #6, that is, the quantity of the subcarriers included in the resource unit #4 is not equal to the preset subcarrier quantity corresponding to the preset rule #6. Therefore, an indication identifier of the location #4 under the preset rule #6 is 0.

That is, the indication identifier of the resource unit #3 under the preset rule #6 is 00.

For the 20 MHz bandwidth frequency domain resource, only the case shown in FIG. 4 exists in the allocation of resource units on either side of the symmetric center of the frequency domain resource. Therefore, when the indication identifier corresponding to the location #11 to the location #14 is 0, and the indication identifier corresponding to the location #4 is 0, it can be determined that the resource unit (namely, the resource unit #3) corresponding to the location #6 is a 4×26-tone resource unit.

A bit sequence formed by various indication identifiers generated for the to-be-assigned frequency domain resource shown in FIG. 12 based on the type-3 mapping rule is 001100, and in comparison with the method for generating a bit sequence in the prior art, three bits of overheads can be spared.

Correspondingly, in a determining process of the receiving end, the first bit in the bit sequence indicates allocation of resource units in the to-be-assigned frequency domain resource in the location #7 to the location #10 at the first layer in FIG. 4.

The first indication identifier is 0. Therefore, the receiving end may determine: the quantities of the subcarriers included in the resource units (namely, the resource unit #1 and the resource unit #2) in the location #7 to the location #10 at the first layer in FIG. 4 do not meet the determining condition corresponding to the preset rule #5, that is, the quantities of the subcarriers included in the resource units in the location #7 to the location #10 are not all equal to the preset subcarrier quantity (namely, 1×26) corresponding to the preset rule #5.

The second indication identifier is 0. Therefore, the receiving end may determine: the quantity of the subcarriers included in the resource unit (namely, the resource unit #3) in the location #11 to the location #14 at the first layer in FIG. 4 does not meet the determining condition corresponding to the preset rule #5, that is, the quantity of the subcarriers included in the resource unit in the location #11 to the location #14 is not equal to the preset subcarrier quantity (namely, 1×26) corresponding to the preset rule #5.

The third indication identifier is 1. Therefore, the receiving end may determine: the quantity of the subcarriers included in the resource unit (namely, the resource unit #1) in the location #1 at the second layer in FIG. 4 meets the determining condition corresponding to the preset rule #6, that is, the quantity of the subcarriers included in the resource unit in the location #1 is equal to the preset subcarrier quantity (namely, 2×26) corresponding to the preset rule #6.

Therefore, with reference to the first indication identifier and the third indication identifier, the receiving end can determine that the size of the first resource unit from the left or the resource unit in the location #1 (namely, the resource unit #1) in the frequency domain resource is 2×26.

The fourth indication identifier is 1. Therefore, the receiving end may determine: the quantity of the subcarriers included in the resource unit (namely, the resource unit #2) in the location #2 at the second layer in FIG. 4 meets the determining condition corresponding to the preset rule #6, that is, the quantity of the subcarriers included in the resource unit in the location #2 is equal to the preset subcarrier quantity (namely, 2×26) corresponding to the preset rule #6.

Therefore, with reference to the first indication identifier and the fourth indication identifier, the receiving end can determine that the size of the second resource unit from the left or the resource unit in the location #2 (namely, the resource unit #1) in the frequency domain resource is 2×26.

The fifth indication identifier is 0. Therefore, the receiving end may determine: the quantity of the subcarriers included in the resource unit (namely, the resource unit #3) in the location #3 at the second layer in FIG. 4 does not meet the determining condition corresponding to the preset rule #6, that is, the quantity of the subcarriers included in the resource unit in the location #3 is not equal to the preset subcarrier quantity (namely, 2×26) corresponding to the preset rule #6.

The sixth indication identifier is 0. Therefore, the receiving end may determine: the quantity of the subcarriers included in the resource unit (namely, the resource unit #3) in the location #3 at the second layer in FIG. 4 does not meet the determining condition corresponding to the preset rule #6, that is, the quantity of the subcarriers included in the resource unit in the location #3 is not equal to the preset subcarrier quantity (namely, 2×26) corresponding to the preset rule #6.

Therefore, with reference to the first indication identifier, the fifth indication identifier, and the sixth indication identifier, the receiving end can determine that the size of the fourth resource unit from the left or the resource unit in the location #3 and the location #4 (namely, the resource unit #3) in the frequency domain resource is 4×26.

As described above, the determining process of the receiving end is a process inverse to the determining process of the sending end. For avoiding repetition, the following omits the detailed description about the determining process of the receiving end that is inverse to the determining process of the sending end.

FIG. 13 shows a tree diagram of another example of a determining process based on the type-3 mapping rule. Using a to-be-assigned frequency domain resource with a 20 MHz bandwidth as an example, the to-be-assigned frequency domain resource includes one 2×26-tone resource unit (hereinafter denoted as a resource unit #1' for ease of understanding and distinguishing), three 1×26-tone resource units (hereinafter denoted as a resource unit #2', a resource unit #3', and a resource unit #0' for ease of understanding and distinguishing), and one 4×26-tone resource unit (hereinafter denoted as a resource unit #4' for ease of understanding and distinguishing) from left to right in sequence.

It should be noted that, in the 20 MHz bandwidth, because one 1×26-tone resource unit (namely, the resource unit #0') located in a center location of the bandwidth always exists, the resource unit may be implicitly indicated. Therefore, the method 100 is mainly to determine an indication identifier corresponding to any resource unit except the resource unit #0'. For avoiding repetition, the following omits descriptions about same or similar cases.

First, as shown in FIG. 13, a preset rule (namely, a preset rule #5) corresponding to a preset subcarrier quantity of 1×26 is determined, and determining is performed from left to right in sequence.

In other words, allocation of resource units at the first layer in FIG. 4 is used as a determining criterion, and determining is performed from left to right in sequence.

In a determining process of the sending end, first, whether sizes of resource units (namely, the resource unit #1', the resource unit #2', and the resource unit #3') on a left side of a symmetric center of the to-be-assigned frequency domain resource (namely, corresponding to the location #7 to the location #10 in FIG. 4) are all 1×26 is determined. Because a quantity of subcarriers included in the resource unit #1' is 2×26, the resource units located on the left side of the symmetric center do not meet a determining condition corresponding to the preset rule #6. Therefore, an indication identifier of the location #7 to the location #10 (or the resource unit #1', the resource unit #2', and the resource unit #3') in FIG. 4 under the preset rule #5 is 0.

Afterward, whether sizes of resource units (namely, the resource unit #3') on a right side of the symmetric center of the to-be-assigned frequency domain resource (namely, corresponding to the location #11 to the location #14 in FIG. 4) are all 1×26 is determined. Because a quantity of subcarriers included in the resource unit #3' is 4×26, not meeting the determining condition corresponding to the preset rule #5, an indication identifier of the location #11 to the location #14 (or the resource unit #3') in FIG. 4 under the preset rule #5 is 0.

Afterward, as shown in FIG. 13, a preset rule (namely, a preset rule #6) corresponding to a preset subcarrier quantity of 2×26 is determined, and determining is performed from left to right.

In other words, allocation of resource units at the second layer in FIG. 4 is used as a determining criterion, and determining is performed from left to right in sequence.

A resource unit corresponding to the location #1 at the second layer in FIG. 4 is the resource unit #1', and the quantity of the subcarriers included in the resource unit #1' is 2×26, meeting a determining condition corresponding to the preset rule #6, that is, the quantity of the subcarriers included in the resource unit #1 is equal to the preset subcarrier quantity corresponding to the preset rule #6. Therefore, an indication identifier of the location #1 (or the resource unit #1) under the preset rule #6 is 1.

Resource units corresponding to the location #2 at the second layer in FIG. 4 are the resource unit #2' and the resource unit #3', and the quantities of the subcarriers included in the resource unit #2' and the resource unit #3' are 1×26, not meeting the determining condition corresponding to the preset rule #6, that is, the quantities of the subcarriers included in the resource unit #2' and the resource unit #3' are not equal to the preset subcarrier quantity corresponding to the preset rule #6. Therefore, an indication identifier of the location #2 (or the resource unit #2' and the resource unit #3') under the preset rule #6 is 0.

A resource unit corresponding to the location #3 at the second layer in FIG. 4 is the resource unit #3, and the quantity of the subcarriers included in the resource unit #3 is 4×26, not meeting the determining condition corresponding to the preset rule #6, that is, the quantity of the subcarriers included in the resource unit #3 is not equal to the preset subcarrier quantity corresponding to the preset rule #6. Therefore, an indication identifier of the location #3 under the preset rule #6 is 0.

A resource unit corresponding to the location #4 at the second layer in FIG. 4 is the resource unit #3, and a quantity of subcarriers included in the resource unit #3 is 4×26, not meeting the determining condition corresponding to the preset rule #6, that is, the quantity of the subcarriers included in the resource unit #4 is equal to the preset subcarrier quantity corresponding to the preset rule #6. Therefore, an indication identifier of the location #4 under the preset rule #6 is 0.

That is, the indication identifier of the resource unit #3 under the preset rule #6 is 00.

For the 20 MHz bandwidth frequency domain resource, only the case shown in FIG. 4 exists in the allocation of resource units on either side of the symmetric center of the frequency domain resource. Therefore, when the indication identifier corresponding to the location #11 to the location #14 is 0, and the indication identifier corresponding to the location #4 is 0, it can be determined that the resource unit (namely, the resource unit #3) corresponding to the location #6 is a 4×26-tone resource unit.

A bit sequence formed by various indication identifiers generated for the to-be-assigned frequency domain resource shown in FIG. 13 based on the type-3 mapping rule is 001000, and in comparison with the method for generating a bit sequence in the prior art, three bits of overheads can be spared.

It should be understood that, the foregoing process of determining each indication identifier and a bit sequence based on each mapping rule is merely an example, and the present invention is not limited thereto. For example, although the foregoing illustrates a process of determining in a left-to-right order, determining may also be performed in a right-to-left order, so long as it is ensured that the receiving end and the sending end use a corresponding order.

In addition, the foregoing illustrated bandwidth of the to-be-assigned frequency domain resource is merely an example, and the present invention is not limited thereto. The foregoing three types of mapping rules may be further applicable for indicating allocation of a frequency domain resource with a larger bandwidth, for example, 40 MHz, 80 MHz, or 160 MHz. In addition, a specific determining process is similar to a determining process for 40 MHz or 80 MHz in the type-2 mapping rule. Herein for avoiding repetition, a detailed description thereof is omitted.

The foregoing three types of mapping rules may be further applicable for indicating allocation of a frequency domain resource with a larger bandwidth and indicating a minimum granularity of 20 MHz (within the 20 MHz bandwidth, other methods may be used for indicating), for example, 40 MHz, 80 MHz, or 160 MHz. Moreover, a specific determining process is similar to a determining process for 40 MHz or 80 MHz in the type-2 mapping rule. Herein for avoiding repetition, a detailed description thereof is omitted.

Embodiment 5

As mentioned above, in the foregoing Embodiment 1, 2, 3, or 4, for 40 MHz, 80 MHz, and 160 MHz bandwidths, a similar manner is to indicate allocation of resource units on the whole.

In Embodiment 5, a difference lies in that, for each 20 MHz bandwidth in the 40 MHz, 80 MHz, and 160 MHz bandwidths, the method of the foregoing Embodiment 1, 2, 3, or 4, or a possible combination thereof may be used repeatedly for indicating. In other words, for a larger bandwidth, a bit sequence for indicating allocation of resource units of the bandwidth includes: a bit sequence to indicate allocation of resource units in each basic bandwidth (smallest unit of bandwidth allocation, for example, 20 MHz), and an aggregation indication bit to indicate whether two adjacent basic bandwidths are distributed in one to-be-assigned resource unit.

For example, if a to-be-assigned frequency domain resource is 40 MHz, a 20 MHz bandwidth indicating method is used twice repeatedly, that is, two bit sequences are included to respectively indicate allocation of resource units in the first 20 MHz bandwidth and the second 20 MHz bandwidth according to the foregoing method. For another example, if a to-be-assigned frequency domain resource is 80 MHz, a 20 MHz bandwidth indicating method is used for four times repeatedly, that is, four segments of sequences are included to respectively indicate allocation of resource units in the first 20 MHz bandwidth, the second 20 MHz bandwidth, the third 20 MHz bandwidth, and the fourth 20 MHz bandwidth according to the foregoing method.

In a specific example, in a method for indicating each 20M bandwidth, when a type-0 bit indicates that the largest resource unit corresponding to the 20 MHz bandwidth is in the actual allocation, that is, a 242-tone resource unit is allocated, the bit sequence for indicating each 20M bandwidth further includes one bit for indicating whether aggregation is performed, and this bit is specifically to indicate whether adjacent 20M may be distributed in one resource unit. For example, if a to-be-assigned frequency domain resource is 40 MHz, when type-0 bits in two segments for respectively indicating two 20 MHz bandwidths both indicate that a 242-tone resource unit is allocated, and aggregation bits both indicate that adjacent 20M may be distributed in one resource unit, it indicates that the two 20 MHz are distributed in a 484-tone resource unit. For another example, if a to-be-assigned frequency domain resource is 80 MHz, when type-0 bits in last two segments for indicating last two 20 MHz bandwidths, in four segments of bits, both indicate that a 242-tone resource unit is allocated, and aggregation bits both indicate that adjacent 20M may be distributed in one resource unit, it indicates that the last two 20 MHz are distributed in a 484-tone resource unit; when type-0 bits in the four segments for indicating the four 20 MHz bandwidths all indicate that a 242-tone resource unit is allocated, and aggregation bits all indicate that adjacent 20M may be distributed in one resource unit, it indicates that the four 20 MHz are distributed in a 996-tone resource unit.

More specifically, in Embodiment 5, a specific determining process also refers to each of the foregoing determining methods for generating a corresponding bit, such as a type-0 bit, a type-1 bit, a type-2 bit, or a type-3 bit.

For example, for the to-be-assigned 40 MHz bandwidth shown in FIG. 10, the 20 MHz indicating method (the method of the embodiment corresponding to FIG. 9) may be used twice repeatedly for indicating. If an optional indication identifier under the preset rule #22 is included, a bit sequence formed by various indication identifiers generated for the first 20 MHz based on the type-2 mapping rule is 00111. A bit sequence formed by various indication identifiers generated for the second 20 MHz based on the type-2 mapping rule is 1. When an optional indication identifier under the preset rule #22 in a certain 20 MHz bandwidth is 1, it indicates that the 20 MHz bandwidth is divided into a 242-tone resource unit or divided with an adjacent 20 MHz into a larger resource unit. A bit sequence formed by various indication identifiers generated for the 20 MHz based on the type-2 mapping rule further includes an aggregation bit, and this bit is to indicate whether the 20 MHz bandwidth is divided into a 242-tone resource unit or divided with an adjacent 20 MHz into a larger resource unit. Because the second 20 MHz bandwidth is not divided with an adjacent 20 MHz into a larger resource unit, the aggregation bit is 0. Therefore, a bit sequence formed by various indication identifiers generated for the second 20 MHz based on the type-2 mapping rule is 10. The 20 MHz adjacency refers to two contiguous 20 MHz, or four contiguous 20 MHz, or eight contiguous 20 MHz from left to right, which are divided together into a 484-tone resource unit, or a 996-tone resource unit, or a 996×2-tone resource unit.

Therefore, a bit sequence formed by various indication identifiers generated for the to-be-assigned 40 MHz bandwidth shown in FIG. 10 based on the type-2 mapping rule is 0011110. Optionally, two bits indicating whether default resource unit locations are available may be further included.

When one 20 MHz in two contiguous 20 MHz is not divided into a 242-tone resource unit or is divided with the adjacent 20 MHz into a larger resource unit, but the other one is divided into a 242-tone resource unit or divided with the adjacent 20 MHz into a larger resource unit, a bit sequence formed by various indication identifiers generated for the second 20 MHz based on the type-1 mapping rule may not include an aggregation bit. Therefore, the bit sequence formed by various indication identifiers generated for the to-be-assigned 40 MHz bandwidth shown in FIG. 10 based on the type-2 mapping rule may also be 001111.

For another example, for the to-be-assigned 80 MHz bandwidth shown in FIG. 11, the 20 MHz indicating method (the method of the embodiment corresponding to FIG. 9) may be used for four times repeatedly. If an optional indication identifier under the preset rule #22 is included, a bit sequence formed by various indication identifiers generated for the first 20 MHz based on the type-2 mapping rule is 011. A bit sequence formed by various indication identifiers generated for the second 20 MHz based on the type-2 mapping rule is 1. A bit sequence formed by various indication identifiers generated for the third 20 MHz based on the type-2 mapping rule is 1. A bit sequence formed by various indication identifiers generated for the fourth 20 MHz based on the type-2 mapping rule is 1. When an optional indication identifier under the preset rule #22 in a certain 20 MHz bandwidth is 1, it indicates that the 20 MHz bandwidth is divided into a 242-tone resource unit or divided with an adjacent 20 MHz into a larger resource unit. A bit sequence formed by various indication identifiers generated for the 20 MHz based on the type-2 mapping rule further includes an aggregation bit, and this bit is to indicate whether the 20 MHz bandwidth is divided into a 242-tone resource unit or divided with an adjacent 20 MHz into a larger resource unit. Because the second 20 MHz bandwidth is not divided with an adjacent 20 MHz into a larger resource unit, the aggregation bit is 0. Therefore, a bit sequence formed by various indication identifiers generated for the second 20 MHz based on the type-2 mapping rule is 10. Because the third 20 MHz bandwidth is divided with an adjacent 20 MHz into a larger resource unit, the aggregation bit is 1. Therefore, a bit sequence formed by various indication identifiers generated for the third 20 MHz based on the type-2 mapping rule is 11. Because the fourth 20 MHz bandwidth is divided with an adjacent 20 MHz into a larger resource unit, the aggregation bit is 1. Therefore, a bit sequence formed by various indication identifiers generated for the fourth 20 MHz based on the type-2 mapping rule is 11. The 20 MHz adjacency refers to two contiguous 20 MHz, or four contiguous 20 MHz, or eight contiguous 20 MHz from left to right, which are divided together into a 484-tone resource unit, or a 996-tone resource unit, or a 996×2-tone resource unit.

One aggregation bit indicating adjacent 20 MHz indicates that two contiguous 20 MHz from left to right can constitute a 484-tone resource unit. Two aggregation bits indicating adjacent 20 MHz indicate that four contiguous 20 MHz from left to right can constitute a 996-tone resource unit. Three aggregation bits indicating adjacent 20 MHz indicate that four contiguous 20 MHz from left to right can constitute a 996×2-tone resource unit.

Therefore, a bit sequence formed by various indication identifiers generated for the to-be-assigned 80 MHz bandwidth shown in FIG. 11 based on the type-2 mapping rule is 011101111. Optionally, five bits indicating whether five default resource unit locations are available are further included.

When one 20 MHz in two contiguous 20 MHz is not divided into a 242-tone resource unit or is divided with the adjacent 20 MHz into a larger resource unit, but the other one is divided into a 242-tone resource unit or divided with the adjacent 20 MHz into a larger resource unit, a bit sequence formed by various indication identifiers generated for the second 20 MHz based on the type-2 mapping rule may not include an aggregation bit. Therefore, the bit sequence formed by various indication identifiers generated for the to-be-assigned 40 MHz bandwidth shown in FIG. 10 based on the type-2 mapping rule may also be 01111111.

Embodiment 6

As mentioned above, in the foregoing Embodiment 1, 2, 3, 4, or 5, for 20 MHz, 40 MHz, 80 MHz, and 160 MHz bandwidths, resource units indicated by a bit sequence may be used for single-user (SU) transmission in OFDMA, or may be used for MU-MIMO transmission in OFDMA, or may be used for MU-MIMO transmission. The former may be considered as SU transmission. The latter two may be both considered as MU transmission.

Optionally, the resource scheduling information further includes information indicating information related to the number of the station(s) communicating in the resource unit(s) indicated by the resource scheduling information. Two bits or three bits are used to indicate the number of the stations performing in SU or MU-MIMO communication. For example, "00" indicates that the number of the stations is 1, that is, the resource unit is used for SU communication. For another example, "11" indicates that the number of the stations is 4, and, the resource unit is used for MU communication.

A communications protocol may predefine a resource unit of a smallest size that rudimentarily supports MU-MIMO, for example, 2×26-tone or 4×26-tone. In an example, a 4×26-tone resource unit is the smallest basic resource unit allowable for MU-MIMO transmission. In the example, a resource unit of 4×26 size may support a maximum of four users in MU-MIMO transmission, and a resource unit of 242 size or a larger size may support a maximum of eight users in MU-MIMO transmission. Therefore, for a resource unit in the allocation smaller than the smallest size for MU-MIMO, a SU transmission mode is carried out by default, and no bit is required for indicating the number of the station(s) performing communication in the resource unit.

In an example of allocation of resource units of 80 MHz shown in FIG. 11, a frequency domain resource unit #1" and a frequency domain resource unit #3" are used for MU-MIMO communication, and are respectively allocated 3 stations and 7 stations. A bit sequence(s) comprises indication identifiers generated based on the type-2 mapping rule, i.e., 011101111, where a bit sequence corresponding to the first 20 MHz is 011, a bit sequence corresponding to the second 20 MHz is 10, a bit sequence corresponding to the third 20 MHz is 11, and a bit sequence corresponding to the fourth 20 MHz is 11. A bit sequence indicating the number of the stations in the first 20 MHz resource unit is 1000, a bit sequence indicating the number of the stations in the second 20 MHz resource unit is 111, a bit sequence indicating the number of stations in the third 20 MHz resource unit is 000, and a bit sequence indicating the number of stations in the fourth 20 MHz resource unit is 000.

Embodiment 7

Based on the foregoing embodiments, in a specific example, a bit sequence of resource allocation with a length of at least eight bits is provided, and is to indicate at least resource units actually allocated and information related to the quantity of the station(s) performing transmission on a resource unit (especially including the quantity of the stations participating in MU-MIMO transmission). Specifically, the at least eight indication bits, the resource units actually allocated and indicated by the indication bits, and the quantity of stations performing transmission on a resource unit may be expressed simply by using a table.

In a wireless local area network, this table may be stored on an AP and/or a STA, so that the AP and/or the STA may generate or parse a bit sequence of resource allocation according to this table. If the table query manner is not used, the foregoing type-1 mapping rule, type-2 mapping rule, or type-3 mapping rule may also be to generate or parse the resource allocation bit sequence.

In the example shown in the following Table 1, the eight bits indicate a total of 256 resource allocation bit sequences. An 8-bit resource allocation bit sequence in Table 1 may include a type-0 bit in Embodiment 4, a type-2 bit(s) in Embodiment 2, a bit(s) indicating the information related to the quantity of stations performing transmission on a resource unit in Embodiment 6, and some reserved bits. If a table storage manner is not used, specific implementation manners shown in FIG. 23*a*-1, FIG. 23*a*-2, and FIG. 23*b* may also be to obtain the resource allocation bit sequence corresponding to the resource units actually allocated and the quantity of stations performing transmission on a resource unit as shown in Table 1.

TABLE 1

| Sequence number | Resource allocation bit sequence | Resource units actually obtained by division (from left to right) | | | | | | | | |
|---|---|---|---|---|---|---|---|---|---|---|
| 1 | 000, 0000, 0 | 26 | 26 | 26 | 26 | 26 | 26 | 26 | 26 | 26 |
| 2 | 000, 0001, 0 | 26 | 26 | 26 | 26 | 26 | 26 | 26 | 52 | |
| 3 | 000, 0010, 0 | 26 | 26 | 26 | 26 | 26 | 52 | | 26 | 26 |
| 4 | 000, 0011, 0 | 26 | 26 | 26 | 26 | 26 | 52 | | 52 | |
| 5 | 000, 0100, 0 | 26 | 26 | 52 | | 26 | 26 | 26 | 26 | 26 |
| 6 | 000, 0101, 0 | 26 | 26 | 52 | | 26 | 26 | 26 | 52 | |

TABLE 1-continued

| Sequence number | Resource allocation bit sequence | Resource units actually obtained by division (from left to right) | | | | | | | | |
|---|---|---|---|---|---|---|---|---|---|---|
| 7 | 000, 0110, 0 | 26 | 26 | 52 | | 26 | 52 | | 26 | 26 |
| 8 | 000, 0111, 0 | 26 | 26 | 52 | | 26 | 52 | | 52 | |
| 9 | 000, 1000, 0 | 52 | | 26 | 26 | 26 | 26 | 26 | 26 | 26 |
| 10 | 000, 1001, 0 | 52 | | 26 | 26 | 26 | 26 | 26 | 52 | |
| 11 | 000, 1010, 0 | 52 | | 26 | 26 | 26 | 52 | | 26 | 26 |
| 12 | 000, 1011, 0 | 52 | | 26 | 26 | 26 | 52 | | 52 | |
| 13 | 000, 1100, 0 | 52 | | 52 | | 26 | 26 | 26 | 26 | 26 |
| 14 | 000, 1101, 0 | 52 | | 52 | | 26 | 26 | 26 | 52 | |
| 15 | 000, 1110, 0 | 52 | | 52 | | 26 | 52 | | 26 | 26 |
| 16 | 000, 1111, 0 | 52 | | 52 | | 26 | 52 | | 52 | |
| 17 | 000, 0000, 1 | | | | | Reserved | | | | |
| 18 | 000, 0001, 1 | | | | | Reserved | | | | |
| 19 | 000, 0010, 1 | | | | | Reserved | | | | |
| 20 | 000, 0011, 1 | | | | | Reserved | | | | |
| 21 | 000, 0100, 1 | | | | | Reserved | | | | |
| 22 | 000, 0101, 1 | | | | | Reserved | | | | |
| 23 | 000, 0110, 1 | | | | | Reserved | | | | |
| 24 | 000, 0111, 1 | | | | | Reserved | | | | |
| 25 | 000, 1000, 1 | | | | | Reserved | | | | |
| 26 | 000, 1001, 1 | | | | | Reserved | | | | |
| 27 | 000, 1010, 1 | | | | | Reserved | | | | |
| 28 | 000, 1011, 1 | | | | | Reserved | | | | |
| 29 | 000, 1100, 1 | | | | | Reserved | | | | |
| 30 | 000, 1101, 1 | | | | | Reserved | | | | |
| 31 | 000, 1110, 1 | | | | | Reserved | | | | |
| 32 | 000, 1111, 1 | | | | | Reserved | | | | |
| 33 | 001, 00, 000 | 26 | 26 | 26 | 26 | 26 | 106 (1) | | | |
| 34 | 001, 00, 001 | 26 | 26 | 26 | 26 | 26 | 106 (2) | | | |
| 35 | 001, 00, 010 | 26 | 26 | 26 | 26 | 26 | 106 (3) | | | |
| 36 | 001, 00, 011 | 26 | 26 | 26 | 26 | 26 | 106 (4) | | | |
| 37 | 001, 00, 100 | 26 | 26 | 26 | 26 | 26 | 106 (5) | | | |
| 38 | 001, 00, 101 | 26 | 26 | 26 | 26 | 26 | 106 (6) | | | |
| 39 | 001, 00, 110 | 26 | 26 | 26 | 26 | 26 | 106 (7) | | | |
| 40 | 001, 00, 111 | 26 | 26 | 26 | 26 | 26 | 106 (8) | | | |
| 41 | 001, 01, 000 | 26 | 26 | 52 | | 26 | 106 (1) | | | |
| 42 | 001, 01, 001 | 26 | 26 | 52 | | 26 | 106 (2) | | | |
| 43 | 001, 01, 010 | 26 | 26 | 52 | | 26 | 106 (3) | | | |
| 44 | 001, 01, 011 | 26 | 26 | 52 | | 26 | 106 (4) | | | |
| 45 | 001, 01, 100 | 26 | 26 | 52 | | 26 | 106 (5) | | | |
| 46 | 001, 01, 101 | 26 | 26 | 52 | | 26 | 106 (6) | | | |
| 47 | 001, 01, 110 | 26 | 26 | 52 | | 26 | 106 (7) | | | |
| 48 | 001, 01, 111 | 26 | 26 | 52 | | 26 | 106 (8) | | | |
| 49 | 001, 10, 000 | 52 | | 26 | 26 | 26 | 106 (1) | | | |
| 50 | 001, 10, 001 | 52 | | 26 | 26 | 26 | 106 (2) | | | |
| 51 | 001, 10, 010 | 52 | | 26 | 26 | 26 | 106 (3) | | | |
| 52 | 001, 10, 011 | 52 | | 26 | 26 | 26 | 106 (4) | | | |
| 53 | 001, 10, 100 | 52 | | 26 | 26 | 26 | 106 (5) | | | |
| 54 | 001, 10, 101 | 52 | | 26 | 26 | 26 | 106 (6) | | | |
| 55 | 001, 10, 110 | 52 | | 26 | 26 | 26 | 106 (7) | | | |
| 56 | 001, 10, 111 | 52 | | 26 | 26 | 26 | 106 (8) | | | |
| 57 | 001, 11, 000 | 52 | | 52 | | 26 | 106 (1) | | | |
| 58 | 001, 11, 001 | 52 | | 52 | | 26 | 106 (2) | | | |
| 59 | 001, 11, 010 | 52 | | 52 | | 26 | 106 (3) | | | |
| 60 | 001, 11, 011 | 52 | | 52 | | 26 | 106 (4) | | | |
| 61 | 001, 11, 100 | 52 | | 52 | | 26 | 106 (5) | | | |
| 62 | 001, 11, 101 | 52 | | 52 | | 26 | 106 (6) | | | |
| 63 | 001, 11, 110 | 52 | | 52 | | 26 | 106 (7) | | | |
| 64 | 001, 11, 111 | 52 | | 52 | | 26 | 106 (8) | | | |
| 65 | 010, 00, 000 | 106 (1) | | | | 26 | 26 | 26 | 26 | 26 |
| 66 | 010, 00, 001 | 106 (2) | | | | 26 | 26 | 26 | 26 | 26 |
| 67 | 010, 00, 010 | 106 (3) | | | | 26 | 26 | 26 | 26 | 26 |
| 68 | 010, 00, 011 | 106 (4) | | | | 26 | 26 | 26 | 26 | 26 |
| 69 | 010, 00, 100 | 106 (5) | | | | 26 | 26 | 26 | 26 | 26 |
| 70 | 010, 00, 101 | 106 (6) | | | | 26 | 26 | 26 | 26 | 26 |
| 71 | 010, 00, 110 | 106 (7) | | | | 26 | 26 | 26 | 26 | 26 |
| 72 | 010, 00, 111 | 106 (8) | | | | 26 | 26 | 26 | 26 | 26 |
| 73 | 010, 01, 000 | 106 (1) | | | | 26 | 26 | 26 | 52 | |
| 74 | 010, 01, 001 | 106 (2) | | | | 26 | 26 | 26 | 52 | |
| 75 | 010, 01, 010 | 106 (3) | | | | 26 | 26 | 26 | 52 | |
| 76 | 010, 01, 011 | 106 (4) | | | | 26 | 26 | 26 | 52 | |
| 77 | 010, 01, 100 | 106 (5) | | | | 26 | 26 | 26 | 52 | |
| 78 | 010, 01, 101 | 106 (6) | | | | 26 | 26 | 26 | 52 | |
| 79 | 010, 01, 110 | 106 (7) | | | | 26 | 26 | 26 | 52 | |
| 80 | 010, 01, 111 | 106 (8) | | | | 26 | 26 | 26 | 52 | |
| 81 | 010, 10, 000 | 106 (1) | | | | 26 | 52 | | 26 | 26 |
| 82 | 010, 10, 001 | 106 (2) | | | | 26 | 52 | | 26 | 26 |

TABLE 1-continued

| Sequence number | Resource allocation bit sequence | Resource units actually obtained by division (from left to right) | | | | |
|---|---|---|---|---|---|---|
| 83 | 010, 10, 010 | 106 (3) | 26 | 52 | 26 | 26 |
| 84 | 010, 10, 011 | 106 (4) | 26 | 52 | 26 | 26 |
| 85 | 010, 10, 100 | 106 (5) | 26 | 52 | 26 | 26 |
| 86 | 010, 10, 101 | 106 (6) | 26 | 52 | 26 | 26 |
| 87 | 010, 10, 110 | 106 (7) | 26 | 52 | 26 | 26 |
| 88 | 010, 10, 111 | 106 (8) | 26 | 52 | 26 | 26 |
| 89 | 010, 11, 000 | 106 (1) | 26 | 52 | 52 | |
| 90 | 010, 11, 001 | 106 (2) | 26 | 52 | 52 | |
| 91 | 010, 11, 010 | 106 (3) | 26 | 52 | 52 | |
| 92 | 010, 11, 011 | 106 (4) | 26 | 52 | 52 | |
| 93 | 010, 11, 100 | 106 (5) | 26 | 52 | 52 | |
| 94 | 010, 11, 101 | 106 (6) | 26 | 52 | 52 | |
| 95 | 010, 11, 110 | 106 (7) | 26 | 52 | 52 | |
| 96 | 010, 11, 111 | 106 (8) | 26 | 52 | 52 | |
| 97 | 011, 0000, 0 | 106 (1) | 26 | | 106 (1) | |
| 98 | 011, 0001, 0 | 106 (1) | 26 | | 106 (2) | |
| 99 | 011, 0010, 0 | 106 (1) | 26 | | 106 (3) | |
| 100 | 011, 0011, 0 | 106 (1) | 26 | | 106 (4) | |
| 101 | 011, 0100, 0 | 106 (2) | 26 | | 106 (1) | |
| 102 | 011, 0101, 0 | 106 (2) | 26 | | 106 (2) | |
| 103 | 011, 0110, 0 | 106 (2) | 26 | | 106 (3) | |
| 104 | 011, 0111, 0 | 106 (2) | 26 | | 106 (4) | |
| 105 | 011, 1000, 0 | 106 (3) | 26 | | 106 (1) | |
| 106 | 011, 1001, 0 | 106 (3) | 26 | | 106 (2) | |
| 107 | 011, 1010, 0 | 106 (3) | 26 | | 106 (3) | |
| 108 | 011, 1011, 0 | 106 (3) | 26 | | 106 (4) | |
| 109 | 011, 1100, 0 | 106 (4) | 26 | | 106 (1) | |
| 110 | 011, 1101, 0 | 106 (4) | 26 | | 106 (2) | |
| 111 | 011, 1110, 0 | 106 (4) | 26 | | 106 (3) | |
| 112 | 011, 1111, 0 | 106 (4) | 26 | | 106 (4) | |
| 113 | 011, 0000, 1 | | Reserved | | | |
| 114 | 011, 0001, 1 | | Reserved | | | |
| 115 | 011, 0010, 1 | | Reserved | | | |
| 116 | 011, 0011, 1 | | Reserved | | | |
| 117 | 011, 0100, 1 | | Reserved | | | |
| 118 | 011, 0101, 1 | | Reserved | | | |
| 119 | 011, 0110, 1 | | Reserved | | | |
| 120 | 011, 0111, 1 | | Reserved | | | |
| 121 | 011, 1000, 1 | | Reserved | | | |
| 122 | 011, 1001, 1 | | Reserved | | | |
| 123 | 011, 1010, 1 | | Reserved | | | |
| 124 | 011, 1011, 1 | | Reserved | | | |
| 125 | 011, 1100, 1 | | Reserved | | | |
| 126 | 011, 1101, 1 | | Reserved | | | |
| 127 | 011, 1110, 1 | | Reserved | | | |
| 128 | 011, 1111, 1 | | Reserved | | | |
| 129 | 10, 00, 000, 0 | | Reserved | | | |
| 130 | 10, 00, 001, 0 | | Reserved | | | |
| 131 | 10, 00, 010, 0 | | Reserved | | | |
| 132 | 10, 00, 011, 0 | | Reserved | | | |
| 133 | 10, 00, 100, 0 | | Reserved | | | |
| 134 | 10, 00, 101, 0 | | Reserved | | | |
| 135 | 10, 00, 110, 0 | | Reserved | | | |
| 136 | 10, 00, 111, 0 | | Reserved | | | |
| 137 | 10, 00, 000, 1 | | Reserved | | | |
| 138 | 10, 00, 001, 1 | | Reserved | | | |
| 139 | 10, 00, 010, 1 | | Reserved | | | |
| 140 | 10, 00, 011, 1 | | Reserved | | | |
| 141 | 10, 00, 100, 1 | | Reserved | | | |
| 142 | 10, 00, 101, 1 | | Reserved | | | |
| 143 | 10, 00, 110, 1 | | Reserved | | | |
| 144 | 10, 00, 111, 1 | | Reserved | | | |
| 145 | 10, 01, 000, 0 | | Reserved | | | |
| 146 | 10, 01, 001, 0 | | Reserved | | | |
| 147 | 10, 01, 010, 0 | | Reserved | | | |
| 148 | 10, 01, 011, 0 | | Reserved | | | |
| 149 | 10, 01, 100, 0 | | Reserved | | | |
| 150 | 10, 01, 101, 0 | | Reserved | | | |
| 151 | 10, 01, 110, 0 | | Reserved | | | |
| 152 | 10, 01, 111, 0 | | Reserved | | | |
| 153 | 10, 01, 001, 1 | | Reserved | | | |
| 154 | 10, 01, 010, 1 | | Reserved | | | |
| 155 | 10, 01, 011, 1 | | Reserved | | | |
| 156 | 10, 01, 100, 1 | | Reserved | | | |
| 157 | 10, 01, 101, 1 | | Reserved | | | |
| 158 | 10, 01, 110, 1 | | Reserved | | | |

TABLE 1-continued

| Sequence number | Resource allocation bit sequence | Resource units actually obtained by division (from left to right) |
|---|---|---|
| 159 | 10, 01, 111, 1 | Reserved |
| 160 | 10, 10, 000, 0 | Reserved |
| 161 | 10, 10, 001, 0 | Reserved |
| 162 | 10, 10, 010, 0 | Reserved |
| 163 | 10, 10, 011, 0 | Reserved |
| 164 | 10, 10, 100, 0 | Reserved |
| 165 | 10, 10, 101, 0 | Reserved |
| 166 | 10, 10, 110, 0 | Reserved |
| 167 | 10, 10, 111, 0 | Reserved |
| 168 | 10, 01, 000, 1 | Reserved |
| 169 | 10, 10, 000, 1 | Reserved |
| 170 | 10, 10, 001, 1 | Reserved |
| 171 | 10, 10, 010, 1 | Reserved |
| 172 | 10, 10, 011, 1 | Reserved |
| 173 | 10, 10, 100, 1 | Reserved |
| 174 | 10, 10, 101, 1 | Reserved |
| 175 | 10, 10, 110, 1 | Reserved |
| 176 | 10, 10, 111, 1 | Reserved |
| 177 | 10, 11, 000, 0 | Reserved |
| 178 | 10, 11, 001, 0 | Reserved |
| 179 | 10, 11, 010, 0 | Reserved |
| 180 | 10, 11, 011, 0 | Reserved |
| 181 | 10, 11, 100, 0 | Reserved |
| 182 | 10, 11, 101, 0 | Reserved |
| 183 | 10, 11, 110, 0 | Reserved |
| 184 | 10, 11, 111, 0 | Reserved |
| 185 | 10, 11, 000, 1 | Reserved |
| 186 | 10, 11, 001, 1 | Reserved |
| 187 | 10, 11, 010, 1 | Reserved |
| 188 | 10, 11, 011, 1 | Reserved |
| 189 | 10, 11, 100, 1 | Reserved |
| 190 | 10, 11, 101, 1 | Reserved |
| 191 | 10, 11, 110, 1 | Reserved |
| 192 | 10, 11, 111, 1 | Reserved |
| 193 | 11, 00, 000, 0 | 242 (1) |
| 194 | 11, 00, 001, 0 | 242 (2) |
| 195 | 11, 00, 010, 0 | 242 (3) |
| 196 | 11, 00, 011, 0 | 242 (4) |
| 197 | 11, 00, 100, 0 | 242 (5) |
| 198 | 11, 00, 101, 0 | 242 (6) |
| 199 | 11, 00, 110, 0 | 242 (7) |
| 200 | 11, 00, 111, 0 | 242 (8) |
| 201 | 11, 00, 000, 1 | Reserved |
| 202 | 11, 00, 001, 1 | Reserved |
| 203 | 11, 00, 010, 1 | Reserved |
| 204 | 11, 00, 011, 1 | Reserved |
| 205 | 11, 00, 100, 1 | Reserved |
| 206 | 11, 00, 101, 1 | Reserved |
| 207 | 11, 00, 110, 1 | Reserved |
| 208 | 11, 00, 111, 1 | Reserved |
| 209 | 11, 01, 000, 0 | 484 (1) |
| 210 | 11, 01, 001, 0 | 484 (2) |
| 211 | 11, 01, 010, 0 | 484 (3) |
| 212 | 11, 01, 011, 0 | 484 (4) |
| 213 | 11, 01, 100, 0 | 484 (5) |
| 214 | 11, 01, 101, 0 | 484 (6) |
| 215 | 11, 01, 110, 0 | 484 (7) |
| 216 | 11, 01, 111, 0 | 484 (8) |
| 217 | 11, 01, 000, 1 | Reserved |
| 218 | 11, 01, 001, 1 | Reserved |
| 219 | 11, 01, 010, 1 | Reserved |
| 220 | 11, 01, 011, 1 | Reserved |
| 221 | 11, 01, 100, 1 | Reserved |
| 222 | 11, 01, 101, 1 | Reserved |
| 223 | 11, 01, 110, 1 | Reserved |
| 224 | 11, 01, 111, 1 | Reserved |
| 225 | 11, 10, 000, 0 | 996 (1) |
| 226 | 11, 10, 001, 0 | 996 (2) |
| 227 | 11, 10, 010, 0 | 996 (3) |
| 228 | 11, 10, 011, 0 | 996 (4) |
| 229 | 11, 10, 100, 0 | 996 (5) |
| 230 | 11, 10, 101, 0 | 996 (6) |
| 231 | 11, 10, 110, 0 | 996 (7) |
| 232 | 11, 10, 111, 0 | 996 (8) |
| 233 | 11, 10, 000, 1 | Reserved |
| 234 | 11, 10, 001, 1 | Reserved |

TABLE 1-continued

| Sequence number | Resource allocation bit sequence | Resource units actually obtained by division (from left to right) |
|---|---|---|
| 235 | 11, 10, 010, 1 | Reserved |
| 236 | 11, 10, 011, 1 | Reserved |
| 237 | 11, 10, 100, 1 | Reserved |
| 238 | 11, 10, 101, 1 | Reserved |
| 239 | 11, 10, 110, 1 | Reserved |
| 240 | 11, 10, 111, 1 | Reserved |
| 241 | 11, 11, 000, 0 | 2 × 996 (1) |
| 242 | 11, 11, 001, 0 | 2 × 996 (2) |
| 243 | 11, 11, 010, 0 | 2 × 996 (3) |
| 244 | 11, 11, 011, 0 | 2 × 996 (4) |
| 245 | 11, 11, 100, 0 | 2 × 996 (5) |
| 246 | 11, 11, 101, 0 | 2 × 996 (6) |
| 247 | 11, 11, 110, 0 | 2 × 996 (7) |
| 248 | 11, 11, 111, 0 | 2 × 996 (8) |
| 249 | 11, 11, 000, 1 | Reserved |
| 250 | 11, 11, 001, 1 | Reserved |
| 251 | 11, 11, 010, 1 | Reserved |
| 252 | 11, 11, 011, 1 | Reserved |
| 253 | 11, 11, 100, 1 | Reserved |
| 254 | 11, 11, 101, 1 | Reserved |
| 255 | 11, 11, 110, 1 | Reserved |
| 256 | 11, 11, 111, 1 | Reserved |

Table 1 shows a bit sequence of resource allocation for a basic bandwidth (a smallest unit of bandwidth allocation, for example, 20 MHz), resource units actually allocated and indicated by the resource allocation bit sequence, and a quantity of stations performing transmission on a resource unit. Referring to Embodiment 5, for each 20 MHz bandwidth in 40 MHz, 80 MHz, and 160 MHz bandwidths, the method of the foregoing Embodiment 1, 2, 3, or 4, or a possible combination thereof may be used repeatedly for indicating. In other words, for a larger bandwidth, Table 1 or a variation thereof may be repeatedly to obtain resource allocation bit sequences for all bandwidths. Details are not described herein again.

Table 1 lists “resource allocation bit sequences” and corresponding “resource units actually allocated”. In Table 1, 26 indicates a 1×26 resource unit; 52 indicates a 2×26 resource unit; 106 indicates a 4×26 resource unit; 242 (n) indicates a 242 resource unit, and the quantity of the station(s) performing transmission on the resource is n, and when n is greater than 1, MU-MIMO transmission is performed on the resource unit; 484 (n) indicates a 2×242 resource unit, and the quantity of the station(s) performing transmission on the resource is n; 996 (n) corresponds to a 996 resource unit, and the quantity of the station(s) performing transmission on the resource is n; 2×996 (n) corresponds to a 2×996 resource unit, and the quantity of stations performing transmission on the resource is n.

In this example, the smallest resource unit allowable for MU-MIMO transmission is limited to a 106 resource unit. In addition, if resource units actually allocated from a 20 MHz spectrum resource include two 106 resource units, a maximum quantity of stations performing transmission on the 106 resource unit is 4. In other cases, a maximum quantity of stations performing transmission on a resource unit for MU-MIMO transmission is 8.

Specifically, the first bit in all 8-bit resource allocation bit sequences in Table 1 is a type-0 bit in Embodiment 4, and indicates whether the largest resource unit possibly allocated corresponding to 20 MHz in the protocol is actually allocated, that is, whether a current resource unit actually allocated and to be allocated to a station is a 242 resource unit. A person skilled in the art may understand that, if a current bandwidth is 20 MHz, the type-0 bit may be to distinguish whether a resource unit actually allocated is smaller than a 242 resource unit or equal to a 242 resource unit. If a current bandwidth is a larger bandwidth (e.g. 40 MHz, 80 MHz, or 160 MHz), the type-0 bit may be to distinguish whether a resource unit actually allocated is smaller than a 242 resource unit or larger than or equal to a 242 resource unit.

In addition, the third bit and the fourth bit in 8-bit resource allocation bit sequences from a sequence number 193 to a sequence number 256 are also type-0 bits in Embodiment 4, where the third bit indicates whether a resource unit actually allocated is a 996 resource unit. The following table is a specific example. When the third bit “0” indicates that the resource unit actually allocated is not a 996 resource unit, the fourth bit indicates whether the resource unit actually allocated is a 2×242 resource unit. Therefore, “10” indicates that the resource unit actually allocated is a 996 resource unit, “01” indicates that the resource unit actually allocated is a 2×242 resource unit, “00” indicates that the resource unit actually allocated is a 242 resource unit, and another special bit sequence “11” indicates that the resource unit actually allocated is a 2×996 resource unit. The two bits may also be expressed simply by using the following table. It may be understood that, if locations of the third bit and the fourth bit are changed, or value setting manners of the bits are changed (meanings of 0 and 1 are interchanged), there may be corresponding variations of the table, but the variations of the table shall all fall within the scope of this embodiment.

TABLE 2

| Bit sequence | Resource unit actually allocated |
|---|---|
| 00 | 242 resource unit |
| 01 | 2 × 242 resource unit |
| 10 | 996 resource unit |
| 11 | 2 × 996 resource unit |

The second to the seventh bits in bit sequences from a sequence number 1 to a sequence number 32 in Table 1 are type-2 bits in Embodiment 2, and according to a principle of the tree diagram as shown in FIG. 9, a bit for indicating a resource unit actually allocated may be used, where the eighth bit is a reserved bit.

In addition, the second to the fifth bits in bit sequences from a sequence number 33 to a sequence number 96 in Table 1 are also type-2 bits in Embodiment 2. The second bit and the third bit in bit sequences from a sequence number 97 to a sequence number 128 are also type-2 bits in Embodiment 2. Bit sequences from a sequence number 129 to a sequence number 192 are reserved sequences.

The sixth to the eighth bits in the 8-bit resource allocation bit sequences from the sequence number 33 to the sequence number 96 in Table 1 are bits for indicating a quantity of stations performing transmission on a resource unit in Embodiment 6. The fourth to the seventh bits in the bit sequences from the sequence number 97 to the sequence number 128 are bits for indicating a quantity of stations performing transmission on a resource unit in Embodiment 6, where the first two bits indicate a quantity of stations performing transmission on the first 106 resource unit, and the last two bits indicate a quantity of stations performing transmission on the second 106 resource unit. The fifth to the seventh bits in the bit sequences from the sequence number 193 to the sequence number 256 are also bits for indicating a quantity of stations performing transmission on a resource unit in Embodiment 6.

In addition, reserved bits are to indicate whether a corresponding bit sequence is reserved or unused. In the bit sequences from the sequence number 1 to the sequence number 32 in Table 1, the eighth bit is a reserved bit, the first seven bits in resource allocation sequences from the sequence number 1 to a sequence number 16 are respectively consistent with the first seven bits in resource allocation sequences from a sequence number 17 to the sequence number 32, and the eighth bit is to indicate whether a corresponding bit sequence is reserved. In the bit sequences from the sequence number 97 to the sequence number 128, the eighth bit is a reserved bit, and the first seven bits in resource allocation sequences from the sequence number 97 to a sequence number 112 are respectively consistent with the first seven bits in resource allocation sequences from a sequence number 113 to the sequence number 128. In bit sequences from the sequence number 129 to the sequence number 256, the second bit is a reserved bit, and therefore, the other seven bits in the resource allocation sequences from the sequence number 129 to the sequence number 192 are respectively consistent with the other seven bits in the resource allocation sequences from the sequence number 193 to the sequence number 256. In 8-bit resource allocation bit sequences from the sequence number 193 to a sequence number 208, the eighth bit is a reserved bit, and therefore, the other seven bits in bit sequences from the sequence number 193 to a sequence number 200 are respectively consistent with the other seven bits in bit sequences from a sequence number 201 to the sequence number 208. In 8-bit resource allocation bit sequences from a sequence number 209 to a sequence number 224, the eighth bit is a reserved bit, and therefore, the other seven bits in bit sequences from the sequence number 209 to a sequence number 216 are respectively consistent with the other seven bits in bit sequences from a sequence number 217 to the sequence number 224. In 8-bit resource allocation bit sequences from a sequence number 225 to a sequence number 240, the eighth bit is a reserved bit, and therefore, the other seven bits in bit sequences from the sequence number 225 to a sequence number 232 are respectively consistent with the other seven bits in bit sequences from a sequence number 233 to the sequence number 240. In 8-bit resource allocation bit sequences from a sequence number 241 to the sequence number 256, the eighth bit is a reserved bit, and therefore, the other seven bits in bit sequences from the sequence number 241 to a sequence number 248 are respectively consistent with the other seven bits in bit sequences from a sequence number 249 to the sequence number 256.

It may be understood that, the foregoing multiple types of bits may have different value setting manners (such as meanings of 0 and 1 are interchanged), and locations of the bits may also be changed, so that a new table is formed; however, functions and technical connotations of the bits are the same, and are not further illustrated in this embodiment. For example, a type-0 bit in Table 1 may be placed in the last location of a sequence. For another example, locations of several bits in type-2 bits in Table 1 may be changed. In addition, the indication bit(s), comprised in a bit sequence indicating resource allocation in Table 1, indicating the number of stations performing communication on a resource unit, may have other functions; for example, a function of indicating the number of user field for station information in an HE-SIGB field in a 20 MHz channel, in which the resource allocation sequence is located, wherein user field for station information comprises information about the stations performing communication on the resource unit indicated by the bit sequence (for example, the number of the user field for station information shown in FIG. 17). For a resource unit of a size larger than 242, a bit(s) of this type in the bit sequence of resource allocation for each 20 MHz channel indicates a number of the user field for station information in an HE-SIGB field, on the corresponding 20 MHz channel, wherein each user field for station information comprises information about each station performing communication on this resource unit indicated by the bit sequence. The number of the user field for station information in an HE-SIGB in a certain 20 MHz may be 0, which benefits in that an HE-SIGB in each 20 MHz can comprise an approximately equal number of the user field for station information. For example, the sequence indicating the resource allocation with the sequence number 217 is used to indicate 484 (0) for a first 20 MHz; wherein 484 (0) indicates that this first 20 MHz and an second adjacent 20 MHz are actually allocated as a 484-tone resource unit, and, the number of user fields for station information in an HE-SIGB field in this first 20 MHz (242) is 0; the user field for station information comprises information about stations performing communication on the 484-tone resource unit. For another example, the sequence indicating the resource allocation with the sequence number 233 is to indicate 996 (0).

For example, the HE-SIGB field comprises an HE-SIGB1 and an HE-SIGB2, which are respectively carried in different 20M channels; and the user field for station information, comprised in a specific HE-SIGB field, comprises information about stations performing reception or transmission in the corresponding bandwidth (channel). In a simple example, in an 80 MHz bandwidth, the HE-SIGB1 comprises user field(s) for station information, about stations performing communication on the first and the third 20 MHz channels; and the HE-SIGB2 comprises user field(s) for station information, about stations performing communication on the second and the fourth 20 MHz channels. In an example, within the 80 MHz bandwidth, MU-MIMO is performed in the first 40 MHz, and 4 stations participate in the communication in total (i.e. 4 stations in the first two 20 MHz channels in total); the third 20 MHz channel is allocated as nine 26 resource units, and nine stations participate in OFDMA transmission; the fourth 20 MHz channel is allocated as a 106 resource unit, a 26 resource unit, and a 106 resource unit, and single-station transmission is performed on either of the 106 resource units, that is, three stations participate in OFDMA transmission. To make the number of the user field in the two HE-SIGBs approximately same, the bit sequence of the first 20 MHz is a sequence "11,01,000,1" that indicates 484 (0), with the sequence number 217; the bit sequence of the second 20 MHz is a sequence "11,01,011,0" that indicates 484 (4), with a sequence number 212; the bit sequence of the third 20 MHz is a sequence "000,0000,0" with the sequence number 1; and, the bit sequence of the fourth 20 MHz is a sequence "011,0000,0" with the sequence number 97. Therefore, the HE-SIGB1 includes: 0 piece of user field for station information comprising information about station(s) performing communication on the first 20 MHz channel; and, 9 pieces of user field for station information, comprising information about station(s) performing communication on the third 20 MHz channel. The HE-SIGB2 includes: 4 pieces of user field for station information, comprising information about station(s) performing communication on the second 20 MHz channel; and, 3 pieces of user field for station information, comprising information about station(s) performing communication on the fourth 20 MHz channel.

Still further, some reserved bits in Table 1 may be to indicate, when resource units allocated include a 26-tone resource unit located in the center of a bandwidth, whether the center 26-tone resource unit is to-be used (for example, whether is assigned to a station). For example, resource units actually allocated and indicated by the resource allocation bit sequences from the sequence number 17 to 32 are respectively consistent with those indicated by the resource allocation bit sequences from the sequence number 1 to 16; however, the center 26-tone resource units respectively indicated by the bit sequences from the sequence number 1 to 16 are assigned to stations, but the center 26-tone resource units respectively indicated by the bit sequences from the sequence number 17 to 32 are not assigned to stations.

In Table 1, resource units actually allocated and indicated by the resource allocation bit sequences from the sequence number 241 to the sequence number 248 are resource units corresponding to a current available maximum bandwidth 160M. However, allocation of the spectrum resource may be indicated by the HE-SIGA field. In this case, the resource allocation bit sequence located in the HE-SIGB may no longer give any indication. Therefore, the resource allocation bit sequences from the sequence number 241 to the sequence number 248 in Table 1 may also be reserved sequences.

Table 3 shows an example of a variation of Table 1. For example, to support a maximum quantity of eight stations performing transmission on each resource unit that is larger than or equal to 106, in the resource allocation bit sequences from the sequence number 129 to 192 in Table 1, the first two bits are to indicate a 106 resource unit, a 26 resource unit, and a 106 resource unit that are actually allocated from 20 MHz, and every three bits in the last six bits are respectively to indicate the quantity of stations performing transmission on the 106 resource units. However, the resource allocation bit sequences (sequence numbers 97 to 112) to indicate a 106 resource unit, a 26 resource unit, and a 106 resource unit that are actually allocated from 20 MHz in Table 1 are changed to reserved sequences in Table 3; meanings of other resource allocation bit sequences indicating resource units actually allocated are unchanged. It may be understood that, special or extended cases mentioned for Table 1 may also be used in Table 3.

TABLE 3

| Sequence number | Resource allocation bit sequence | Resource units actually obtained by division (from left to right) | | | | | | | | |
|---|---|---|---|---|---|---|---|---|---|---|
| 1 | 000, 0000, 0 | 26 | 26 | 26 | 26 | 26 | 26 | 26 | 26 | 26 |
| 2 | 000, 0001, 0 | 26 | 26 | 26 | 26 | 26 | 26 | 26 | 52 | |
| 3 | 000, 0010, 0 | 26 | 26 | 26 | 26 | 26 | 52 | | 26 | 26 |
| 4 | 000, 0011, 0 | 26 | 26 | 26 | 26 | 26 | 52 | | 52 | |
| 5 | 000, 0100, 0 | 26 | 26 | 52 | | 26 | 26 | 26 | 26 | 26 |
| 6 | 000, 0101, 0 | 26 | 26 | 52 | | 26 | 26 | 26 | 52 | |
| 7 | 000, 0110, 0 | 26 | 26 | 52 | | 26 | 52 | | 26 | 26 |
| 8 | 000, 0111, 0 | 26 | 26 | 52 | | 26 | 52 | | 52 | |
| 9 | 000, 1000, 0 | 52 | | 26 | 26 | 26 | 26 | 26 | 26 | 26 |
| 10 | 000, 1001, 0 | 52 | | 26 | 26 | 26 | 26 | 26 | 52 | |
| 11 | 000, 1010, 0 | 52 | | 26 | 26 | 26 | 52 | | 26 | 26 |
| 12 | 000, 0011, 0 | 52 | | 26 | 26 | 26 | 52 | | 52 | |
| 13 | 000, 0100, 0 | 52 | | 52 | | 26 | 26 | 26 | 26 | 26 |
| 14 | 000, 1101, 0 | 52 | | 52 | | 26 | 26 | 26 | 52 | |
| 15 | 000, 1110, 0 | 52 | | 52 | | 26 | 52 | | 26 | 26 |
| 16 | 000, 1111, 0 | 52 | | 52 | | 26 | 52 | | 52 | |
| 17 | 000, 0000, 1 | | | | | Reserved | | | | |
| 18 | 000, 0001, 1 | | | | | Reserved | | | | |
| 19 | 000, 0010, 1 | | | | | Reserved | | | | |
| 20 | 000, 0011, 1 | | | | | Reserved | | | | |
| 21 | 000, 0100, 1 | | | | | Reserved | | | | |
| 22 | 000, 0101, 1 | | | | | Reserved | | | | |
| 23 | 000, 0110, 1 | | | | | Reserved | | | | |
| 24 | 000, 0111, 1 | | | | | Reserved | | | | |
| 25 | 000, 1000, 1 | | | | | Reserved | | | | |
| 26 | 000, 1001, 1 | | | | | Reserved | | | | |
| 27 | 000, 1010, 1 | | | | | Reserved | | | | |
| 28 | 000, 1011, 1 | | | | | Reserved | | | | |
| 29 | 000, 1100, 1 | | | | | Reserved | | | | |
| 30 | 000, 1101, 1 | | | | | Reserved | | | | |
| 31 | 000, 1110, 1 | | | | | Reserved | | | | |
| 32 | 000, 1111, 1 | | | | | Reserved | | | | |
| 33 | 001, 00, 000 | 26 | 26 | 26 | 26 | 26 | 106 (1) | | | |

TABLE 3-continued

| Sequence number | Resource allocation bit sequence | Resource units actually obtained by division (from left to right) | | | | | | | | |
|---|---|---|---|---|---|---|---|---|---|---|
| 34 | 001, 00, 001 | 26 | 26 | 26 | 26 | 26 | 106 (2) | | | |
| 35 | 001, 00, 010 | 26 | 26 | 26 | 26 | 26 | 106 (3) | | | |
| 36 | 001, 00, 011 | 26 | 26 | 26 | 26 | 26 | 106 (4) | | | |
| 37 | 001, 00, 100 | 26 | 26 | 26 | 26 | 26 | 106 (5) | | | |
| 38 | 001, 00, 101 | 26 | 26 | 26 | 26 | 26 | 106 (6) | | | |
| 39 | 001, 00, 110 | 26 | 26 | 26 | 26 | 26 | 106 (7) | | | |
| 40 | 001, 00, 111 | 26 | 26 | 26 | 26 | 26 | 106 (8) | | | |
| 41 | 001, 01, 000 | 26 | 26 | 52 | | 26 | 106 (1) | | | |
| 42 | 001, 01, 001 | 26 | 26 | 52 | | 26 | 106 (2) | | | |
| 43 | 001, 01, 010 | 26 | 26 | 52 | | 26 | 106 (3) | | | |
| 44 | 001, 01, 011 | 26 | 26 | 52 | | 26 | 106 (4) | | | |
| 45 | 001, 01, 100 | 26 | 26 | 52 | | 26 | 106 (5) | | | |
| 46 | 001, 01, 101 | 26 | 26 | 52 | | 26 | 106 (6) | | | |
| 47 | 001, 01, 110 | 26 | 26 | 52 | | 26 | 106 (7) | | | |
| 48 | 001, 01, 111 | 26 | 26 | 52 | | 26 | 106 (8) | | | |
| 49 | 001, 10, 000 | 52 | | 26 | 26 | 26 | 106 (1) | | | |
| 50 | 001, 10, 001 | 52 | | 26 | 26 | 26 | 106 (2) | | | |
| 51 | 001, 10, 010 | 52 | | 26 | 26 | 26 | 106 (3) | | | |
| 52 | 001, 10, 011 | 52 | | 26 | 26 | 26 | 106 (4) | | | |
| 53 | 001, 10, 100 | 52 | | 26 | 26 | 26 | 106 (5) | | | |
| 54 | 001, 10, 101 | 52 | | 26 | 26 | 26 | 106 (6) | | | |
| 55 | 001, 10, 110 | 52 | | 26 | 26 | 26 | 106 (7) | | | |
| 56 | 001, 10, 111 | 52 | | 26 | 26 | 26 | 106 (8) | | | |
| 57 | 001, 11, 000 | 52 | | 52 | | 26 | 106 (1) | | | |
| 58 | 001, 11, 001 | 52 | | 52 | | 26 | 106 (2) | | | |
| 59 | 001, 11, 010 | 52 | | 52 | | 26 | 106 (3) | | | |
| 60 | 001, 11, 011 | 52 | | 52 | | 26 | 106 (4) | | | |
| 61 | 001, 11, 100 | 52 | | 52 | | 26 | 106 (5) | | | |
| 62 | 001, 11, 101 | 52 | | 52 | | 26 | 106 (6) | | | |
| 63 | 001, 11, 110 | 52 | | 52 | | 26 | 106 (7) | | | |
| 64 | 001, 11, 111 | 52 | | 52 | | 26 | 106 (8) | | | |
| 65 | 010, 00, 000 | 106 (1) | | | | 26 | 26 | 26 | 26 | 26 |
| 66 | 010, 00, 001 | 106 (2) | | | | 26 | 26 | 26 | 26 | 26 |
| 67 | 010, 00, 010 | 106 (3) | | | | 26 | 26 | 26 | 26 | 26 |
| 68 | 010, 00, 011 | 106 (4) | | | | 26 | 26 | 26 | 26 | 26 |
| 69 | 010, 00, 100 | 106 (5) | | | | 26 | 26 | 26 | 26 | 26 |
| 70 | 010, 00, 101 | 106 (6) | | | | 26 | 26 | 26 | 26 | 26 |
| 71 | 010, 00, 110 | 106 (7) | | | | 26 | 26 | 26 | 26 | 26 |
| 72 | 010, 00, 111 | 106 (8) | | | | 26 | 26 | 26 | 26 | 26 |
| 73 | 010, 01, 000 | 106 (1) | | | | 26 | 26 | 26 | 52 | |
| 74 | 010, 01, 001 | 106 (2) | | | | 26 | 26 | 26 | 52 | |
| 75 | 010, 01, 010 | 106 (3) | | | | 26 | 26 | 26 | 52 | |
| 76 | 010, 01, 011 | 106 (4) | | | | 26 | 26 | 26 | 52 | |
| 77 | 010, 01, 100 | 106 (5) | | | | 26 | 26 | 26 | 52 | |
| 78 | 010, 01, 101 | 106 (6) | | | | 26 | 26 | 26 | 52 | |
| 79 | 010, 01, 110 | 106 (7) | | | | 26 | 26 | 26 | 52 | |
| 80 | 010, 01, 111 | 106 (8) | | | | 26 | 26 | 26 | 52 | |
| 81 | 010, 10, 000 | 106 (1) | | | | 26 | 52 | | 26 | 26 |
| 82 | 010, 10, 001 | 106 (2) | | | | 26 | 52 | | 26 | 26 |
| 83 | 010, 10, 010 | 106 (3) | | | | 26 | 52 | | 26 | 26 |
| 84 | 010, 10, 011 | 106 (4) | | | | 26 | 52 | | 26 | 26 |
| 85 | 010, 10, 100 | 106 (5) | | | | 26 | 52 | | 26 | 26 |
| 86 | 010, 10, 101 | 106 (6) | | | | 26 | 52 | | 26 | 26 |
| 87 | 010, 10, 110 | 106 (7) | | | | 26 | 52 | | 26 | 26 |
| 88 | 010, 10, 111 | 106 (8) | | | | 26 | 52 | | 26 | 26 |
| 89 | 010, 11, 000 | 106 (1) | | | | 26 | 52 | | 52 | |
| 90 | 010, 11, 001 | 106 (2) | | | | 26 | 52 | | 52 | |
| 91 | 010, 11, 010 | 106 (3) | | | | 26 | 52 | | 52 | |
| 92 | 010, 11, 011 | 106 (4) | | | | 26 | 52 | | 52 | |
| 93 | 010, 11, 100 | 106 (5) | | | | 26 | 52 | | 52 | |
| 94 | 010, 11, 101 | 106 (6) | | | | 26 | 52 | | 52 | |
| 95 | 010, 11, 110 | 106 (7) | | | | 26 | 52 | | 52 | |
| 96 | 010, 11, 111 | 106 (8) | | | | 26 | 52 | | 52 | |
| 97 | 011, 00000 | | | | | Reserved | | | | |
| 98 | 011, 00001 | | | | | Reserved | | | | |
| 99 | 011, 00010 | | | | | Reserved | | | | |
| 100 | 011, 00011 | | | | | Reserved | | | | |
| 101 | 011, 00100 | | | | | Reserved | | | | |
| 102 | 011, 00101 | | | | | Reserved | | | | |
| 103 | 011, 00110 | | | | | Reserved | | | | |
| 104 | 011, 00111 | | | | | Reserved | | | | |
| 105 | 011, 01000 | | | | | Reserved | | | | |
| 106 | 011, 01001 | | | | | Reserved | | | | |
| 107 | 011, 01010 | | | | | Reserved | | | | |
| 108 | 011, 01011 | | | | | Reserved | | | | |
| 109 | 011, 01100 | | | | | Reserved | | | | |

TABLE 3-continued

| Sequence number | Resource allocation bit sequence | Resource units actually obtained by division (from left to right) | | |
|---|---|---|---|---|
| 110 | 011, 01101 | | Reserved | |
| 111 | 011, 01110 | | Reserved | |
| 112 | 011, 01111 | | Reserved | |
| 113 | 011, 10000 | | Reserved | |
| 114 | 011, 10001 | | Reserved | |
| 115 | 011, 10010 | | Reserved | |
| 116 | 011, 10011 | | Reserved | |
| 117 | 011, 10100 | | Reserved | |
| 118 | 011, 10101 | | Reserved | |
| 119 | 011, 10110 | | Reserved | |
| 120 | 011, 10111 | | Reserved | |
| 121 | 011, 11000 | | Reserved | |
| 122 | 011, 11001 | | Reserved | |
| 123 | 011, 11010 | | Reserved | |
| 124 | 011, 11011 | | Reserved | |
| 125 | 011, 11100 | | Reserved | |
| 126 | 011, 11101 | | Reserved | |
| 127 | 011, 11110 | | Reserved | |
| 128 | 011, 11111 | | Reserved | |
| 129 | 10, 000, 000 | 106 (1) | 26 | 106 (1) |
| 130 | 10, 000, 001 | 106 (1) | 26 | 106 (2) |
| 131 | 10, 000, 010 | 106 (1) | 26 | 106 (3) |
| 132 | 10, 000, 011 | 106 (1) | 26 | 106 (4) |
| 133 | 10, 000, 100 | 106 (1) | 26 | 106 (5) |
| 134 | 10, 000, 101 | 106 (1) | 26 | 106 (6) |
| 135 | 10, 000, 110 | 106 (1) | 26 | 106 (7) |
| 136 | 10, 000, 111 | 106 (1) | 26 | 106 (8) |
| 137 | 10, 001, 000 | 106 (2) | 26 | 106 (1) |
| 138 | 10, 001, 001 | 106 (2) | 26 | 106 (2) |
| 139 | 10, 001, 010 | 106 (2) | 26 | 106 (3) |
| 140 | 10, 001, 011 | 106 (2) | 26 | 106 (4) |
| 141 | 10, 001, 100 | 106 (2) | 26 | 106 (5) |
| 142 | 10, 001, 101 | 106 (2) | 26 | 106 (6) |
| 143 | 10, 001, 110 | 106 (2) | 26 | 106 (7) |
| 144 | 10, 001, 111 | 106 (2) | 26 | 106 (8) |
| 145 | 10, 010, 000 | 106 (3) | 26 | 106 (1) |
| 146 | 10, 010, 001 | 106 (3) | 26 | 106 (2) |
| 147 | 10, 010, 010 | 106 (3) | 26 | 106 (3) |
| 148 | 10, 010, 011 | 106 (3) | 26 | 106 (4) |
| 149 | 10, 010, 100 | 106 (3) | 26 | 106 (5) |
| 150 | 10, 010, 101 | 106 (3) | 26 | 106 (6) |
| 151 | 10, 010, 110 | 106 (3) | 26 | 106 (7) |
| 152 | 10, 010, 111 | 106 (3) | 26 | 106 (8) |
| 153 | 10, 011, 000 | 106 (4) | 26 | 106 (1) |
| 154 | 10, 011, 001 | 106 (4) | 26 | 106 (2) |
| 155 | 10, 011, 010 | 106 (4) | 26 | 106 (3) |
| 156 | 10, 011, 011 | 106 (4) | 26 | 106 (4) |
| 157 | 10, 011, 100 | 106 (4) | 26 | 106 (5) |
| 158 | 10, 011, 101 | 106 (4) | 26 | 106 (6) |
| 159 | 10, 011, 110 | 106 (4) | 26 | 106 (7) |
| 160 | 10, 011, 111 | 106 (4) | 26 | 106 (8) |
| 161 | 10, 100, 000 | 106 (5) | 26 | 106 (1) |
| 162 | 10, 100, 001 | 106 (5) | 26 | 106 (2) |
| 163 | 10, 100, 010 | 106 (5) | 26 | 106 (3) |
| 164 | 10, 100, 011 | 106 (5) | 26 | 106 (4) |
| 165 | 10, 100, 100 | 106 (5) | 26 | 106 (5) |
| 166 | 10, 100, 101 | 106 (5) | 26 | 106 (6) |
| 167 | 10, 100, 110 | 106 (5) | 26 | 106 (7) |
| 168 | 10, 100, 111 | 106 (5) | 26 | 106 (8) |
| 169 | 10, 101, 000 | 106 (6) | 26 | 106 (1) |
| 170 | 10, 101, 001 | 106 (6) | 26 | 106 (2) |
| 171 | 10, 101, 010 | 106 (6) | 26 | 106 (3) |
| 172 | 10, 101, 011 | 106 (6) | 26 | 106 (4) |
| 173 | 10, 101, 100 | 106 (6) | 26 | 106 (5) |
| 174 | 10, 401, 101 | 106 (6) | 26 | 106 (6) |
| 175 | 10, 101, 110 | 106 (6) | 26 | 106 (7) |
| 176 | 10, 101, 111 | 106 (6) | 26 | 106 (8) |
| 177 | 10, 110, 000 | 106 (7) | 26 | 106 (1) |
| 178 | 10, 110, 001 | 106 (7) | 26 | 106 (2) |
| 179 | 10, 110, 010 | 106 (7) | 26 | 106 (3) |
| 180 | 10, 110, 011 | 106 (7) | 26 | 106 (4) |
| 181 | 10, 110, 100 | 106 (7) | 26 | 106 (5) |
| 182 | 10, 110, 101 | 106 (7) | 26 | 106 (6) |
| 183 | 10, 110, 110 | 106 (7) | 26 | 106 (7) |
| 184 | 10, 110, 111 | 106 (7) | 26 | 106 (8) |
| 185 | 10, 111, 000 | 106 (8) | 26 | 106 (1) |

TABLE 3-continued

| Sequence number | Resource allocation bit sequence | Resource units actually obtained by division (from left to right) | | |
|---|---|---|---|---|
| 186 | 10, 111, 001 | 106 (8) | 26 | 106 (2) |
| 187 | 10, 111, 010 | 106 (8) | 26 | 106 (3) |
| 188 | 10, 111, 011 | 106 (8) | 26 | 106 (4) |
| 189 | 10, 111, 100 | 106 (8) | 26 | 106 (5) |
| 190 | 10, 111, 101 | 106 (8) | 26 | 106 (6) |
| 191 | 10, 111, 110 | 106 (8) | 26 | 106 (7) |
| 192 | 10, 111, 111 | 106 (8) | 26 | 106 (8) |
| 193 | 11, 00, 000, 0 | | 242 (1) | |
| 194 | 11, 00, 001, 0 | | 242 (2) | |
| 195 | 11, 00, 010, 0 | | 242 (3) | |
| 196 | 11, 00, 011, 0 | | 242 (4) | |
| 197 | 11, 00, 100, 0 | | 242 (5) | |
| 198 | 11, 00, 101, 0 | | 242 (6) | |
| 199 | 11, 00, 110, 0 | | 242 (7) | |
| 200 | 11, 00, 111, 0 | | 242 (8) | |
| 201 | 11, 00, 000, 1 | | Reserved | |
| 202 | 11, 00, 001, 1 | | Reserved | |
| 203 | 11, 00, 010, 1 | | Reserved | |
| 204 | 11, 00, 011, 1 | | Reserved | |
| 205 | 11, 00, 100, 1 | | Reserved | |
| 206 | 11, 00, 101, 1 | | Reserved | |
| 207 | 11, 00, 110, 1 | | Reserved | |
| 208 | 11, 00, 111, 1 | | Reserved | |
| 209 | 11, 01, 000, 0 | | 484 (1) | |
| 210 | 11, 01, 001, 0 | | 484 (2) | |
| 211 | 11, 01, 010, 0 | | 484 (3) | |
| 212 | 11, 01, 011, 0 | | 484 (4) | |
| 213 | 11, 01, 100, 0 | | 484 (5) | |
| 214 | 11, 01, 101, 0 | | 484 (6) | |
| 215 | 11, 01, 110, 0 | | 484 (7) | |
| 216 | 11, 01, 111, 0 | | 484 (8) | |
| 217 | 11, 01, 000, 1 | | Reserved | |
| 218 | 11, 01, 001, 1 | | Reserved | |
| 219 | 11, 01, 010, 1 | | Reserved | |
| 220 | 11, 01, 011, 1 | | Reserved | |
| 221 | 11, 01, 100, 1 | | Reserved | |
| 222 | 11, 01, 101, 1 | | Reserved | |
| 223 | 11, 01, 110, 1 | | Reserved | |
| 224 | 11, 01, 111, 1 | | Reserved | |
| 225 | 11, 10, 000, 0 | | 996 (1) | |
| 226 | 11, 10, 001, 0 | | 996 (2) | |
| 227 | 11, 10, 010, 0 | | 996 (3) | |
| 228 | 11, 10, 011, 0 | | 996 (4) | |
| 229 | 11, 10, 100, 0 | | 996 (5) | |
| 230 | 11, 10, 101, 0 | | 996 (6) | |
| 231 | 11, 10, 110, 0 | | 996 (7) | |
| 232 | 11, 10, 111, 0 | | 996 (8) | |
| 233 | 11, 10, 000, 1 | | Reserved | |
| 234 | 11, 10, 001, 1 | | Reserved | |
| 235 | 11, 10, 010, 1 | | Reserved | |
| 236 | 11, 10, 011, 1 | | Reserved | |
| 237 | 11, 10, 100, 1 | | Reserved | |
| 238 | 11, 10, 101, 1 | | Reserved | |
| 239 | 11, 10, 110, 1 | | Reserved | |
| 240 | 11, 10, 111, 1 | | Reserved | |
| 241 | 11, 11, 000, 0 | | 2 × 996 (1) | |
| 242 | 11, 11, 001, 0 | | 2 × 996 (2) | |
| 243 | 11, 11, 010, 0 | | 2 × 996 (3) | |
| 244 | 11, 11, 011, 0 | | 2 × 996 (4) | |
| 245 | 11, 11, 100, 0 | | 2 × 996 (5) | |
| 246 | 11, 11, 101, 0 | | 2 × 996 (6) | |
| 247 | 11, 11, 110, 0 | | 2 × 996 (7) | |
| 248 | 11, 11, 111, 0 | | 2 × 996 (8) | |
| 249 | 11, 11, 000, 1 | | Reserved | |
| 250 | 11, 11, 001, 1 | | Reserved | |
| 251 | 11, 11, 010, 1 | | Reserved | |
| 252 | 11, 11, 011, 1 | | Reserved | |
| 253 | 11, 11, 100, 1 | | Reserved | |
| 254 | 11, 11, 101, 1 | | Reserved | |
| 255 | 11, 11, 110, 1 | | Reserved | |
| 256 | 11, 11, 111, 1 | | Reserved | |

Specifically, Table 1 or a variation thereof such as Table 3 may be directly stored on an AP or a STA. However, as mentioned above, the aforementioned implementation manners may also be used for generation or parsing of the sequence(s). The flowcharts in FIG. 23*a*-1, FIG. 23*a*-2, and FIG. 23*b* may also be used for generation or parsing, to obtain results consistent with eight bits of a bit sequence of resource allocation in Table 1 and resource units actually allocated and indicated by the bits. During generation of the resource allocation bit sequence, according to a predetermined rule for the bits (for example, indication functions of the aforementioned first bit, second bit, and third bit in Table 1), corresponding indication values are obtained. Correspondingly, during parsing of the resource allocation bit sequence, every time a bit is parsed, a specific status of a resource unit currently allocated is known. Details are not described herein again.

Figure 23B:
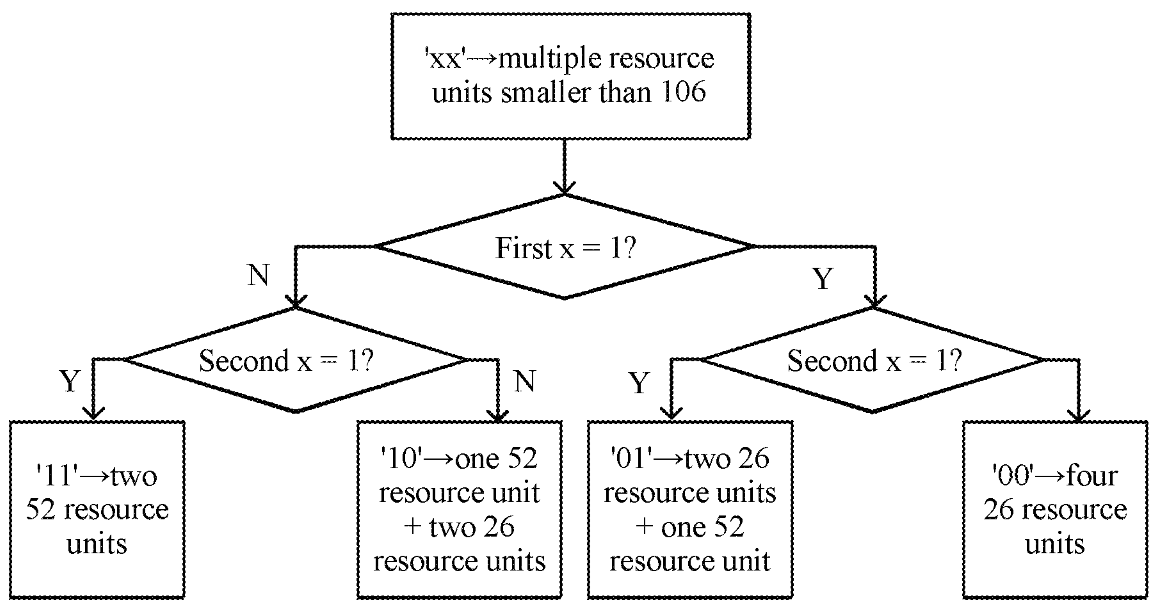

In FIG. 23*a*-1, FIG. 23*a*-2, and FIG. 23*b*, 26 indicates a 1×26 resource unit; 52 indicates a 2×26 resource unit; 106 indicates a 4×26 resource unit; 242 indicates a 242 resource unit; 484 indicates a 2×242 resource unit; 996 corresponds to a 996 resource unit; and 2×996 corresponds to a 2×996 resource unit. In addition, if a frequency domain resource is actually divided into resource units that are smaller than 242, a 26 resource unit included in a default middle location is not reflected in the flowcharts. Locations of resource units actually allocated are displayed from left to right in FIG. 23*a*-1, FIG. 23*a*-2, and FIG. 23*b*, but this embodiment is not limited thereto. The locations of the resource units may also be displayed from left to right, and what is affected is only the location of the bit sequence, but actual functions of the bits are not affected. The flowchart in FIG. 23*b* further explains how to indicate resource units that are smaller than 106 and are obtained by further division when "xx" occurs in three gray boxes in FIG. 23*a*-1 and FIG. 23*a*-2, where there are four pieces of "x" in the third gray black box, and the flowchart in FIG. 23*b* is used for every two pieces of "x" to respectively indicate how a middle 26 resource unit and frequency domain resources on two sides in 20 MHz are divided into resource units smaller than 106. If a 2×996 resource unit (also expressed as a 2×996 resource unit) corresponding to a maximum bandwidth 160 MHz is not indicated in an HE-SIGA field, "11,11,yyy,b'→2×996 resource unit" in FIG. 23*a*-1 and FIG. 23*a*-2 indicates a 2×996 resource unit. If a 2×996 resource unit (also expressed as a 2×996 resource unit) corresponding to a maximum bandwidth 160 MHz is indicated in an HE-SIGA field, "11,11,yyy,b'→2×996 resource unit" in FIG. 23*a*-1 and FIG. 23*a*-2 may also be used as a reserved sequence.

It may be understood that, the foregoing flowcharts in FIG. 23*a*-1, FIG. 23*a*-2, and FIG. 23*b* are merely examples. If the location of each bit in the resource allocation sequence or the first identifier and the second identifier of each bit are different, the corresponding value determining in the flowchart also changes correspondingly. This is similar to the variation of the table.

Figure 24A:
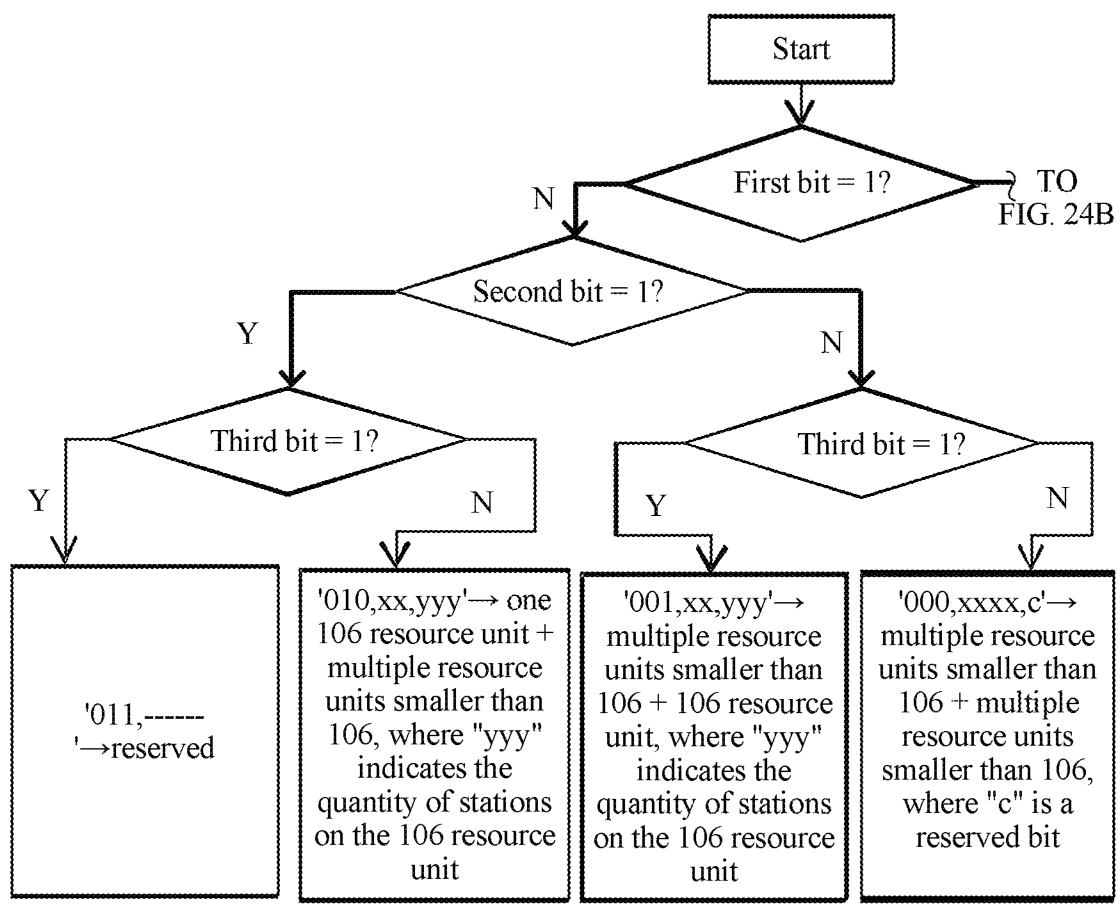
FIG. 24A and FIG. 24B are a simple schematic diagram of another bit sequence generation or parsing process, where a bit sequence in this solution is consistent with that in Table 3.
Figure 24B:
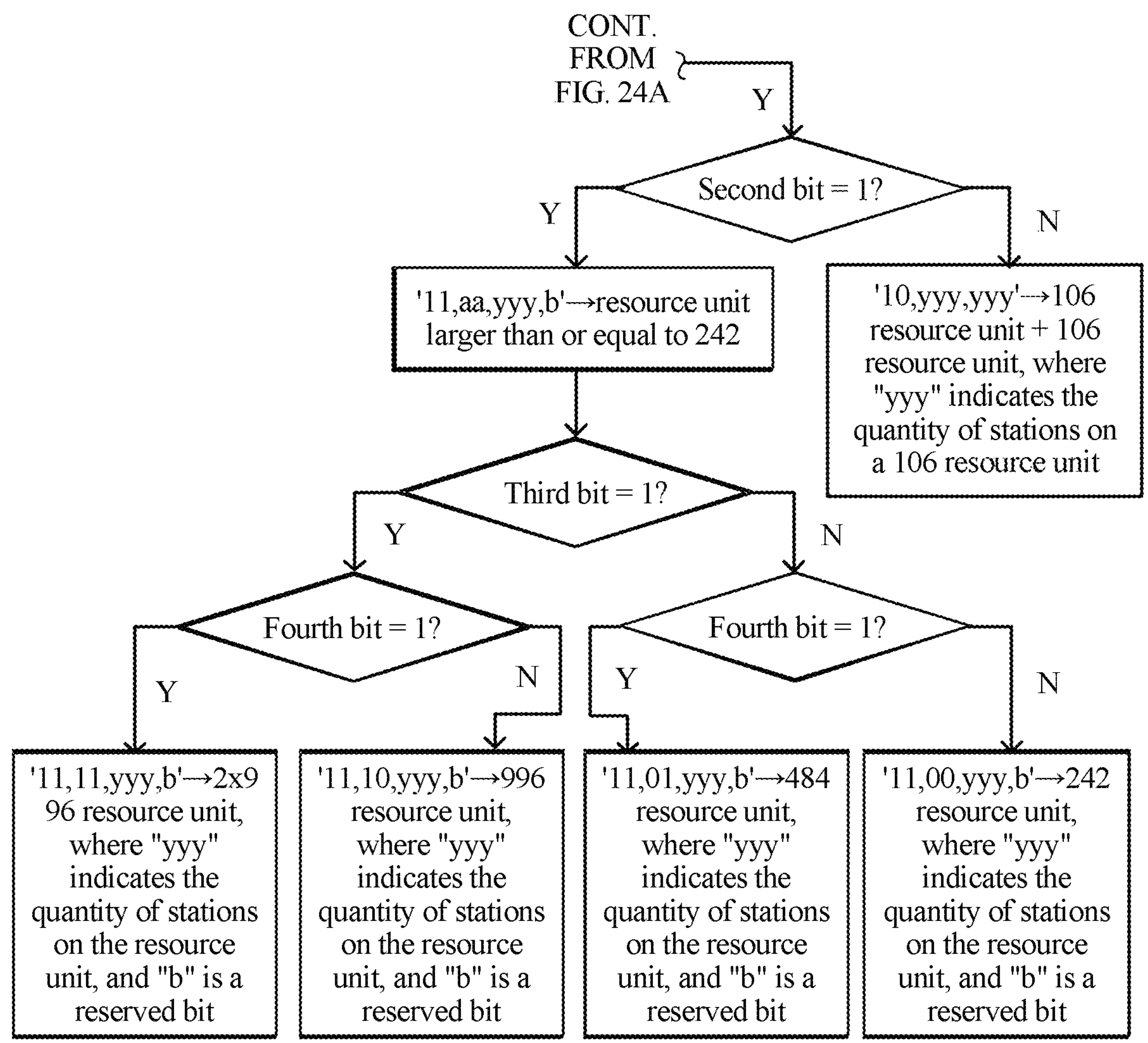

Based on this embodiment, for eight bits of a bit sequence of resource allocation in Table 3 and resource units actually allocated and indicated by the bits, the flowcharts in FIG. 24A, FIG. 24B, and FIG. 23*b* may also be to generate the resource allocation bit sequence or parse the resource allocation bit sequence. Others are the same as the flowchart in Table 1.

It should be noted that, Table 1 and Table 3 are merely examples, and content of the tables is covered in each embodiment described in the specification. For example, a summarized 8-bit resource allocation sequence is mentioned on a page of slide 11 (appendix 2) in the specification; the slide 11 lists types of bits included in an 8-bit resource allocation sequence for indicating four cases of resource units (i.e. 1. 242 or larger resource unit, 2. including two 106 resource units, 3. including only one 106 resource unit, and 4. not including a 106 resource unit, but still smaller than a 242 resource unit) actually allocated from a 20 MHz basic bandwidth, and mentions that "RA within 20 MHz" includes one type-0 bit and different quantities of type-2 bits, and "Num of STAs" is a bit(s) indicating the quantity of stations performing transmission on a resource unit in Embodiment 6. However, a bit indicating whether to use a center 26 resource unit (use central 26-RU) and an aggregation bit (aggregate) in slide 11 are not listed in Table 1 and Table 3. Table 1 and Table 3 are further tabular refinements of the indication bits in Embodiments 1 to 6 and the summary in slide 11, but this embodiment of the present embodiment is not limited to Table 1 and Table 3.

Optionally, the resource scheduling information further includes identifiers of multiple scheduled receiving ends, and the identifiers of the receiving ends are to indicate that the resource unit(s) in the actual allocation are assigned to the multiple receiving ends.

The resource scheduling information further includes fourth indication information, to indicate a scheduling order of the multiple scheduled receiving ends, where the scheduling order of the first receiving end corresponds to a location of a to-be-assigned resource unit allocated to the first receiving end, in the to-be-assigned frequency domain resource.

For example, the sending end may notify the following information to each receiving end in the system by using a bit sequence or a bitmap (bitmap):

A. The component of the current frequency domain resource (namely, the to-be-assigned frequency domain resource), that is, the quantity of the subcarriers comprised by each resource unit i.e. a size of each resource unit comprised, in the to-be-assigned frequency domain resource.

B. The location of each resource unit in the to-be-assigned frequency domain resource.

Moreover, the sending end may notify, by using user group information (namely, an example of the fourth indication information), or a station identifier list (STA ID list) including the identifiers of the multiple receiving ends, whether each receiving end in the system is scheduled, and a location in the scheduled users.

Therefore, the receiving end may determine, based on the foregoing information, a resource unit allocated by the sending end to the receiving end, and receives or sends data by using the resource unit.

That is, after a bit sequence is generated, the sending end may send resource allocation indication information including the bit sequence to each receiving end device; therefore, the receiving end device can determine, based on the resource allocation indication information, the frequency domain resource assigned by the sending end to the receiving end device, and transmit data or signaling by using the assigned frequency domain resource.

The resource allocation indication information mainly accomplishes frequency domain resource allocation in the current bandwidth. After receiving the resource allocation indication information, the receiving end may know, by using the foregoing bit sequence, a resource allocation mode of current transmission or sizes and locations of resource units included in the to-be-assigned frequency domain resource.

Then, by reading the STA ID list part in the resource scheduling information, the receiving end knows whether the receiving end itself is scheduled and to which scheduled user or user group it belongs (which scheduled user or user group). With reference to the two parts of content (the resource allocation indication information and the STA ID list, namely, an example of the resource scheduling information), the receiving end may receive or send data in a corresponding scheduled location.

For example, using the to-be-assigned frequency domain resource shown in FIG. 9 as an example, the to-be-assigned frequency domain resource includes the resource unit #1, the resource unit #2, the resource unit #0, and the resource unit #3 from left to right in sequence.

The four resource units are allocated to four receiving ends (hereinafter denoted as a STA 1, a STA 2, a STA3, and a STA 4 for ease of understanding and distinguishing), a quantity of STAs in the STA ID list is equal to a total quantity of available resource units allocated by the sending end (for example, an AP), and an arrangement order of the STAs in the STA ID list is the STA 1, STA 2, STA 3, and STA 4.

An obtained bit sequence for the to-be-assigned frequency domain resource shown in FIG. 9 is "0111". By parsing the bit sequence and the STA ID list, the receiving end knows the resource allocated by the AP to the receiving end.

That is, the STA 1 is the first one in the STA ID list, and therefore, the STA 1 can determine that the allocated resource is the first resource unit in the to-be-assigned frequency domain resource, namely, the resource unit #1.

Similarly, the STA 2 is the second one in the STA ID list, and therefore, the STA 2 can determine that the allocated resource is the second resource unit in the to-be-assigned frequency domain resource, namely, the resource unit #2; the STA 3 is the third one in the STA ID list, and therefore, the STA 3 can determine that the allocated resource is the third resource unit in the to-be-assigned frequency domain resource, namely, the resource unit #0; the STA 4 is the fourth one in the STA ID list, and therefore, the STA 4 can determine that the allocated resource is the fourth resource unit in the to-be-assigned frequency domain resource, namely, the resource unit #3.

It should be understood that, the foregoing illustrated manner of resource scheduling performed based on the foregoing resource indication information of the bit sequence and the STA ID list is merely an example, and the present invention is not limited thereto.

For example, in a scenario in which STAs are fixedly unchanged, the order of the STAs may be preset. Therefore, the AP needs to notify each STA of only the size and location of each resource unit in the to-be-assigned frequency domain resource by using the resource indication information. Therefore, sending of the STA ID list may be omitted.

In addition, it should be noted that, in this embodiment, the user group information includes the station identifier list and is sent separately; or the user group information may be used as a part of user-specific information, that is, each STA ID is placed in corresponding user-specific information.

Optionally, the resource scheduling information further includes first indication information to indicate the bandwidth of the target frequency domain.

Specifically, after the bandwidth of the to-be-assigned frequency domain resource is determined, the receiving end can determine, according to, for example, the allocation of resource units shown in FIG. 4 to FIG. 6, the size of a largest resource unit included in the to-be-assigned frequency domain resource, and therefore can determine a preset subcarrier quantity corresponding to each mapping rule. Therefore, the sending end may further send bandwidth indication information (an example of the first indication information) indicating the bandwidth of the to-be-assigned frequency domain resource to the receiving end.

It should be understood that, the foregoing illustrated manner of resource scheduling performed based on the first indication information is merely an example, and the present invention is not limited thereto. For example, when the communications system uses only a frequency domain resource with a specified bandwidth, a preset subcarrier quantity corresponding to each mapping rule may be used as a default value and preset on the sending end and the receiving end.

Optionally, the resource scheduling information further includes second indication information to indicate whether each resource unit is used for multi-user multiple-input multiple-output MU-MIMO.

Specifically, as mentioned above, the receiving end can determine, according to the resource allocation indication information, the size and location of each resource unit included in the to-be-assigned frequency domain resource. Therefore, the sending end may further notify, by using MIMO indication information (namely, an example of the second indication information), whether each resource unit is to perform MU-MIMO.

Figure 14:
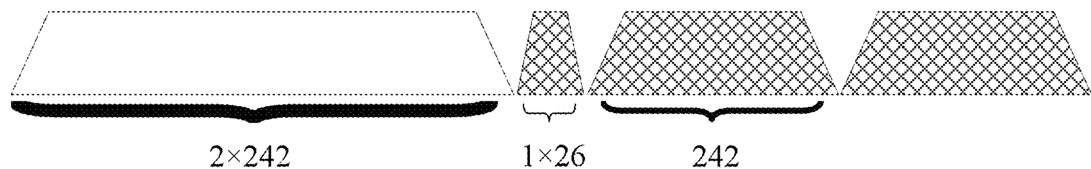
FIG. 14 is a schematic diagram of an example of a to-be-assigned frequency domain resource according to an embodiment.

For example, assuming that a minimum granularity of a resource unit allowed for MU-MIMO transmission is 242, as shown in FIG. 14, MU-MIMO transmission is performed on the first resource unit (2×242-tone resource unit), and MU-MIMO transmission is not performed on other resource units (namely, resource units in shadow parts). Herein, the mapping rule #B is used as an example. Analogies may be made to the mapping rules #A and #C.

In one manner, the MIMO indication information may be 4-bit indication information, that is, indicated by "10 00". The first bit "1" indicates that a 2×242-tone resource unit on a left side of a symmetric center is used for MU-MIMO transmission. The second bit "0" indicates that no 2×242-tone resource unit is on a right side of the symmetric center, and therefore, a case of MU-MIMO transmission performed on a 2×242 resource unit on the right side does not exist. The third bit "0" indicates that the first 242 resource unit on the right side of the symmetric center is not used for MU-MIMO transmission. The fourth bit "0" indicates that the second 242 resource unit on the right side of the symmetric center is not used for MU-MIMO transmission. The middle 1×26 resource unit implicitly indicates that the middle 1×26 resource unit cannot be used for MU-MIMO transmission.

In this case, when the receiving end has not determined the size and location of each resource unit based on the foregoing resource allocation indication information, the receiving end can determine, based on the MU-MIMO indication information, whether each resource unit can be used for MU-MIMO transmission.

In another manner, with reference to frequency domain resource allocation indication information (for example, the foregoing mapping rule #A, mapping rule #B, and mapping rule #C), a quantity of resource units that the to-be-assigned frequency domain resource is divided into may be known. The MU-MIMO indication information may be 3-bit indication information, that is, indicated by "100". The first bit "1" indicates that the first resource unit in the to-be-assigned frequency domain resource is used for MU-MIMO transmission. Because the size of the second resource unit in the to-be-assigned frequency domain resource is smaller than 242, the second resource unit is not used for MU-MIMO transmission by default. The second bit "0" indicates that the third resource unit in the to-be-assigned frequency domain resource is not used for MU-MIMO transmission. The third "0" indicates that the fourth resource unit in the to-be-assigned frequency domain resource is not used for MU-MIMO transmission.

The resource scheduling method according to this embodiment enables the receiving end to know whether each resource unit is used for MU-MIMO transmission, and therefore can improve transmission efficiency and reliability.

Optionally, the resource scheduling information further includes third indication information to indicate whether each resource unit is available.

Specifically, as mentioned above, the receiving end can determine, according to the resource allocation indication information, the size and location of each resource unit included in the to-be-assigned frequency domain resource. Therefore, the sending end may further notify, by using indication information indicating whether each resource unit is available (namely, the third indication information), whether each resource unit is available.

For example, assuming that allocation of each resource unit in the to-be-assigned frequency domain resource is shown in FIG. 14, due to a factor of interference or the like, resource units in the shadow parts are unavailable.

For example, if the foregoing type-2 mapping rule (namely, the mapping rule #B) is used, the resource allocation indication information corresponding to the to-be-assigned frequency domain resource is "1011". Because the middle resource unit exists by default, the receiving end may determine, according to the bit sequence, that the to-be-assigned frequency domain resource is divided into four resource units. As shown in FIG. 14, the second, the third, and the fourth resource units are unavailable. Therefore, the receiving end may be notified in the following manners.

Manner 1: Four bits may be to respectively indicate whether four resource units are available. For example, "0" indicates that the resource unit is unavailable, and "1" indicates the resource unit. The bits correspond to the resource units on a one-to-one basis. For example, the first bit corresponds to the first resource unit, the second bit corresponds to the second resource unit, the third bit corresponds to the third resource unit, and the fourth bit corresponds to the fourth resource unit. In this case, the 4-bit indication information is "1000".

Manner 2: An index number may also be to indicate which resource unit is unavailable. Because the to-be-assigned frequency domain resource is divided into four resource units, only two bits are required to indicate an index number. For example, "00" indicates the first resource unit, "01" indicates the second resource unit, "10" indicates the third resource unit, and "11" indicates the fourth resource unit. In this case, the sending end may send an index number "00" of the available resource unit as the third indication information to the receiving end, or the sending end may send an index number "011011" of the unavailable resource units as the third indication information to the receiving end. This is not particularly limited in the present invention.

The resource scheduling method according to this embodiment enables the receiving end to know whether each resource unit is available, and therefore can improve transmission efficiency and reliability.

Optionally, the method is applied to a wireless local area network system, and the sending the bit sequence to the receiving end includes:

adding the bit sequence to a high efficient signaling field A or a high efficient signaling field B in a preamble, and sending the bit sequence to the receiving end; or adding the bit sequence to a medium access control layer, and sending the bit sequence to the receiving end.

Figure 15:
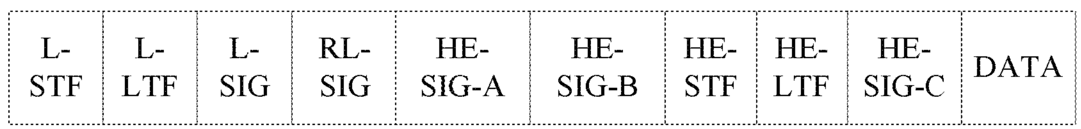
FIG. 15 is a schematic structural diagram of an 802.11ax packet.

Specifically, a packet structure in the WLAN system (for example, 802.11ax) is shown in FIG. 15. A preamble part includes a legacy preamble (Legacy preamble, L-preamble) and a high efficient (High Efficient, HE) preamble immediately following the legacy preamble. The legacy preamble includes a short training field (Legacy Shorting Training Field, L-STF), a long training field (Legacy Long Training Field, L-LTF), a signaling field (Legacy Signal Field, L-SIG), and a repeated signaling field (Rpeated Legacy Signal Field, RL-SIG). The high efficient preamble includes a high efficient signaling field A (High Efficient Signal Field A, HE-SIGA), a high efficient signaling field B (High Efficient Signal Field B, HE-SIGB), a high efficient short training field (High Efficient Shorting Training Field, HE-STF), and a high efficient long training field (High Efficient Long Training Field, HE-LTF). Optionally, the high efficient preamble includes a high efficient signaling field C (High Efficient Signal Field C, HE-SIGC). Moreover, the packet structure in the WLAN system further includes a data field (DATA).

Figure 16:
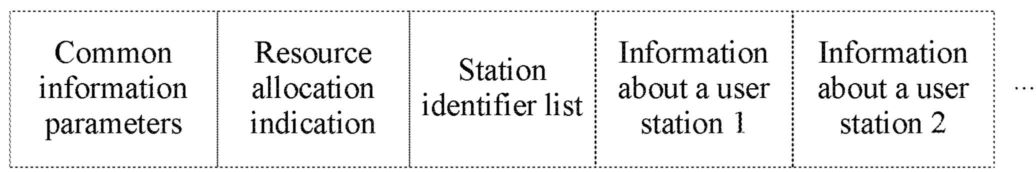
FIG. 16 is a schematic diagram of an example of resource scheduling information according to an embodiment.
Figure 17:
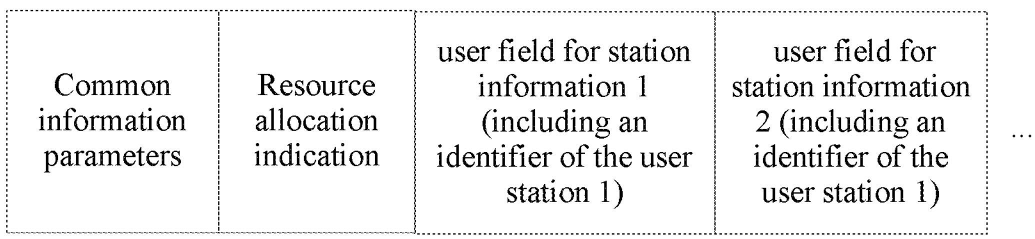
FIG. 17 is a schematic diagram of another example of resource scheduling information according to an embodiment.

The HE-SIGA and the HE-SIGB are broadcast to all users, and to carry signaling information in the 802.11ax packet structure. The HE-SIG-B includes common information parameters (Common Parameters), a resource allocation indication (Resource Allocation), a station identifier list (STA ID list), and information about each scheduled user station (STA Parameters), as shown in FIG. 16. Alternatively, station identifiers may also be placed in corresponding user station information, as shown in FIG. 17. The common information parameters include a guard interval (Guard interval, GI) used for data transmission, an OFMDA/MU-MIMO indication, an HE-LTF quantity, and a mode, and may include parameters such as an uplink/downlink indication, and whether a conventional HE-SIGB exists. The user station information includes a quantity of spatial streams of the user, a modulation and coding scheme (MCS, Modulation and Coding Scheme) used for data transmission, a coding type, an indication about whether a space time block code (STBC) is used, and an indication about whether a beamforming technology is used. In addition, the common information parameters may also be carried in the HE-SIGA.

Therefore, in this embodiment, the resource scheduling information may be carried in the HE-SIGA (for example, the HE-SIGA may carry bandwidth information), or the HE-SIGB (for example, the HE-SIG B may carry resource allocation information including the foregoing bit sequence, user group information, and the like), and sent to the receiving end.

Alternatively, in this embodiment, the resource scheduling information may be carried in the medium access control layer. For example, the resource scheduling information may be carried in a medium access control header (MAC HEADER) in the medium access control layer or another field in the MAC layer.

In the resource scheduling method according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

Moreover, in the resource scheduling method according to this embodiment, N mapping rules are obtained, and an indication identifier corresponding to each resource unit under each mapping rule is determined according to a quantity of subcarriers included in each resource unit in the to-be-assigned frequency domain resource; and based on the indication identifier, a bit sequence to indicate the quantity of the subcarriers included in each resource unit and a location of each resource unit in the to-be-assigned frequency domain resource can be determined. Therefore, flexible generation of bit sequences of different lengths can be implemented according to the quantity of the subcarriers included in each resource unit in the to-be-assigned frequency domain resource, and reduction of transmission resource overheads in resource scheduling can be supported.

FIG. 18 is a schematic flowchart of a resource scheduling method 200 according to another embodiment, where the method is described from a perspective of a receiving end. The method 200 is applied to a wireless local area network, where a next generation protocol followed by the wireless local area network predefines locations of resource units possibly allocated from a to-be-assigned frequency domain resource. As shown in FIG. 18, the method 200 includes:

S210. A receiving end receives resource scheduling information sent by a sending end, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource.

S220. Determine, according to the resource scheduling information, the resource unit(s) actually allocated by the sending end to the receiving end.

Optionally, the to-be-assigned frequency domain resource includes a symmetric center.

Optionally, the locations of the resource units possibly allocated for the to-be-assigned frequency domain resource include a default location, and a resource unit corresponding to the default location is a resource unit that is not indicated by the bit sequence, as predefined by the next generation protocol.

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location.

Optionally, the bit sequence includes multiple type-2 bits, and the type-2 bit is to indicate whether a largest resource unit on one side of the symmetric center is in the actual allocation.

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Optionally, the resource scheduling information further includes identifiers of multiple scheduled receiving ends, and the identifiers of the receiving ends are to indicate that the resource unit(s) in the actual allocation are allocated to the multiple receiving ends.

Optionally, the resource scheduling information further includes first indication information to indicate the to-be-assigned frequency domain resource.

Optionally, the resource scheduling information further includes second indication information to indicate whether the resource unit(s) in the actual allocation are used for multi-user multiple-input multiple-output MU-MIMO.

Optionally, the resource scheduling information further includes third indication information to indicate whether the resource unit(s) in the actual allocation are available.

Optionally, that a receiving end receives resource scheduling information sent by a sending end includes:

receiving the bit sequence carried in a high efficient signaling field A or a high efficient signaling field B in a preamble and sent by the sending end; or receiving the bit sequence carried in a medium access control layer and sent by the sending end.

Optionally, the sending end is a network device, and the receiving end is a terminal device.

Actions of the receiving end in the method 200 are similar to actions of the receiving end (for example, a terminal device) in the method 100, and actions of the sending end in the method 200 are similar to actions of the sending end (for example, a network device) in the method 100. Herein for avoiding repetition, detailed descriptions thereof are omitted.

In the resource scheduling method according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

The foregoing describes in detail the resource scheduling methods according to the embodiments with reference to FIG. 1 to FIG. 18. The following describes in detail resource scheduling apparatuses according to the embodiments with reference to FIG. 19 and FIG. 20.

FIG. 19 shows a schematic block diagram of a resource scheduling apparatus 300 according to an embodiment. The apparatus 300 is applied to a wireless local area network, where a next generation protocol followed by the wireless local area network predefines locations of resource units possibly allocated from a to-be-assigned frequency domain resource. As shown in FIG. 19, the apparatus 300 includes:

a generation unit 310, configured to generate resource scheduling information, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and a sending unit 320, configured to send the resource scheduling information to a receiving end.

Optionally, the to-be-assigned frequency domain resource includes a symmetric center.

Optionally, the locations of the resource units possibly allocated for the to-be-assigned frequency domain resource include a default location, and a resource unit corresponding to the default location is a resource unit that is not indicated by the bit sequence, as predefined by the next generation protocol.

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location.

Optionally, the bit sequence includes multiple type-2 bits, and the type-2 bit is to indicate whether a largest resource unit on one side of the symmetric center is in the actual allocation.

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Optionally, the resource scheduling information further includes identifiers of multiple scheduled receiving ends, and the identifiers of the receiving ends are to indicate that the resource unit(s) in the actual allocation are allocated to the multiple receiving ends.

Optionally, the resource scheduling information further includes first indication information to indicate the to-be-assigned frequency domain resource.

Optionally, the resource scheduling information further includes second indication information to indicate whether the resource unit(s) in the actual allocation are used for multi-user multiple-input multiple-output MU-MIMO.

Optionally, the resource scheduling information further includes third indication information to indicate whether the resource unit(s) in the actual allocation are available.

Optionally, the sending unit is specifically configured to add the bit sequence to a high efficient signaling field A or a high efficient signaling field B in a preamble, and send the bit sequence to the receiving end; or the sending unit is specifically configured to add the bit sequence to a medium access control layer, and send the bit sequence to the receiving end.

Optionally, the apparatus 300 is a network device, and the receiving end is a terminal device.

The resource scheduling apparatus 300 according to this embodiment may correspond to a sending end (for example, a network device) in a method of an embodiment, and each unit, namely, each module, in the resource scheduling apparatus 300 and the foregoing other operations and/or functions are respectively intended to implement the corresponding procedure of the method 100 in FIG. 1. For brevity, details are not described herein again.

In the resource scheduling apparatus according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

Figure 20:
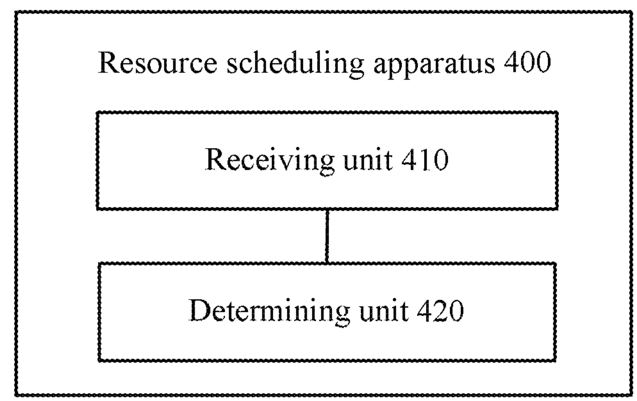
FIG. 20 is a schematic block diagram of a resource scheduling apparatus according to another embodiment.

FIG. 20 shows a schematic block diagram of a resource scheduling apparatus 400 according to an embodiment. The apparatus 400 is applied to a wireless local area network, where a next generation protocol followed by the wireless local area network predefines locations of resource units possibly allocated from a to-be-assigned frequency domain resource. As shown in FIG. 20, the apparatus 400 includes:

a receiving unit 410, configured to receive resource scheduling information sent by a sending end, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and a determining unit 420, configured to determine, according to the resource scheduling information, the resource unit(s) actually allocated by the sending end to the receiving end.

Optionally, the to-be-assigned frequency domain resource includes a symmetric center.

Optionally, the locations of the resource units possibly allocated for the to-be-assigned frequency domain resource include a default location, and a resource unit corresponding to the default location is a resource unit that is not indicated by the bit sequence, as predefined by the next generation protocol.

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location.

Optionally, the bit sequence includes multiple type-2 bits, and the type-2 bit is to indicate whether a largest resource unit on one side of the symmetric center is in the actual allocation.

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Optionally, the resource scheduling information further includes identifiers of multiple scheduled receiving ends, and the identifiers of the receiving ends are to indicate that the resource unit(s) in the actual allocation are allocated to the multiple receiving ends.

Optionally, the resource scheduling information further includes first indication information to indicate the to-be-assigned frequency domain resource.

Optionally, the resource scheduling information further includes second indication information to indicate whether the resource unit(s) in the actual allocation are used for multi-user multiple-input multiple-output MU-MIMO.

Optionally, the resource scheduling information further includes third indication information to indicate whether the resource unit(s) in the actual allocation are available.

Optionally, the receiving unit is specifically configured to receive the bit sequence carried in a high efficient signaling field A or a high efficient signaling field B in a preamble and sent by the sending end; or the receiving unit is specifically configured to receive the bit sequence carried in a medium access control layer and sent by the sending end.

Optionally, the sending end is a network device, and the apparatus 400 is a terminal device.

The resource scheduling apparatus 400 according to this embodiment may correspond to a sending end (for example, a network device) in a method of an embodiment, and each unit, namely, each module, in the resource scheduling apparatus 400 and the foregoing other operations and/or functions are respectively intended to implement the corresponding procedure of the method 200 in FIG. 18. For brevity, details are not described herein again.

In the resource scheduling apparatus according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

The foregoing describes in detail the resource scheduling methods according to the embodiments with reference to FIG. 1 to FIG. 18. The following describes in detail resource scheduling devices according to the embodiments with reference to FIG. 21 and FIG. 22.

Figure 21:
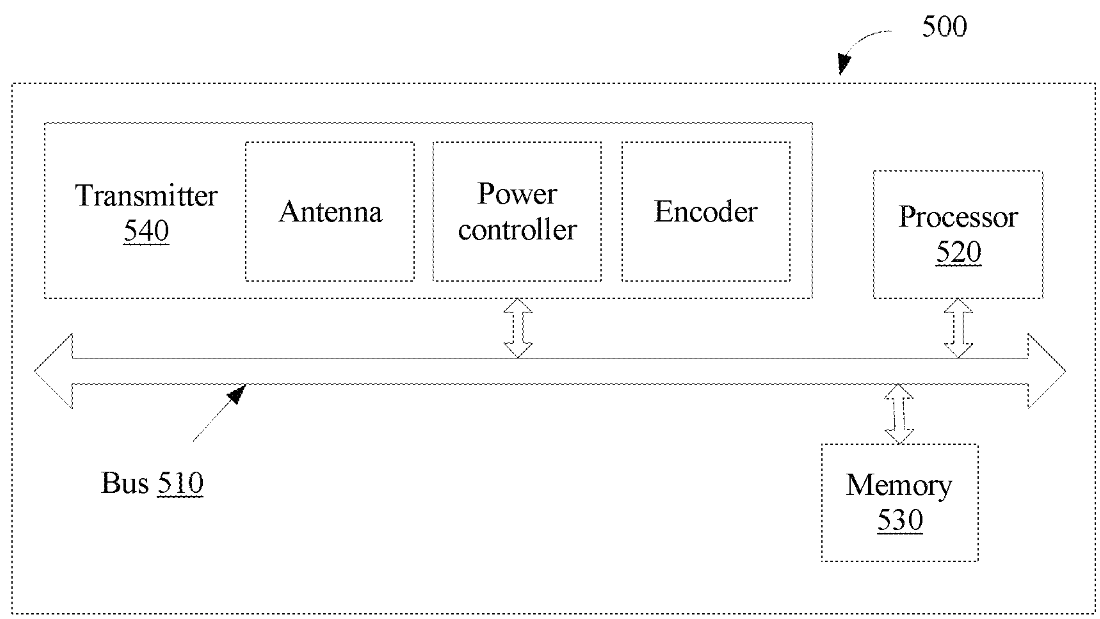
FIG. 21 is a schematic structural diagram of a resource scheduling device according to an embodiment.

FIG. 21 shows a schematic structural diagram of a resource scheduling device 500 according to an embodiment. The device 500 is applied to a wireless local area network, where a next generation protocol followed by the wireless local area network predefines locations of resource units possibly allocated from a to-be-assigned frequency domain resource. As shown in FIG. 21, the device 500 includes:

a bus 510;

a processor 520 connected to the bus;

a memory 530 connected to the bus; and a transmitter 540 connected to the bus, where the processor executes, by using the bus, a program stored in the memory, so as to generate resource scheduling information, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and control the transmitter to send the resource scheduling information to a receiving end.

Optionally, the to-be-assigned frequency domain resource includes a symmetric center.

Optionally, the locations of the resource units possibly allocated for the to-be-assigned frequency domain resource include a default location, and a resource unit corresponding to the default location is a resource unit that is not indicated by the bit sequence, as predefined by the next generation protocol.

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location.

Optionally, the bit sequence includes multiple type-2 bits, and the type-2 bit is to indicate whether a largest resource unit on one side of the symmetric center is in the actual allocation.

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Optionally, the resource scheduling information further includes identifiers of multiple scheduled receiving ends, and the identifiers of the receiving ends are to indicate that the resource unit(s) in the actual allocation are allocated to the multiple receiving ends.

Optionally, the resource scheduling information further includes first indication information to indicate the to-be-assigned frequency domain resource.

Optionally, the resource scheduling information further includes second indication information to indicate whether the resource unit(s) in the actual allocation are used for multi-user multiple-input multiple-output MU-MIMO.

Optionally, the resource scheduling information further includes third indication information to indicate whether the resource unit(s) in the actual allocation are available.

Optionally, the processor is specifically configured to control the transmitter to add the bit sequence to a high efficient signaling field A or a high efficient signaling field B in a preamble, and send the bit sequence to the receiving end; or the processor is specifically configured to control the transmitter to add the bit sequence to a medium access control layer, and send the bit sequence to the receiving end.

Optionally, the device 500 is a network device, and the receiving end is a terminal device.

This embodiment may be applied to various communications devices.

The transmitter of the device 500 may include a transmitter circuit, a power controller, an encoder, and an antenna. Moreover, the device 500 may further include a receiver. The receiver may include a receiver circuit, a power controller, a decoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 500 may be built in or the device 500 itself may be a wireless communications device such as a network device, and may further include a carrier containing a transmitter circuit and a receiver circuit, so as to allow data transmission and reception between the device 500 and a remote location. The transmitter circuit and the receiver circuit may be coupled to the antenna. Components in the device 500 are coupled together by using the bus, where the bus further includes a power bus, a control bus, and a status signal bus, in addition to a data bus. However, for clear description, various buses are marked as the bus in the figure. Specifically, in different products, a decoder may be integrated with a processing unit.

The processor may implement or execute steps and logical block diagrams disclosed in the method embodiments. A general purpose processor may be a microprocessor, or the processor may be any conventional processor, decoder, or the like. Steps of the methods disclosed with reference to the embodiments may be directly executed and completed by means of a hardware processor, or may be executed and completed by using a combination of a hardware module and a software module in the decoding processor. The software module may be located in a mature storage medium in the art, such as a random access memory, a flash memory, a read-only memory, a programmable read-only memory, an electrically-erasable programmable memory, or a register.

It should be understood that in the embodiments, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are marked as the bus system.

In an implementation process, each step of the foregoing methods may be completed by using an integrated logic circuit of hardware in the processor or an instruction in a form of software. Steps of the methods disclosed with reference to the embodiments may be directly executed and completed by a hardware processor, or may be executed and completed by using a combination of a hardware module and a software module in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The resource scheduling device 500 according to this embodiment may correspond to a sending end (for example, a network device) in a method of an embodiment, and each unit, namely, each module, in the resource scheduling device 500 and the foregoing other operations and/or functions are respectively intended to implement the corresponding procedure of the method 100 in FIG. 1. For brevity, details are not described herein again.

In the resource scheduling device according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

Figure 22:
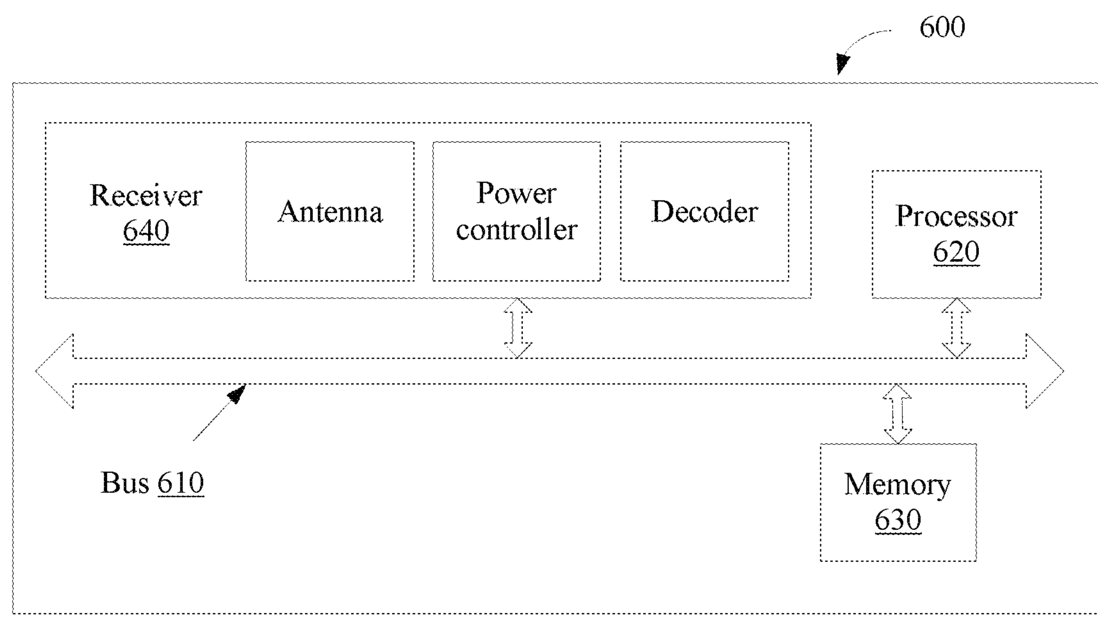
FIG. 22 is a schematic structural diagram of a resource scheduling device according to another embodiment.

FIG. 22 shows a schematic block diagram of a resource scheduling device 600 according to an embodiment. The device 600 is applied to a wireless local area network, where a next generation protocol followed by the wireless local area network predefines locations of resource units possibly allocated from a to-be-assigned frequency domain resource. As shown in FIG. 22, the device 600 includes:

a bus 610;

a processor 620 connected to the bus;

a memory 630 connected to the bus; and a receiver 640 connected to the bus, where the processor executes, by using the bus, a program stored in the memory, so as to control the receiver to receive resource scheduling information sent by a sending end, where the resource scheduling information includes a bit sequence to indicate an actual allocation of a resource unit(s) from the to-be-assigned frequency domain resource, and at least some bits in the bit sequence are to indicate whether a to-be-assigned resource unit actually allocated for the to-be-assigned frequency domain resource is in one or more resource unit locations in the locations of the resource units possibly allocated from the to-be-assigned frequency domain resource; and determine, according to the resource scheduling information, the resource unit(s) actually allocated by the sending end to the receiving end.

Optionally, the to-be-assigned frequency domain resource includes a symmetric center.

Optionally, the locations of the resource units possibly allocated for the to-be-assigned frequency domain resource include a default location, and a resource unit corresponding to the default location is a resource unit that is not indicated by the bit sequence, as predefined by the next generation protocol.

Optionally, the bit sequence includes multiple type-1 bits, the multiple type-1 bits correspond to multiple resource unit location pairs on a one-to-one basis, one of the type-1 bits is to indicate whether resource unit locations in a corresponding resource unit location pair are distributed in a same to-be-assigned resource unit, and one resource unit location pair includes locations of two contiguous smallest resource units located on one side of a default location.

Optionally, the bit sequence includes multiple type-2 bits, and the type-2 bit is to indicate whether a largest resource unit on one side of the symmetric center is in the actual allocation.

Optionally, the bit sequence includes two type-3 bits, the two type-3 bits correspond to two resource unit location groups located on two sides of the symmetric center on a one-to-one basis, and the type-3 bits are to indicate whether all resource units in resource unit locations in the corresponding resource unit location groups are the to-be-assigned resource units, where one resource unit location group includes locations of multiple smallest resource units located on one side of the center of the to-be-assigned frequency domain resource.

Optionally, the resource scheduling information further includes identifiers of multiple scheduled receiving ends, and the identifiers of the receiving ends are to indicate that the resource unit(s) in the actual allocation are allocated to the multiple receiving ends.

Optionally, the resource scheduling information further includes first indication information to indicate the to-be-assigned frequency domain resource.

Optionally, the resource scheduling information further includes second indication information to indicate whether the resource unit(s) in the actual allocation are used for multi-user multiple-input multiple-output MU-MIMO.

Optionally, the resource scheduling information further includes third indication information to indicate whether the resource unit(s) in the actual allocation are available.

Optionally, that a receiving end receives resource scheduling information sent by a sending end includes:

receiving the bit sequence carried in a high efficient signaling field A or a high efficient signaling field B in a preamble and sent by the sending end; or receiving the bit sequence carried in a medium access control layer and sent by the sending end.

Optionally, the sending end is a network device, and the device 600 is a terminal device.

This embodiment may be applied to various communications devices.

The receiver of the device 600 may include a receiver circuit, a power controller, a decoder, and an antenna. Moreover, the device 600 may further include a transmitter. The transmitter may include a transmitter circuit, a power controller, an encoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 600 may be built in or the device 600 itself may be a wireless communications device such as a terminal device, and may further include a carrier containing a transmitter circuit and a receiver circuit, so as to allow data transmission and reception between the device 600 and a remote location. The transmitter circuit and the receiver circuit may be coupled to the antenna. Components in the device 600 are coupled together by using the bus, where the bus further includes a power bus, a control bus, and a status signal bus, in addition to a data bus. However, for clear description, various buses are marked as the bus in the figure. Specifically, in different products, a decoder may be integrated with a processing unit.

The processor may implement or execute steps and logical block diagrams disclosed in the method embodiments. A general purpose processor may be a microprocessor, or the processor may be any conventional processor, decoder, or the like. Steps of the methods disclosed with reference to the embodiments may be directly executed and completed by means of a hardware processor, or may be executed and completed by using a combination of a hardware module and a software module in the decoding processor. The software module may be located in a mature storage medium in the art, such as a random access memory, a flash memory, a read-only memory, a programmable read-only memory, an electrically-erasable programmable memory, or a register.

It should be understood that in the embodiments, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are marked as the bus system.

In an implementation process, each step of the foregoing methods may be completed by using an integrated logic circuit of hardware in the processor or an instruction in a form of software. Steps of the methods disclosed with reference to the embodiments may be directly executed and completed by a hardware processor, or may be executed and completed by using a combination of a hardware module and a software module in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The resource scheduling device 600 according to this embodiment may correspond to a receiving end (for example, a terminal device) in a method of an embodiment, and each unit, namely, each module, in the resource scheduling device 600 and the foregoing other operations and/or functions are respectively intended to implement the corresponding procedure of the method 200 in FIG. 18. For brevity, details are not described herein again.

In the resource scheduling device according to this embodiment, at least some bits in a bit sequence are to indicate whether a to-be-assigned resource unit actually allocated from a to-be-assigned frequency domain resource is in one or more resource unit locations in locations of resource units possibly obtained by dividing the to-be-assigned frequency domain resource, and based on allocation of the resource unit(s) in the actual allocation and by comparing with the locations of the resource units possibly allocated from the to-be-assigned frequency domain resource, bit sequences of different lengths can be generated flexibly. Therefore, reduction of transmission resource overheads in resource scheduling can be supported.

It should be understood that, sequence numbers of the foregoing processes do not mean execution sequences in various embodiments. The execution sequences of the processes should be determined according to functions and internal logic of the processes, and should not be construed as any limitation on the implementation processes of the embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The software product is stored in a storage medium, and includes several instructions for instructing a computer device (which may be a personal computer, a server, or a sending end) to perform all or some of the steps of the methods described in the embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments, but are not intended to limit the protection scope. Any variation or replacement readily figured out by a person skilled in the art within the technical scope disclosed in the present invention shall fall within the protection scope. Therefore, the protection scope shall be subject to the protection scope of the claims.

To make the embodiments clearer, the following provide embodiments expressed in simplified language:

A HE-SIG-B Structure in an embodiment:

A HE-SIG-B is divided into a common part and a dedicated part.

—Common part:

Resource allocation (RA)

MU-MIMO STA number on specific RUs

Configuration for more time segments;

wherein the Resource allocation (RA) and the MU-MIMO STA number on specific RUs are compressed in a subfield, which may be called “RA Bit-map +Num_STAs”.

—Dedicated part, includes STA-specific configuration except RA information:

STA ID

MCS

Nsts/SS

Coding

BF/STBC

In an embodiment, to support OFDMA+MU-MIMO, a common part of a HE-SIG-B should indicate OFDMA RA and MU-MIMO Num_STAs of specific RU per time segment respectively.

There are multiple technical advances of the embodiment:

—A Compressed RA+Num_STAs subfield in a common part of HE-SIG-B reduces signaling overhead.

—A Bit-map of RA+STA_Num subfield is not table-based so as to avoid buffer of large table.

—Information of RA+Num_STAs subfield is useful for all dedicated STAs.

—More time segments allows flexible scheduling to improve throughout/goodput.

—A Compressed RA+Num_STAs is flexible to support wideband or per-CH transmission for a dedicated part of the HE-SIG-B.

Specifically, if not sensitive to interference, per-STA dedicated information is over BW. In this case, it’s most efficient load balancing.

If sensitive to interference, per-STA dedicated information is within the same band as its data. There are the following options:

Opt1: Load balancing within large RUs is to further reduce the overhead.

e.g., 8 MU-MIMO STAs on 484-RU is indicated in parallel, with 4 STAs per CH.

Opt2: Flexible repetition within large RU is to improve the robustness.

e.g., repeat some STA’s dedicated information within its large RU.

Figure 25:
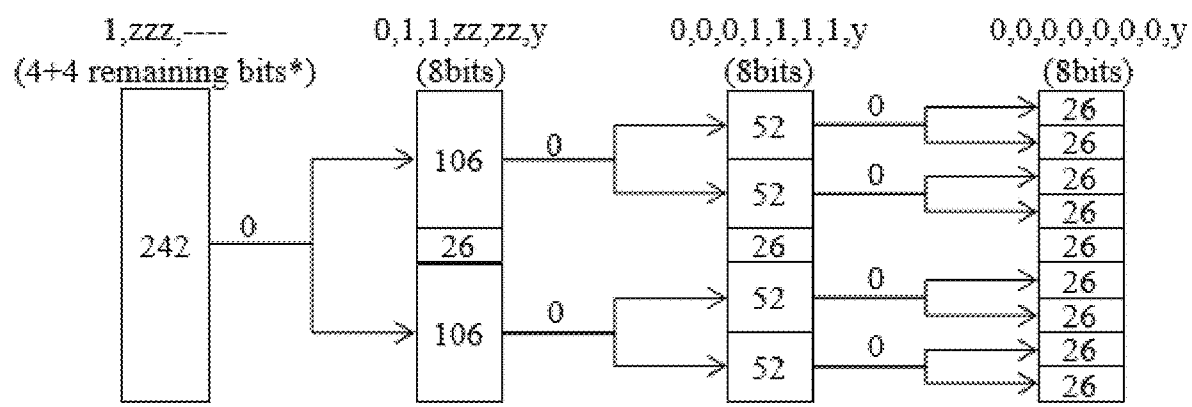
FIG. 25 to FIG. 31 illustrate some embodiments.

FIG. 25 describes an embodiment of a RA and STA_Num field for a BW of 20 MHz. As shown in FIG. 25, for a BW of 20 MHz, 8 bits are used for an field indicating OFDMA RA and MU-MIMO Num_STAs. Specifically:

1-bit ‘x’ per 242/106/52-RU indicates whether RU is existing or not.

Only if 0 for 242-RU, we need 1-bit per 106-RU within this 242-RU.

Only if 0 for 106-RU, we need 1-bit per 52-RU within this 106-RU.

1-bit 'y' for center 26-RU indicates whether it is used or not 2-3 bit 'z' per 242/106-RU indicates the STA number of MU-MIMO.

'zzz' (3-bit) per 242-RU: 1 SU-MIMO STA, 2-8 MU-MIMO STAs.

'zz' (2-bit) per 106-RUs: 1 SU-MIMO STA, 2-4 MU-MIMO STAs.

It is noted that, the 4 remaining bits remarked by the * in FIG. 25 are used for special cases in the following embodiments.

Figure 26:
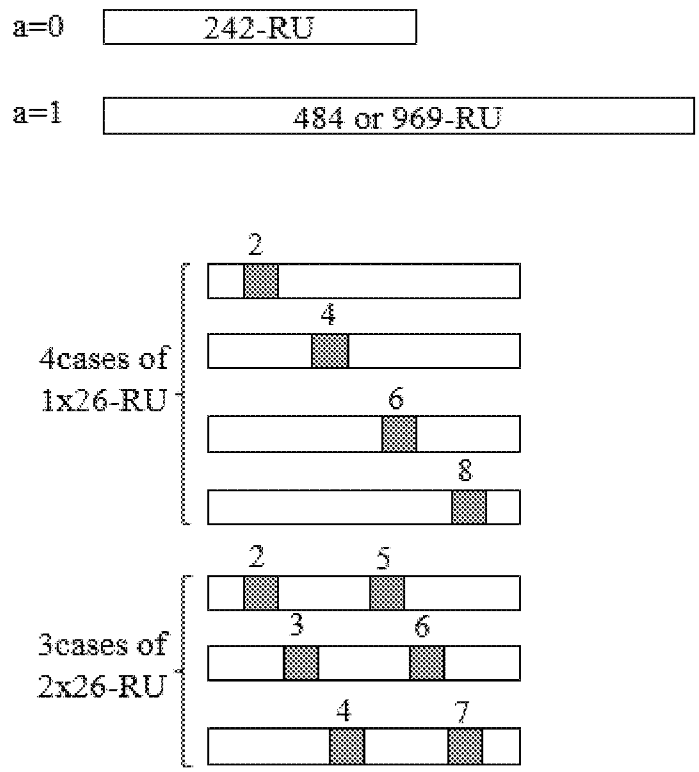

FIG. 26 describes an embodiment of remaining bits for a 242-RU within 20 MHz.

a RA+Num_STAs field for a 242-RU: 1,zzz, a, rrr, wherein:

1 aggregated bit 'a' to indicate whether 242-RU is aggregated into larger RU over multiple CHs.

a=0, 242-RU a=1, extend to larger 484 or 996-RU 3 remaining bits 'rrr' to indicate the special RA for range extension.

'rrr=000' for no Range extension

'rrr=001-111' for Range extension 4 cases to indicate 1×26-RU;

3 cases to indicate 2×26-RU.

Figure 27:
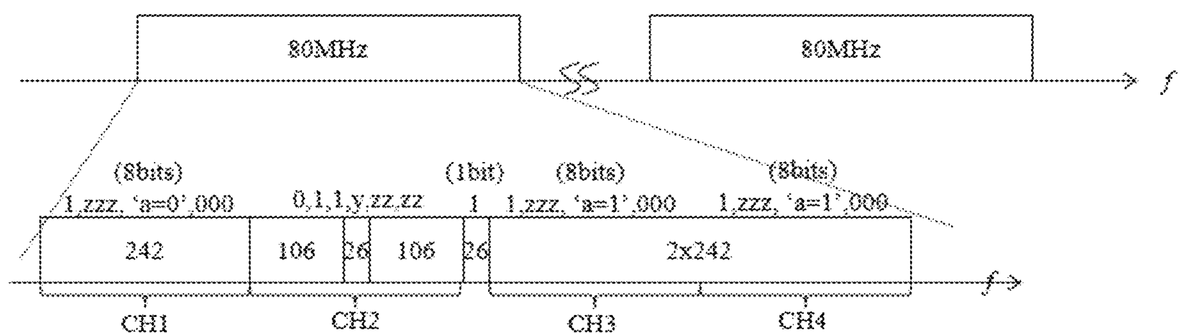

FIG. 27 describes an embodiment of a RA and Num_STAs field for BW>20 MHz. The following are examples of the length of the RA and Num_STAs field.

BW=40 MHz with 2 CHs: 2×8=16 bits

BW=60 MHz with 3 CHs: 3×8=24 bits

20+40 MHz or 40+20 MHz non-contiguous CB

BW=80 MHz with 4 CHs and center 26-RU: 4×8+1=33 bits

BW=160 MHz with two 80 MHz: 33 bits per 80 MHz in parallel on f(frequency) domain, shown in the FIG. 27.

An embodiment is provided about the Configuration for More Time segments. In this embodiment, a HE-SIG-B common field includes the information per time segment as a RA+Num_STAs field per time segment:

8/16/33/33+33 bits for the RA+Num_STAs field for 20/40/60/80/160 MHz per time segment.

a LTF_length+LTF_compression field per time segment.

3~4 bits LTF configuration per time segment

3~4 bits LTF configuration of the 1$^{st}$ time segment is compressed into HE-SIG-A.

In an embodiment, a HE-SIG-B common part includes a field indicating RA and STA number of MU-MIMO, at least one of the following benefits can be obtained:

No need to buffer indication table;

Overhead reduction;

Open useful information;

Flexible to support wideband/per-CH dedicated part.

In an embodiment, there is configuration for more time segments, at least one of the following benefits can be obtained:

Flexible scheduling to improve throughput/goodput throughout;

Cascading structure to support DL+UL further improves the system throughput.

Figures 28, 29:
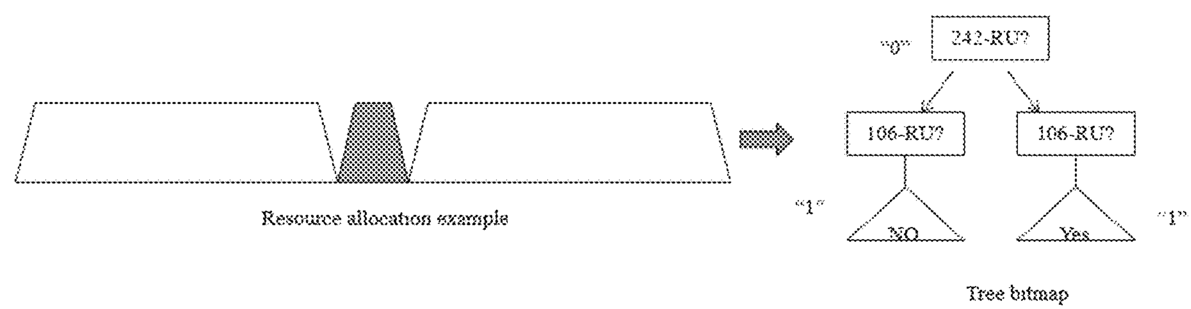

FIG. 28 describes examples of Max MU-MIMO STA Number:

Max 8 STAs of MU-MIMO for 242/484/996-RU

Large RU is shared by more STAs.

Max 4 STAs of MU-MIMO for 106-RU

Case 0: Non 106-RU

Max 9 STAs with OFDMA

Case 1: 1×106-RU

Max 4 STAs per MU-MIMO

Case 2: 2×106-RU

2×Max 4 STAs per MU-MIMO.

Table 4 shows overhead of a Compressed RA Bit-map+Num_STAs field.

TABLE 4

| Case | RA within 20 MHz (x) | Use Center 26-RU? (y) | Num of STAs (z) All zeros->SU others->MU | Aggregate? (a) | Total |
|---|---|---|---|---|---|
| 242-RU | 1 | 0 | 3 | 1 | 8 |
| Two 106-RU | 3 | 1 | 4 | 0 | 8 |
| One 106-RU | 5 | 1 | 2 | 0 | 8 |
| Non 106-RU | 7 | 1 | 0 | 0 | 8 |

FIG. 29 describes an example of a Compressed RA Bit-map (Tree bitmap):

In the Case 2: two 106-RU (3 bits)

Use the principle of binary tree search;

The central 26-tone RU is implicitly indicated;

Tree bitmap: 011.

Figure 30:
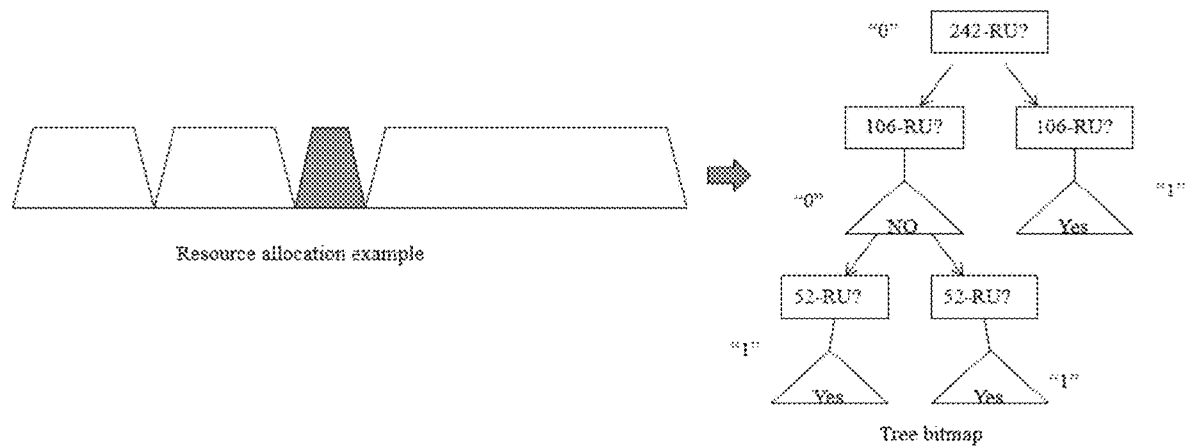

FIG. 30 describes an example of a Compressed RA Bit-map (Tree bitmap):

In a Case 3: One 106-RU (5 bits)

Use the principle of binary tree search;

The central 26-tone RU is implicitly indicated;

Tree bitmap: 00111.

Figure 31:
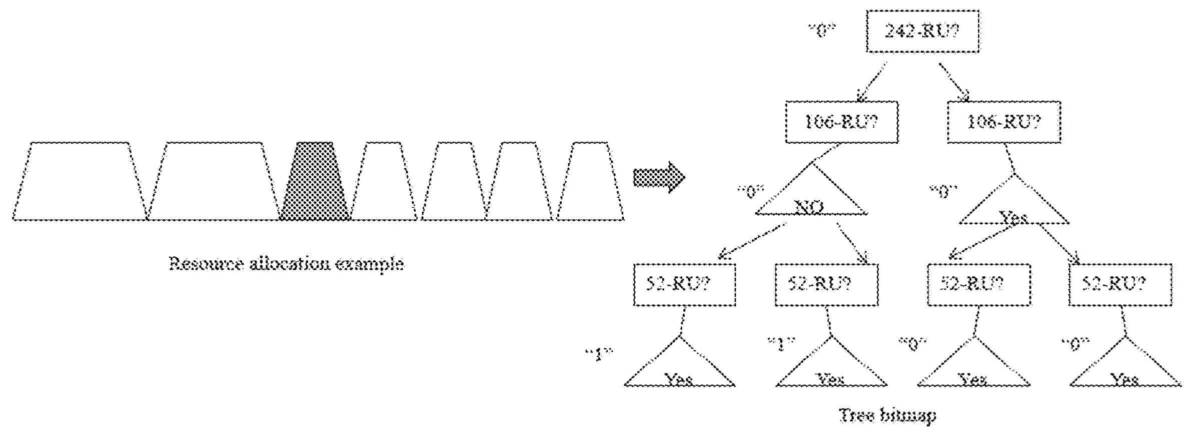

FIG. 31 describes an example of a Compressed RA Bit-map (Tree bitmap):

In a Case 4: Non 106-RU (7 bits)

Use the principle of binary tree search;

The central 26-tone RU is implicitly indicated;

Tree bitmap: 0001100.

What is claimed is:

1. A resource scheduling apparatus, comprising:

a processor;

a transmitter;

memory connected to the processor and including instructions that cause the apparatus to generate resource scheduling information for a frequency domain resource on the basis of a plurality of predefined resource units (RUs) of a frequency domain resource, the resource scheduling information indicating information related to the number of stations scheduled on each RU and an identifier of each scheduled station, an allocation of one or more RUs for the frequency domain resource, the allocation comprising:

size of each RU, the size indicating a quantity of subcarriers included in an allocated RU; and location of each RU, the location indicating where the corresponding quantity of subcarriers are located within a bandwidth of the frequency domain resource;

the transmitter being configured to transmit the resource scheduling information;

for which a smallest size of a resource unit that supports MU-MIMO is predefined such that:

for a first RU in the allocation, which first RU is smaller than the predefined smallest size for MU-MIMO, the number of one or more stations scheduled on the first RU is a default value;

for a second RU in the allocation, which second RU is not smaller than the predefined smallest size for MU-MIMO, at least 2 bits are used for indicating the number of the one or more stations scheduled on the second RU.

2. The resource scheduling apparatus according to claim 1, wherein the frequency domain resource comprises N*20 MHz bandwidths, N is a natural number; and each 20 MHz bandwidth comprises a central 26-RU of the 20 MHz bandwidth;

the resource scheduling information comprising N RU allocation subfields corresponding to the N*20 MHz bandwidths, each RU allocation subfield is a bit sequence of not more than 8 bits, each RU allocation subfield indicating:

an allocation of one or more RUs in one 20 MHz bandwidth;

whether using the central 26-RU of the one 20 MHz bandwidth; and the number of the one or more stations scheduled on each of the one or more RUs in the allocation indicated by the RU allocation subfield.

3. The resource scheduling apparatus according to claim 1, wherein the predefined smallest size of a RU that supports MU-MIMO is 106 subcarriers, the first RU in the plurality of predefined RUs comprises: 26-RU, or 52-RU; the second RU in the plurality of predefined RUs comprises: 106-RU, 242-RU, 484-RU, or 996-RU.

4. The resource scheduling apparatus according to claim 1, the frequency domain resource is provided with one of an 80 MHz bandwidth or 160 MHz bandwidth; and the resource scheduling information further includes 1 bit to indicate whether a center 26-RU of one 80 MHz bandwidth is allocated to a station.

5. The resource scheduling apparatus according to claim 4, wherein:

the frequency domain resource is provided with the 160 MHz bandwidth; and the resource scheduling information for each 80 MHz of the 160 MHz bandwidth is sent in parallel on the frequency domain resource.

6. A resource scheduling apparatus, comprising:

a processor;

a receiver connected to the processor; and memory connected to the processor, the receiver being configured to receive resource scheduling information indicating information related to the number of stations scheduled on each RU and an identifier of each scheduled station, an allocation of one or more RUs for a frequency domain resource, the allocation comprising:

size of each RU, the size indicating a quantity of subcarriers included in an allocated RU; and location of each RU, the location indicating where the corresponding quantity of subcarriers are located within a bandwidth of the frequency domain resource;

the memory including instructions that, when executed by the processor, cause the apparatus to determine, based on a plurality of predefined RUs of the frequency domain resource, and according to the received resource scheduling information, the one or more allocated RUs and corresponding scheduled stations;

for which a smallest size of a resource unit that supports MU-MIMO is predefined such that:

for a first RU in the allocation, which first RU is smaller than the smallest size for MU-MIMO, the number of one or more stations scheduled on the first resource unit is a default value;

for a second RU in the allocation, which second RU is greater than the smallest size for MU-MIMO, at least 2 bits are used for indicating the number of the one or more stations scheduled on the second resource unit.

7. The resource scheduling apparatus according to claim 6, wherein the frequency domain resource comprises N*20 MHz bandwidth, N is a natural number;

the resource scheduling information comprises N RU allocation subfields corresponding to the N*20 MHz bandwidth; and each RU allocation subfield is a bit sequence of not more than 8 bits, each RU allocation subfield indicating:

an allocation of one or more RUs for one 20 MHz bandwidth;

whether using the central 26-RU of the one 20 MHz bandwidth; and a number of the one or more stations scheduled on each of the one or more RUs in the allocation indicated by the RU allocation subfield.

8. The resource scheduling apparatus according to claim 6, wherein the predefined smallest size of a RU that supports MU-MIMO is 106 subcarriers, the first RU in the plurality of predefined RUs comprises: 26-RU, or 52-RU; the second RU in the plurality of predefined RUs comprises: 106-RU, 242-RU, 484-RU, or 996-RU.

9. The resource scheduling apparatus according to claim 6, the frequency domain resource is provided with one of an 80 MHz bandwidth or 160 MHz bandwidth; and the resource scheduling information further includes 1 bit to indicate whether a center 26-RU of one 80 MHz bandwidth is allocated to a station.

10. The resource scheduling apparatus according to claim 9, wherein:

the frequency domain resource is provided with the 160 MHz bandwidth; and the resource scheduling information for each 80 MHz of the 160 MHz bandwidth is received in parallel on the frequency domain resource.

11. A resource scheduling method, comprising:

generating, by a communication apparatus in a WLAN, resource scheduling information for a frequency domain resource on the basis of a plurality of predefined resource units of a frequency domain resource, the resource scheduling information indicating information related to the number of stations scheduled on each RU and an identifier of each scheduled station, an allocation of one or more RUs for the frequency domain resource, the allocation comprising:

size of each RU, the size indicating a quantity of subcarriers included in an allocated RU; and location of each RU, the location indicating where the corresponding quantity of subcarriers are located within a bandwidth of the frequency domain resource; and sending, by the communication apparatus, the resource scheduling information;

for which a smallest size of a resource unit that supports MU-MIMO is predefined such that:

for a first RU in the allocation, which first RU is smaller than the smallest size for MU-MIMO, the number of one or more stations scheduled on the first RU is a default value;

for a second RU in the allocation, which second RU is not smaller than the smallest size for MU-MIMO, at least 2 bits are used for indicating the number of the one or more stations scheduled on the second RU.

12. The method according to claim 11, wherein the frequency domain resource comprises N*20 MHz bandwidths, N is a natural number, each 20 MHz bandwidth comprises a central 26-RU of the 20 MHz bandwidth;

the resource scheduling information comprises N RU allocation subfields corresponding to the N*20 MHz bandwidths; and each RU allocation subfield is a bit sequence of not more than 8 bits, each RU allocation subfield indicating:

an allocation of one or more RUs for one 20 MHz bandwidth;

whether using the central 26-RU of the one 20 MHz bandwidth; and the number of the one or more stations scheduled on each of the one or more RUs in the allocation indicated by the RU allocation subfield.

13. The method according to claim 11, wherein the predefined smallest size of a RU that supports MU-MIMO is 106 subcarriers, the first RU in the plurality of predefined RUs comprises: 26-RU, or 52-RU; the second RU in the plurality of predefined RUs comprises: 106-RU, 242-RU, 484-RU, or 996-RU.

14. The method according to claim 11, the frequency domain resource being provided with one of an 80 MHz bandwidth or 160 MHz bandwidth; and the resource scheduling information further includes 1 bit to indicate whether a center 26-RU of one 80 MHz bandwidth is allocated to a station.

15. The method according to claim 14, the frequency domain resource is provided with the a 160 MHz bandwidth; and the sending the resource scheduling information of the 160 MHz bandwidth comprises:

sending a resource scheduling information for each 80 MHz of the 160 MHz bandwidth in parallel on the frequency domain resource.

16. A resource scheduling method, comprising:

receiving, by a communication apparatus in a WLAN, resource scheduling information, the resource scheduling information indicating information related to the number of stations scheduled on each RU and an identifier of each scheduled station, an allocation of one or more RUs for the frequency domain resource, the allocation comprising:

size of each RU, the size indicating a quantity of subcarriers included in an allocated RU; and location of each RU, the location indicating where the corresponding quantity of subcarriers are located within a bandwidth of the frequency domain resource; and determining, by the communication apparatus, based on a plurality of predefined resource units of the frequency domain resource, and according to the received resource scheduling information, the one or more allocated RUs and the corresponding one or more scheduled stations for which a smallest size of a resource unit that supports MU-MIMO is predefined such that:

for a first RU in the allocation, which first RU is smaller than the smallest size for MU-MIMO, the number of one or more stations scheduled on the first RU is a default value;

for a second RU in the allocation, which second RU is not smaller than the smallest size for MU-MIMO, at least 2 bits are used for indicating the number of the one or more stations scheduled on the second RU.

17. The method according to claim 16, wherein the frequency domain resource comprises N*20 MHz bandwidths, N is a natural number, and each 20 MHz bandwidth comprises a central 26-RU of the 20 MHz bandwidth;

the resource scheduling information comprising N RU allocation subfields corresponding to the N*20 MHz bandwidths, each RU allocation subfield is a bit sequence of not more than 8 bits, each RU allocation subfield indicating:

an allocation of one or more RUs in one 20 MHz bandwidth;

whether using the central 26-RU of the one 20 MHz bandwidth; and the number of the one or more stations scheduled on each of the one or more RUs in the allocation indicated by the RU allocation subfield.

18. The method according to claim 16, wherein the predefined smallest size of a RU that supports MU-MIMO is 106 subcarriers, the first RU in the plurality of predefined RUs comprises: 26-RU, or 52-RU; the second RU in the plurality of predefined RUs comprises: 106-RU, 242-RU, 484-RU, or 996-RU.

19. The method according to claim 16, the frequency domain resource is provided with one of an 80 MHz bandwidth or 160 MHz bandwidth;

the resource scheduling information further includes 1 bit to indicate whether a center 26-RU of one 80 MHz bandwidth is allocated to a station.

20. The method according to claim 19, the frequency domain resource is provided with the 160 MHz bandwidth; and the receiving the resource scheduling information comprises:

receiving a resource scheduling information for each 80 MHz of the 160 MHz bandwidth in parallel on the frequency domain resource.

* * * * *